(12) United States Patent
Yu et al.

(10) Patent No.: US 11,757,746 B2
(45) Date of Patent: Sep. 12, 2023

(54) COMMUNICATION METHOD, APPARATUS, AND SYSTEM

(71) Applicant: Huawei Technologies Co., Ltd., Shenzhen (CN)

(72) Inventors: Fang Yu, Shenzhen (CN); Feng Yu, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 2 days.

(21) Appl. No.: 17/681,420

(22) Filed: Feb. 25, 2022

(65) Prior Publication Data
US 2022/0182304 A1 Jun. 9, 2022

Related U.S. Application Data

(63) Continuation of application No. PCT/CN2019/103902, filed on Aug. 31, 2019.

(51) Int. Cl.
*H04L 43/0829* (2022.01)
*H04L 67/61* (2022.01)
*H04L 47/2425* (2022.01)
*H04L 67/141* (2022.01)
*H04L 69/322* (2022.01)

(52) U.S. Cl.
CPC ...... *H04L 43/0829* (2013.01); *H04L 47/2425* (2013.01); *H04L 67/141* (2013.01); *H04L 67/61* (2022.05); *H04L 69/322* (2013.01)

(58) Field of Classification Search
None
See application file for complete search history.

(56) References Cited

U.S. PATENT DOCUMENTS

| 9,385,848 B2* | 7/2016 | Radunovic | H04L 1/0006 |
| 2016/0127215 A1* | 5/2016 | Mani | H04L 1/0002 370/252 |

(Continued)

FOREIGN PATENT DOCUMENTS

| CN | 103179618 A | 6/2013 |
| CN | 104125607 A | 10/2014 |

(Continued)

OTHER PUBLICATIONS

"3rd Generation Partnership Project; Technical Specification Group Services and System Aspects; Study on enhancement of Ultra-Reliable Low-Latency Communication (URLLC) support in the 5G Core network(5GC)(Release 16)," 3GPP TR 23.725 V2.0.0, total 75 pages, 3rd Generation Partnership Project, Valbonne, France (Dec. 2018).

(Continued)

*Primary Examiner* — Angela Nguyen
(74) *Attorney, Agent, or Firm* — Leydig, Voit & Mayer, Ltd.

(57) ABSTRACT

This application provides a communication method, wherein a user plane path between a terminal and a user plane gateway includes a first link and a second link, the first link is a link between the terminal and an access network device, and the second link is a link between the access network device and the user plane gateway. The method comprises: obtaining packet loss statuses of a service flow on the first link and the second link; determining a quantity of consecutive lost packets of the service flow on the user plane path based on the packet loss statuses of the service flow on the first link and the second link; and when the quantity of consecutive lost packets of the service flow on the user plane path reaches a first threshold, triggers enabling of a high-reliability transmission mechanism for the service flow.

20 Claims, 17 Drawing Sheets

(56) References Cited

U.S. PATENT DOCUMENTS

2017/0346709 A1* 11/2017 Menon .................... H04L 45/70
2019/0215730 A1   7/2019 Qiao et al.
2020/0367110 A1  11/2020 Sun
2022/0182185 A1*  6/2022 Bostrom ............... H04L 1/1671

FOREIGN PATENT DOCUMENTS

CN      106900017 A    6/2017
WO      2019149080 A1  8/2019

OTHER PUBLICATIONS

Vivo, "UE-based criteria for the cell or leg selection of PDCP duplication," 3GPP TSG-RAN WG2 Meeting #105bis, Xi'an, China, R2-1903596, total 2 pages, 3rd Generation Partnership Project, Valbonne, France (Apr. 8-12, 2019).

Catt, "Lossless Transmission in BH Path Switching," 3GPP TSG-RAN WG2 Meeting #107, Prague, Czech Republic, R2-1911430, total 4 pages, 3rd Generation Partnership Project, Valbonne, France (Aug. 26-30, 2019).

"3rd Generation Partnership Project; Technical Specification Group Services and System Aspects; Service requirements for cyber-physical control applications in vertical domains; Stage 1 (Release 17)," 3GPP TS 22.104 V17.0.0, pp. 1-54, 3rd Generation Partnership Project, Valbonne, France (Jun. 2019).

* cited by examiner

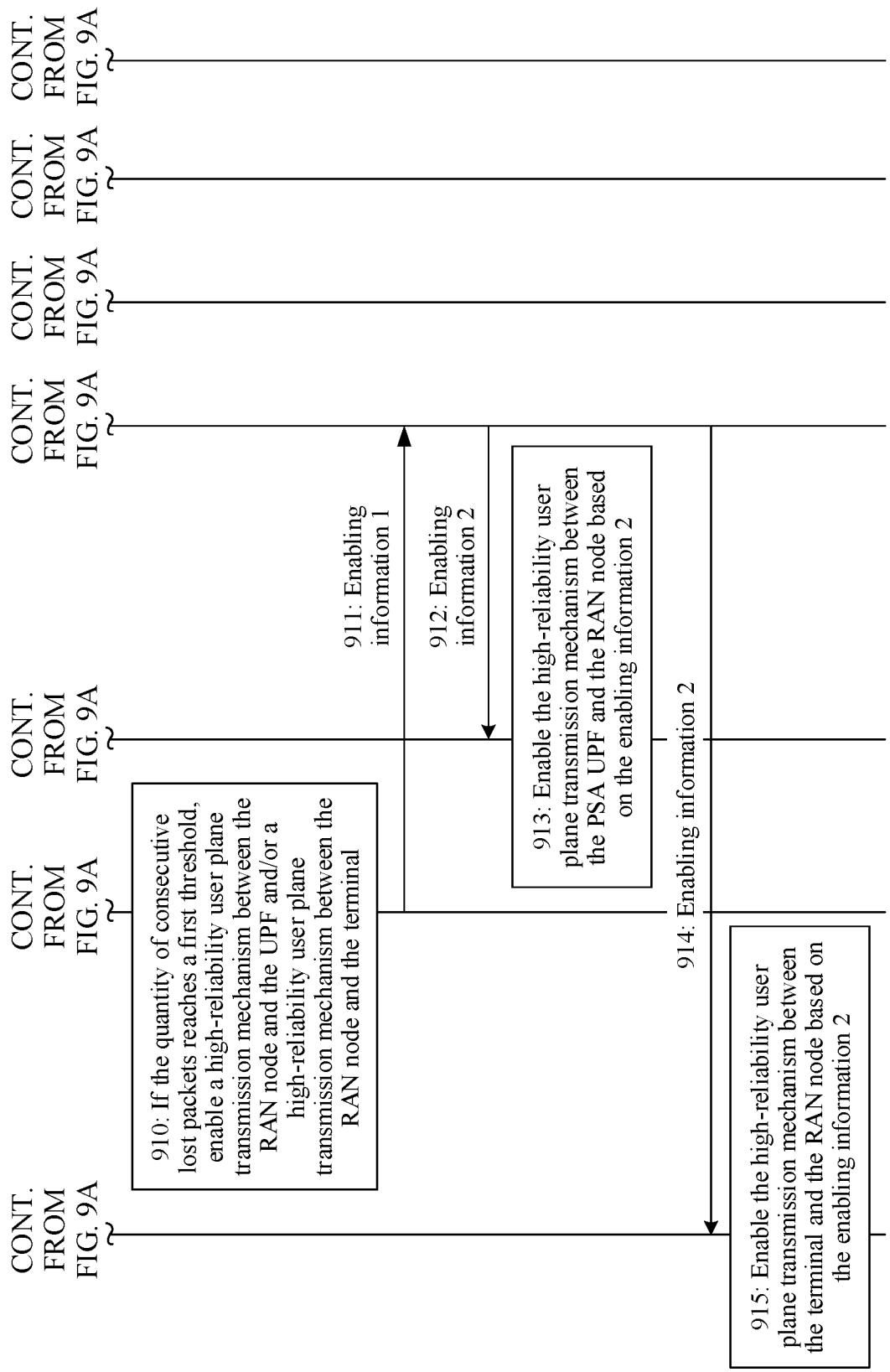

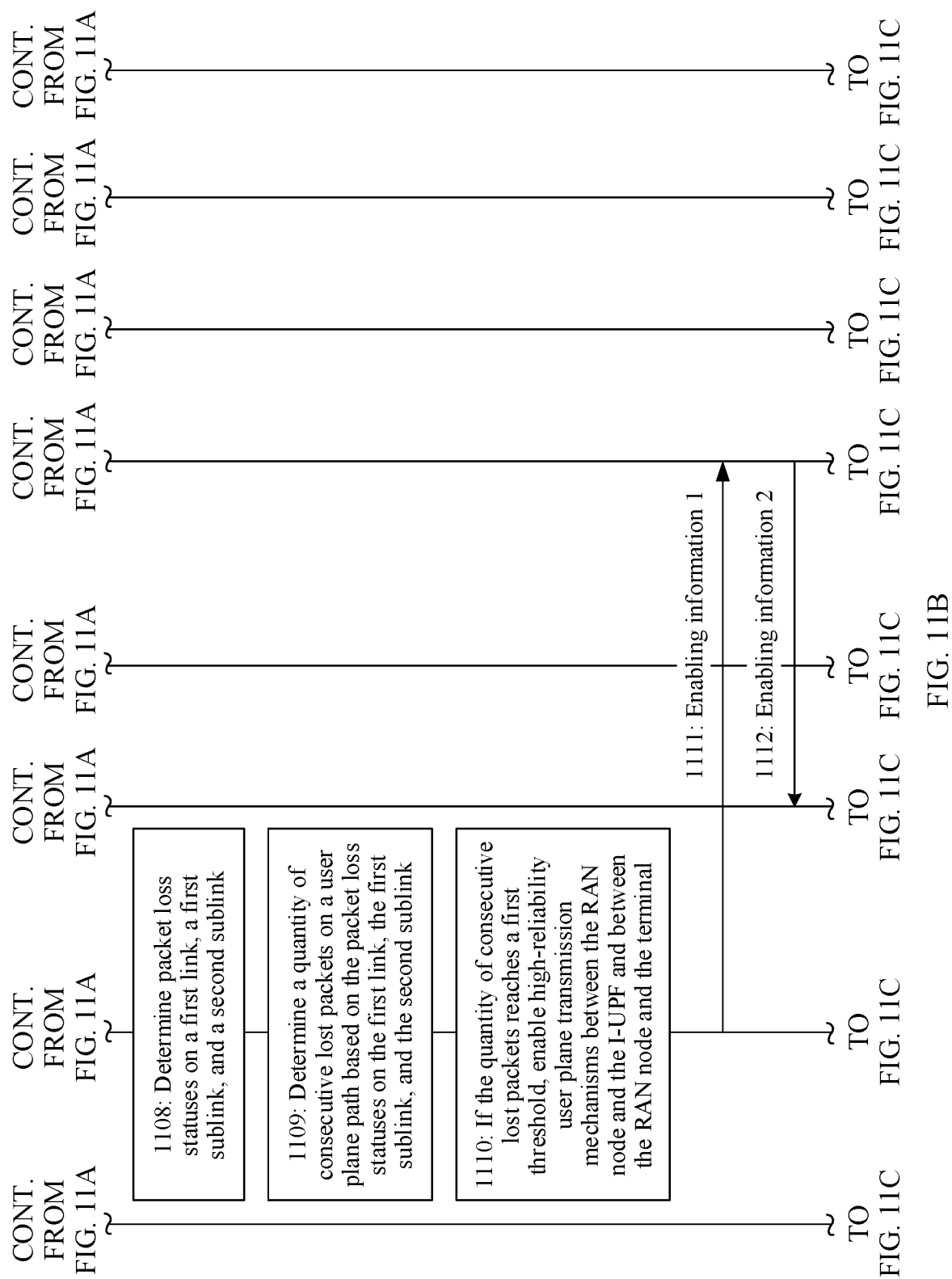

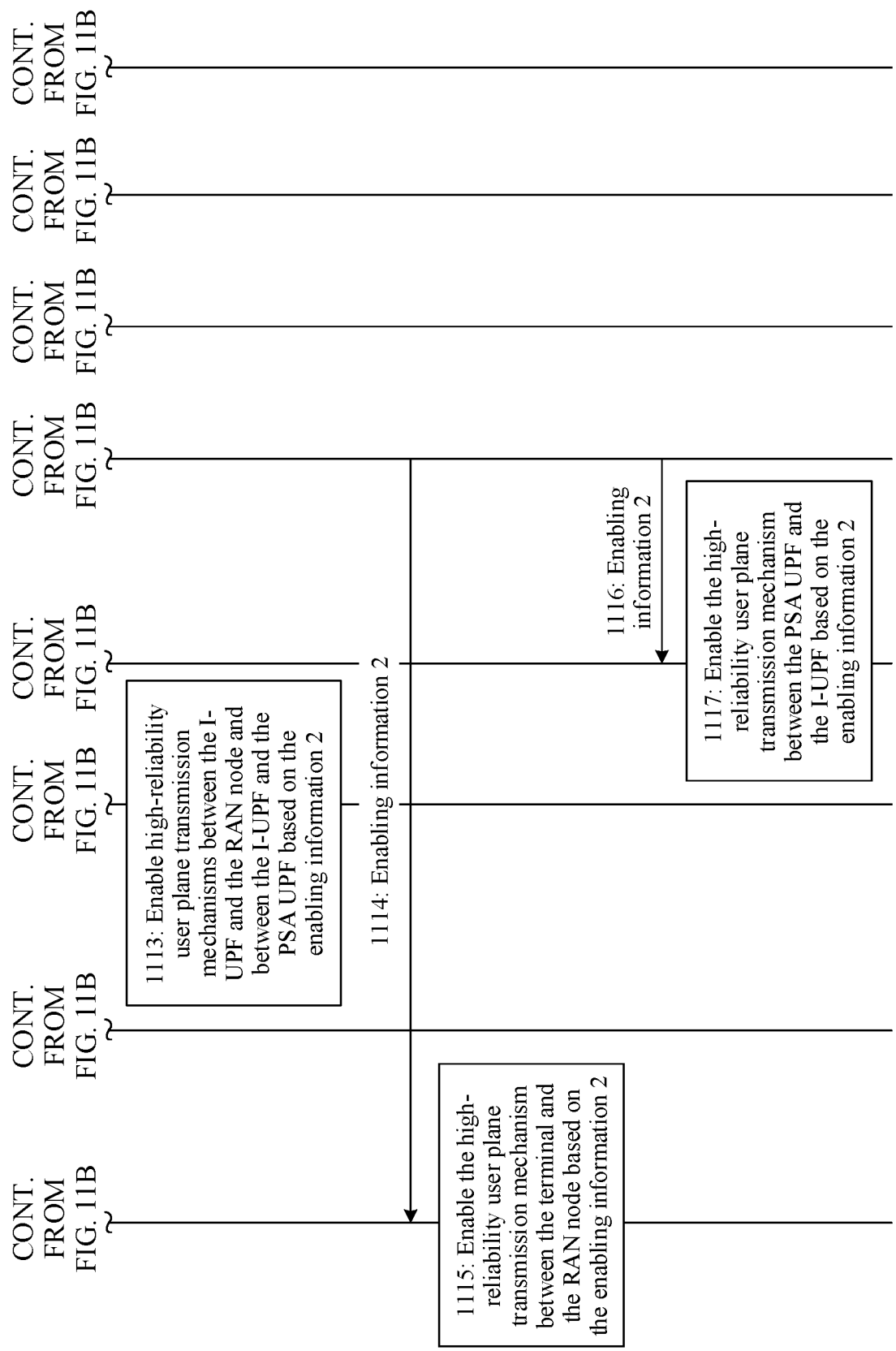

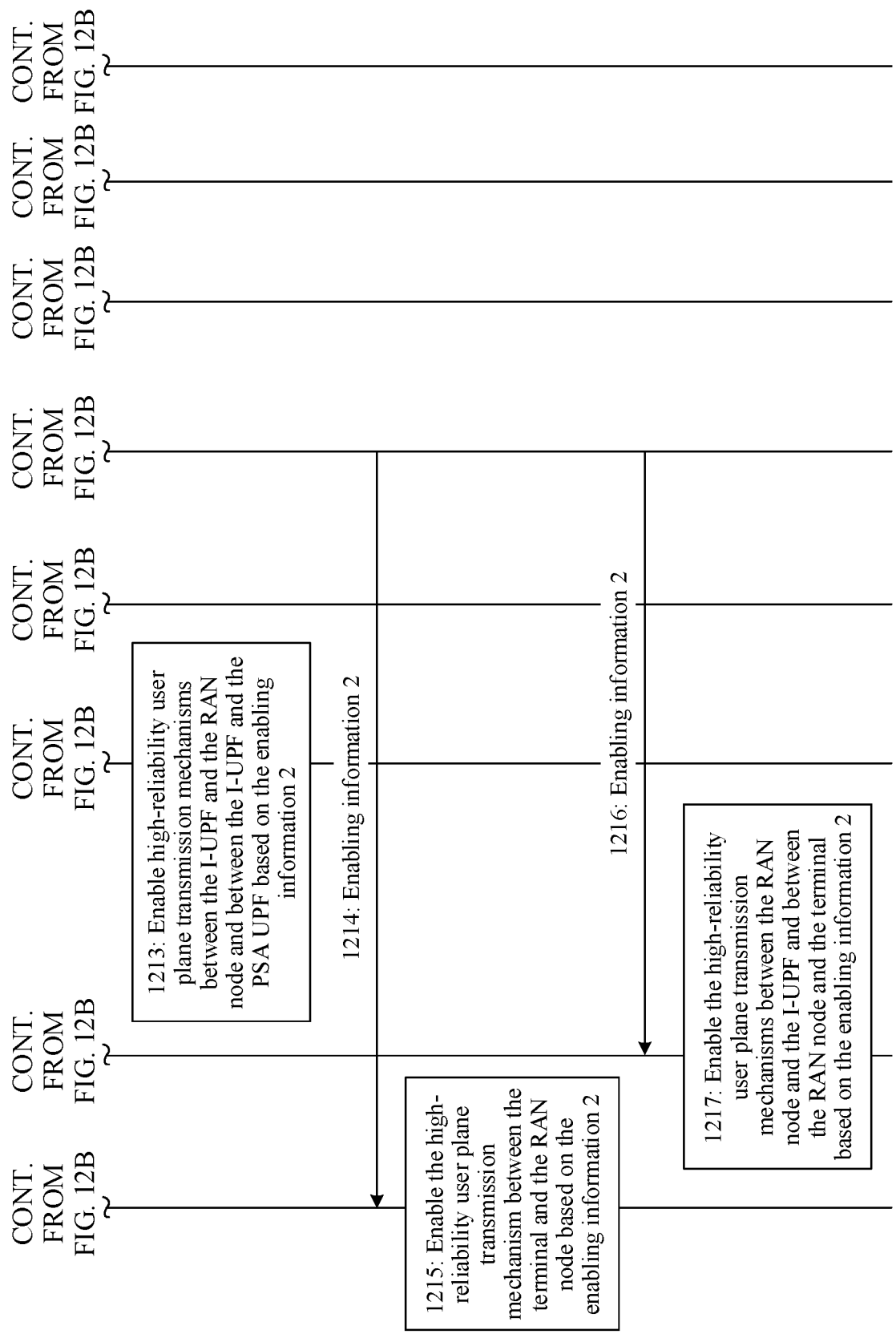

COMMUNICATION METHOD, APPARATUS, AND SYSTEM

CROSS-REFERENCE TO RELATED APPLICATIONS

This application is a continuation of International Application No. PCT/CN2019/103902, filed on Aug. 31, 2019, the disclosure of which is hereby incorporated by reference in its entirety.

TECHNICAL FIELD

This application relates to the field of communication technologies, and in particular, to a communication method, apparatus, and system.

BACKGROUND

Survival time of an application is a time period for which the application continues to run when an application server or an application layer of a terminal receives no anticipated message. The survival time may be expressed as duration, for example, 1 ms. For a periodic service, the survival time may alternatively be expressed as a maximum quantity of consecutive messages that are allowed to be lost or incorrectly received. If the survival time of the application has been exceeded, the application server or the terminal changes a status of the application to a down state. This causes application shutdown, and consequently affects user experience.

SUMMARY

Embodiments of this application provide a communication method, apparatus, and system, to improve service reliability and user experience.

To achieve the foregoing objective, the embodiments of this application provide the following technical solutions.

According to a first aspect, a communication method is provided. A PDU session of a terminal is anchored to an anchor user plane gateway trough an access network device, a user plane path between the terminal and the anchor user plane gateway includes a first link and a second link, the first link is a user plane data link for communication between the terminal and the access network device, and the second link is a user plane data link for communication between the access network device and the anchor user plane gateway. The method includes: A first device obtains packet loss statuses of a service flow on the first link and the second link, where the first device is the access network device or the anchor user plane gateway. The first device determines a quantity of consecutive lost packets of the service flow on the user plane path based on the packet loss statuses of the service flow on the first link and the second link. When the quantity of consecutive lost packets of the service flow on the user plane path reaches a first threshold, the first device triggers enabling of a high-reliability transmission mechanism for the service flow. According to the method provided in the first aspect, the first device obtains the packet loss statuses on the first link and the second link, to determine the quantity of consecutive lost packets on the user plane path. If the quantity of consecutive lost packets reaches the first threshold, the first device enables the high-reliability transmission mechanism for the service flow. This improves reliability of user plane data transmission, avoids application shutdown, and improves user experience.

In a possible implementation, the first threshold is determined based on survival time corresponding to the service flow.

In a possible implementation, that the quantity of consecutive lost packets of the service flow on the user plane path reaches a first threshold is specifically: A quantity of consecutive lost packets of the service flow on the first link in the user plane path reaches the first threshold. That the first device triggers enabling of a high-reliability transmission mechanism for the service flow includes: The first device triggers enabling of a high-reliability transmission mechanism between the terminal and the access network device for the service flow; or the first device triggers enabling of a high-reliability transmission mechanism between the terminal and the anchor user plane gateway for the service flow.

In a possible implementation, when the first device is the access network device, that the first device triggers enabling of a high-reliability transmission mechanism between the terminal and the access network device for the service flow includes: The first device sends first enabling information to the terminal, where the first enabling information indicates that the high-reliability transmission mechanism between the terminal and the access network device for the service flow needs to be enabled; and the first device triggers the first device to enable the high-reliability transmission mechanism between the first device and the terminal for the service flow.

In a possible implementation, that the first device triggers enabling of a high-reliability transmission mechanism between the terminal and the access network device for the service flow includes: The first device sends second enabling information to a session management network element, where the second enabling information indicates that the high-reliability transmission mechanism between the terminal and the access network device for the service flow needs to be enabled.

In a possible implementation, that the quantity of consecutive lost packets of the service flow on the user plane path reaches a first threshold is specifically: A quantity of consecutive lost packets of the service flow on the second link in the user plane path reaches the first threshold. That the first device triggers enabling of a high-reliability transmission mechanism for the service flow includes: The first device triggers enabling of a high-reliability transmission mechanism between the anchor user plane gateway and the access network device for the service flow; or the first device triggers enabling of a high-reliability transmission mechanism between the terminal and the anchor user plane gateway for the service flow.

In a possible implementation, when the first device is the access network device, that the first device triggers enabling of a high-reliability transmission mechanism between the anchor user plane gateway and the access network device for the service flow includes: The first device sends third enabling information to the anchor user plane gateway, where the third enabling information indicates that the high-reliability transmission mechanism between the anchor user plane gateway and the access network device for the service flow needs to be enabled; and the first device triggers the first device to enable the high-reliability transmission mechanism between the first device and the anchor user plane gateway for the service flow.

In a possible implementation, when the first device is the anchor user plane gateway, that the first device triggers enabling of a high-reliability transmission mechanism between the anchor user plane gateway and the access network device for the service flow includes: The first device sends fourth enabling information to the access network device, where the fourth enabling information indicates that the high-reliability transmission mechanism between the anchor user plane gateway and the access network device for the service flow needs to be enabled; and the first device triggers the first device to enable the high-reliability transmission mechanism between the first device and the access network device for the service flow.

In a possible implementation, that the first device triggers enabling of a high-reliability transmission mechanism between the anchor user plane gateway and the access network device for the service flow includes: The first device sends fifth enabling information to a session management network element, where the fifth enabling information indicates that the high-reliability transmission mechanism between the anchor user plane gateway and the access network device for the service flow needs to be enabled.

In a possible implementation, that the quantity of consecutive lost packets of the service flow on the user plane path reaches a first threshold is specifically: A quantity of consecutive lost packets of the service flow on the first link in the user plane path is less than the first threshold, a quantity of consecutive lost packets of the service flow on the second link is less than the first threshold, and a total quantity of consecutive lost packets of the service flow on the first link and the second link reaches the first threshold. That the first device triggers enabling of a high-reliability transmission mechanism for the service flow includes: The first device triggers enabling of a high-reliability transmission mechanism between the terminal and the anchor user plane gateway for the service flow.

In a possible implementation, that the first device triggers enabling of a high-reliability transmission mechanism between the terminal and the anchor user plane gateway for the service flow includes: The first device sends sixth enabling information to a session management network element, where the sixth enabling information indicates that the high-reliability transmission mechanism between the terminal and the anchor user plane gateway for the service flow needs to be enabled.

In a possible implementation, the first device is the access network device. That the first device determines a quantity of consecutive lost packets of the service flow on the user plane path based on the packet loss statuses of the service flow on the first link and the second link includes: The first device determines the quantity of consecutive lost packets of the service flow on the user plane path based on a PDCP SN of a packet that is in the service flow and that is lost on the first link, an N3 GTP-U SN of a packet that is in the service flow and that is lost on the second link, and a mapping relationship between a PDCP SN and an N3 GTP-U SN of a packet in the service flow.

In a possible implementation, when the first device is the access network device, for an uplink packet, that the first device obtains the packet loss status of the service flow on the first link includes: The first device receives the packet in the service flow from the terminal; and the first device determines the packet loss status of the service flow on the first link based on consecutiveness of PDCP SNs of correctly received packets. Alternatively, the first device receives the packet in the service flow from the terminal; the first device sends an ACK to the terminal for each correctly received packet; the first device receives first packet loss information from the terminal, where the first packet loss information is used to indicate a PDCP SN of a packet that is not correctly received by the first device; and the first device determines the packet loss status of the service flow on the first link based on the first packet loss information.

In a possible implementation, when the first device is the access network device, for an uplink packet, that the first device obtains the packet loss status of the service flow on the second link includes: The first device receives second packet loss information from the anchor user plane gateway, where the second packet loss information is used to indicate an N3 GTP-U SN of a packet that is not correctly received by the anchor user plane gateway; and the first device determines the packet loss status of the service flow on the second link based on the second packet loss information. Alternatively, the first device sends the packet in the service flow to the anchor user plane gateway; the first device receives, from the anchor user plane gateway, an ACK sent by the anchor user plane gateway for each correctly received packet; and the first device determines the packet loss status of the service flow on the second link based on depending on whether an ACK for each sent packet is received.

In a possible implementation, when the first device is the access network device, for a downlink packet, that the first device obtains the packet loss status of the service flow on the first link includes: The first device receives third packet loss information from the terminal, where the third packet loss information is used to indicate a PDCP SN of a packet that is not correctly received by the terminal; and the first device determines the packet loss status of the service flow on the first link based on the third packet loss information. Alternatively, the first device sends the packet in the service flow to the terminal; the first device receives, from the terminal, an ACK sent by the terminal for each correctly received packet; and the first device determines the packet loss status of the service flow on the first link based on depending on whether an ACK for each sent packet is received.

In a possible implementation, when the first device is the access network device, for a downlink packet, that the first device obtains the packet loss status of the service flow on the second link includes: The first device receives the packet in the service flow from the anchor user plane gateway; and the first device determines the packet loss status of the service flow on the second link based on consecutiveness of N3 GTP-U SNs of correctly received packets. Alternatively, the first device receives the packet in the service flow from the anchor user plane gateway; the first device sends an ACK to the anchor user plane gateway for each correctly received packet; the first device receives fourth packet loss information from the anchor user plane gateway, where the fourth packet loss information is used to indicate an N3 GTP-U SN of a packet that is not correctly received by the first device; and the first device determines the packet loss status of the service flow on the second link based on the fourth packet loss information.

In a possible implementation, when the first device is the anchor user plane gateway, for an uplink packet, that the first device obtains the packet loss status of the service flow on the first link includes: The first device receives fifth packet loss information from the access network device, where the fifth packet loss information is used to indicate a packet that is in the service flow and that is lost on the first link; and the first device determines the packet loss status of the service flow on the first link based on the fifth packet loss information.

In a possible implementation, a PDCP SN of each packet correctly received by the access network device corresponds to an N3 GTP-U SN of the packet sent by the access network device, N3 GTP-U SNs of packets consecutively sent by the access network device are consecutive, the fifth packet loss information is used to indicate an N3 GTP-U SN of a correctly received packet previous to the packet that is not correctly received by the access network device on the first link, and the fifth packet loss information is further used to indicate that one packet or a plurality of consecutive packets subsequent to the packet indicated by the fifth packet loss information is/are lost. Alternatively, a difference between a PDCP SN of each packet correctly received by the access network device and an N3 GTP-U SN of the packet sent by the access network device is the same, and the fifth packet loss information is an N3 GTP-U SN of a packet that is not correctly received by the access network device on the first link.

In a possible implementation, when the first device is the anchor user plane gateway, for an uplink packet, that the first device obtains the packet loss status of the service flow on the second link includes: The first device receives the packet in the service flow from the access network device; and the first device determines the packet loss status of the service flow on the second link based on consecutiveness of N3 GTP-U SNs of correctly received packets. Alternatively, the first device receives the packet in the service flow from the access network device; the first device sends an ACK to the access network device for each correctly received packet; the first device receives sixth packet loss information from the access network device, where the sixth packet loss information is used to indicate an N3 GTP-U SN of a packet that is not correctly received by the first device; and the first device determines the packet loss status of the service flow on the second link based on the sixth packet loss information.

In a possible implementation, when the first device is the anchor user plane gateway, for a downlink packet, that the first device obtains the packet loss status of the service flow on the first link includes: The first device receives seventh packet loss information from the access network device, where the seventh packet loss information is used to indicate an N3 GTP-U SN of a packet that is in the service flow and that is lost on the first link; and the first device determines the packet loss status of the service flow on the first link based on the seventh packet loss information.

In a possible implementation, when the first device is the anchor user plane gateway, for a downlink packet, that the first device obtains the packet loss status of the service flow on the second link includes: The first device receives eighth packet loss information from the access network device, where the eighth packet loss information is used to indicate an N3 GTP-U SN of a packet that is not correctly received by the access network device; and the first device determines the packet loss status of the service flow on the second link based on the eighth packet loss information. Alternatively, the first device sends the packet in the service flow to the access network device; the first device receives, from the access network device, an ACK sent by the access network device for each correctly received packet; and the first device determines the packet loss status of the service flow on the second link based on depending on whether an ACK for each sent packet is received.

In a possible implementation, the anchor user plane gateway communicates with the access network device through an intermediate user plane gateway, the second link includes a first sublink and a second sublink, the first sublink is a user plane data link for communication between the access network device and the intermediate user plane gateway, and the second sublink is a user plane data link for communication between the intermediate user plane gateway and the anchor user plane gateway.

In a possible implementation, that the quantity of consecutive lost packets of the service flow on the user plane path reaches a first threshold is specifically: A quantity of consecutive lost packets of the service flow on the first link in the user plane path is less than the first threshold, a quantity of consecutive lost packets of the service flow on the first sublink is less than the first threshold, a quantity of consecutive lost packets of the service flow on the second sublink is also less than the first threshold, and a total quantity of consecutive lost packets of the service flow on any two or all of the first link, the first sublink, and the second sublink reaches the first threshold. That the first device triggers enabling of a high-reliability transmission mechanism for the service flow includes: The first device triggers enabling of a high-reliability transmission mechanism between the terminal and the anchor user plane gateway for the service flow.

In a possible implementation, that the first device triggers enabling of a high-reliability transmission mechanism between the terminal and the anchor user plane gateway for the service flow includes: The first device sends seventh enabling information to a session management network element, where the seventh enabling information indicates that the high-reliability transmission mechanism between the terminal and the anchor user plane gateway for the service flow needs to be enabled.

In a possible implementation, when the first device is the access network device, for an uplink packet, that the first device obtains the packet loss status of the service flow on the first link includes: The first device receives the packet in the service flow from the terminal; and the first device determines the packet loss status of the service flow on the first link based on consecutiveness of PDCP SNs of correctly received packets. Alternatively, the first device receives the packet in the service flow from the terminal; the first device sends an ACK to the terminal for each correctly received packet; the first device receives ninth packet loss information from the terminal, where the ninth packet loss information is used to indicate a PDCP SN of a packet that is not correctly received by the first device; and the first device determines the packet loss status of the service flow on the first link based on the ninth packet loss information.

In a possible implementation, when the first device is the access network device, for an uplink packet, that the first device obtains the packet loss status of the service flow on the second link includes: The first device receives tenth packet loss information from the intermediate user plane gateway, where the tenth packet loss information is used to indicate an N3 GTP-U SN of a packet that is not correctly received by the intermediate user plane gateway on the first sublink and an N3 GTP-U SN of a packet that is not correctly received by the anchor user plane gateway on the second sublink; and the first device determines the packet loss status of the service flow on the second link based on the tenth packet loss information. Alternatively, the first device sends the packet in the service flow to the intermediate user plane gateway; the first device receives, from the intermediate user plane gateway, an ACK sent by the intermediate user plane gateway for each correctly received packet; the first device determines a packet loss status of the service flow on the first sublink based on depending on whether an ACK for each sent packet is received; the first device receives eleventh packet loss information from the intermediate user plane gateway, where the eleventh packet loss information is used to indicate an N3 GTP-U SN of a packet that is not correctly received by the anchor user plane gateway on the second sublink; and the first device determines the packet loss status of the service flow on the second link based on the eleventh packet loss information and the packet loss status of the service flow on the first sublink.

In a possible implementation, when the first device is the access network device, for a downlink packet, that the first device obtains the packet loss status of the service flow on the first link includes: The first device receives twelfth packet loss information from the terminal, where the twelfth packet loss information is used to indicate a PDCP SN of a packet that is not correctly received by the terminal; and the first device determines the packet loss status of the service flow on the first link based on the twelfth packet loss information. Alternatively, the first device sends the packet in the service flow to the terminal; the first device receives, from the terminal, an ACK sent by the terminal for each correctly received packet; and the first device determines the packet loss status of the service flow on the first link based on depending on whether an ACK for each sent packet is received.

In a possible implementation, when the first device is the access network device, for a downlink packet, that the first device obtains the packet loss status of the service flow on the second link includes: The first device receives the packet in the service flow from the intermediate user plane gateway; the first device determines, based on consecutiveness of N3 GTP-U SNs of correctly received packets, an N3 GTP-U SN of a packet that is not correctly received by the first device on the first sublink; the first device receives thirteenth packet loss information from the intermediate user plane gateway, where the thirteenth packet loss information is used to indicate a packet that is not correctly received by the intermediate user plane gateway on the second sublink; and the first device determines the packet loss status of the service flow on the second link based on the thirteenth packet loss information and the N3 GTP-U SN of the packet that is not correctly received by the first device on the first sublink. Alternatively, the first device receives the packet in the service flow from the intermediate user plane gateway; the first device sends an ACK to the intermediate user plane gateway for each correctly received packet; the first device receives thirteenth packet loss information and fourteenth packet loss information from the intermediate user plane gateway, where the thirteenth packet loss information is used to indicate a packet that is not correctly received by the intermediate user plane gateway on the second sublink, and the fourteenth packet loss information is used to indicate an N3 GTP-U SN of a packet that is not correctly received by the first device on the first sublink; and the first device determines the packet loss status of the service flow on the second link based on the thirteenth packet loss information and the fourteenth packet loss information.

In a possible implementation, an N9 GTP-U SN of each packet correctly received by the intermediate user plane gateway corresponds to an N3 GTP-U SN of the packet sent by the intermediate user plane gateway, N3 GTP-U SNs of packets consecutively sent by the intermediate user plane gateway are consecutive, the thirteenth packet loss information is used to indicate an N3 GTP-U SN of a correctly received packet previous to the packet that is not correctly received by the intermediate user plane gateway on the second sublink, and the thirteenth packet loss information is further used to indicate that one packet or a plurality of consecutive packets subsequent to the packet indicated by the thirteenth packet loss information is/are lost. Alternatively, a difference between an N9 GTP-U SN of each packet correctly received by the intermediate user plane gateway and an N3 GTP-U SN of the packet sent by the intermediate user plane gateway is the same, and the thirteenth packet loss information is an N3 GTP-U SN of the packet that is not correctly received by the intermediate user plane gateway on the second sublink.

In a possible implementation, when the first device is the anchor user plane gateway, for an uplink packet, that the first device obtains the packet loss status of the service flow on the first link includes: The first device receives fifteenth packet loss information from the intermediate user plane gateway, where the fifteenth packet loss information is used to indicate a packet that is in the service flow and that is lost on the first link; and the first device determines the packet loss status of the service flow on the first link based on the fifteenth packet loss information.

In a possible implementation, a PDCP SN of each packet correctly received by the access network device corresponds to an N3 GTP-U SN of the packet sent by the access network device, N3 GTP-U SNs of packets consecutively sent by the access network device are consecutive, the fifteenth packet loss information is used to indicate an N9 GTP-U SN of a correctly received packet previous to the packet that is not correctly received by the access network device on the first link, and the fifteenth packet loss information is further used to indicate that one packet or a plurality of consecutive packets subsequent to the packet indicated by the fifteenth packet loss information is/are lost. Alternatively, a difference between a PDCP SN of each packet correctly received by the access network device and an N3 GTP-U SN of the packet sent by the access network device is the same, a difference between an N3 GTP-U SN of each packet correctly received by the intermediate user plane gateway and an N9 GTP-U SN of the packet sent by the intermediate user plane gateway is the same, and the fifteenth packet loss information is an N9 GTP-U SN of the packet that is not correctly received by the access network device on the first link.

In a possible implementation, when the first device is the anchor user plane gateway, for an uplink packet, that the first device obtains the packet loss status of the service flow on the second link includes: The first device receives sixteenth packet loss information from the intermediate user plane gateway, where the sixteenth packet loss information is used to indicate a packet that is in the service flow and that is lost on the first sublink; the first device receives the packet in the service flow from the intermediate user plane gateway; the first device determines a packet loss status of the service flow on the second sublink based on consecutiveness of N9 GTP-U SNs of correctly received packets; and the first device determines the packet loss status of the service flow on the second link based on the sixteenth packet loss information and the packet loss status of the service flow on the second sublink. Alternatively, the first device receives the packet in the service flow from the intermediate user plane gateway; the first device sends an ACK to the intermediate user plane gateway for each correctly received packet; the first device receives sixteenth packet loss information and seventeenth packet loss information from the intermediate user plane gateway, where the sixteenth packet loss information is used to indicate a packet that is in the service flow and that is lost on the first sublink, and the seventeenth packet loss information is used to indicate an N9 GTP-U SN of a packet that is not correctly received by the anchor user plane gateway; and the first device determines the packet loss status of the service flow on the second link based on the sixteenth packet loss information and the seventeenth packet loss information.

In a possible implementation, an N3 GTP-U SN of each packet correctly received by the intermediate user plane gateway corresponds to an N9 GTP-U SN of the packet sent by the intermediate user plane gateway, N9 GTP-U SNs of packets consecutively sent by the intermediate user plane gateway are consecutive, the sixteenth packet loss information is used to indicate an N9 GTP-U SN of a correctly received packet previous to the packet that is not correctly received by the intermediate user plane gateway on the first sublink, and the sixteenth packet loss information is further used to indicate that one packet or a plurality of consecutive packets subsequent to the packet indicated by the sixteenth packet loss information is/are lost. Alternatively, a difference between an N3 GTP-U SN of each packet correctly received by the intermediate user plane gateway and an N9 GTP-U SN of the packet sent by the intermediate user plane gateway is the same, and the sixteenth packet loss information is an N9 GTP-U SN of the packet that is not correctly received by the intermediate user plane gateway on the first sublink.

In a possible implementation, when the first device is the anchor user plane gateway, for a downlink packet, that the first device obtains the packet loss status of the service flow on the first link includes: The first device receives eighteenth packet loss information from the intermediate user plane gateway, where the eighteenth packet loss information is used to indicate an N9 GTP-U SN of a packet that is in the service flow and that is lost on the first link; and the first device determines the packet loss status of the service flow on the first link based on the eighteenth packet loss information.

In a possible implementation, when the first device is the anchor user plane gateway, for a downlink packet, that the first device obtains the packet loss status of the service flow on the second link includes: The first device receives nineteenth packet loss information from the intermediate user plane gateway, where the nineteenth packet loss information is used to indicate N9 GTP-U SNs of packets in the service flow that are lost on the first sublink and the second sublink; and the first device determines the packet loss status of the service flow on the second link based on the nineteenth packet loss information.

According to a second aspect, a communication apparatus is provided. A PDU session of a terminal is anchored to an anchor user plane gateway trough an access network device, a user plane path between the terminal and the anchor user plane gateway includes a first link and a second link, the first link is a user plane data link for communication between the terminal and the access network device, and the second link is a user plane data link for communication between the access network device and the anchor user plane gateway. The apparatus includes a processing unit. The processing unit is configured to obtain packet loss statuses of a service flow on the first link and the second link, where the apparatus is the access network device or the anchor user plane gateway. The processing unit is further configured to determine a quantity of consecutive lost packets of the service flow on the user plane path based on the packet loss statuses of the service flow on the first link and the second link. When the quantity of consecutive lost packets of the service flow on the user plane path reaches a first threshold, the processing unit is further configured to trigger enabling of a high-reliability transmission mechanism for the service flow.

In a possible implementation, the first threshold is determined based on survival time corresponding to the service flow.

In a possible implementation, that the quantity of consecutive lost packets of the service flow on the user plane path reaches a first threshold is specifically: A quantity of consecutive lost packets of the service flow on the first link in the user plane path reaches the first threshold. The processing unit is specifically configured to trigger enabling of a high-reliability transmission mechanism between the terminal and the access network device for the service flow; or the processing unit is specifically configured to trigger enabling of a high-reliability transmission mechanism between the terminal and the anchor user plane gateway for the service flow.

In a possible implementation, when the apparatus is the access network device, the apparatus further includes a communication unit. The processing unit is specifically configured to send first enabling information to the terminal through the communication unit, where the first enabling information indicates that the high-reliability transmission mechanism between the terminal and the access network device for the service flow needs to be enabled; and the processing unit is specifically configured to trigger the enabling of the high-reliability transmission mechanism between the apparatus and the terminal for the service flow.

In a possible implementation, the apparatus further includes a communication unit. The processing unit is specifically configured to send second enabling information to a session management network element through the communication unit, where the second enabling information indicates that the high-reliability transmission mechanism between the terminal and the access network device for the service flow needs to be enabled.

In a possible implementation, that the quantity of consecutive lost packets of the service flow on the user plane path reaches a first threshold is specifically: A quantity of consecutive lost packets of the service flow on the second link in the user plane path reaches the first threshold. The processing unit is specifically configured to trigger enabling of a high-reliability transmission mechanism between the anchor user plane gateway and the access network device for the service flow; or the processing unit is specifically configured to trigger enabling of a high-reliability transmission mechanism between the terminal and the anchor user plane gateway for the service flow.

In a possible implementation, when the apparatus is the access network device, the apparatus further includes a communication unit. The processing unit is specifically configured to send third enabling information to the anchor user plane gateway through the communication unit, where the third enabling information indicates that the high-reliability transmission mechanism between the anchor user plane gateway and the access network device for the service flow needs to be enabled; and the processing unit is specifically configured to trigger the enabling of the high-reliability transmission mechanism between the apparatus and the anchor user plane gateway for the service flow.

In a possible implementation, when the apparatus is the anchor user plane gateway, the apparatus further includes a communication unit. The processing unit is specifically configured to send fourth enabling information to the access network device through the communication unit, where the fourth enabling information indicates that the high-reliability transmission mechanism between the anchor user plane gateway and the access network device for the service flow needs to be enabled; and the processing unit is specifically configured to trigger the enabling of the high-reliability transmission mechanism between the apparatus and the access network device for the service flow.

In a possible implementation, the apparatus further includes a communication unit. The processing unit is specifically configured to send fifth enabling information to a session management network element through the communication unit, where the fifth enabling information indicates that the high-reliability transmission mechanism between the anchor user plane gateway and the access network device for the service flow needs to be enabled.

In a possible implementation, that the quantity of consecutive lost packets of the service flow on the user plane path reaches a first threshold is specifically: A quantity of consecutive lost packets of the service flow on the first link in the user plane path is less than the first threshold, a quantity of consecutive lost packets of the service flow on the second link is less than the first threshold, and a total quantity of consecutive lost packets of the service flow on the first link and the second link reaches the first threshold. The processing unit is specifically configured to trigger enabling of a high-reliability transmission mechanism between the terminal and the anchor user plane gateway for the service flow.

In a possible implementation, the apparatus further includes a communication unit. The processing unit is specifically configured to send sixth enabling information to a session management network element through the communication unit, where the sixth enabling information indicates that the high-reliability transmission mechanism between the terminal and the anchor user plane gateway for the service flow needs to be enabled.

In a possible implementation, the apparatus is the access network device. The processing unit is specifically configured to determine the quantity of consecutive lost packets of the service flow on the user plane path based on a PDCP SN of a packet that is in the service flow and that is lost on the first link, an N3 GTP-U SN of a packet that is in the service flow and that is lost on the second link, and a mapping relationship between a PDCP SN and an N3 GTP-U SN of a packet in the service flow.

In a possible implementation, when the apparatus is the access network device, for an uplink packet, the communication unit is configured to receive the packet in the service flow from the terminal; and the processing unit is specifically configured to determine the packet loss status of the service flow on the first link based on consecutiveness of PDCP SNs of correctly received packets. Alternatively, the communication unit is configured to receive the packet in the service flow from the terminal; the communication unit is further configured to send an ACK to the terminal for each correctly received packet; the communication unit is further configured to receive first packet loss information from the terminal, where the first packet loss information is used to indicate a PDCP SN of a packet that is not correctly received by the apparatus; and the processing unit is specifically configured to determine the packet loss status of the service flow on the first link based on the first packet loss information.

In a possible implementation, when the apparatus is the access network device, for an uplink packet, the communication unit is configured to receive second packet loss information from the anchor user plane gateway, where the second packet loss information is used to indicate an N3 GTP-U SN of a packet that is not correctly received by the anchor user plane gateway; and the processing unit is specifically configured to determine the packet loss status of the service flow on the second link based on the second packet loss information. Alternatively, the communication unit is configured to send the packet in the service flow to the anchor user plane gateway; the communication unit is further configured to receive, from the anchor user plane gateway, an ACK sent by the anchor user plane gateway for each correctly received packet; and the processing unit is specifically configured to determine the packet loss status of the service flow on the second link based on depending on whether an ACK for each sent packet is received.

In a possible implementation, when the apparatus is the access network device, for a downlink packet, the communication unit is configured to receive third packet loss information from the terminal, where the third packet loss information is used to indicate a PDCP SN of a packet that is not correctly received by the terminal; and the processing unit is specifically configured to determine the packet loss status of the service flow on the first link based on the third packet loss information. Alternatively, the communication unit is configured to send the packet in the service flow to the terminal; the communication unit is further configured to receive, from the terminal, an ACK sent by the terminal for each correctly received packet; and the processing unit is specifically configured to determine the packet loss status of the service flow on the first link based on depending on whether an ACK for each sent packet is received.

In a possible implementation, when the apparatus is the access network device, for a downlink packet, the communication unit is configured to receive the packet in the service flow from the anchor user plane gateway; and the processing unit is specifically configured to determine the packet loss status of the service flow on the second link based on consecutiveness of N3 GTP-U SNs of correctly received packets. Alternatively, the communication unit is configured to receive the packet in the service flow from the anchor user plane gateway; the communication unit is further configured to send an ACK to the anchor user plane gateway for each correctly received packet; the communication unit is further configured to receive fourth packet loss information from the anchor user plane gateway, where the fourth packet loss information is used to indicate an N3 GTP-U SN of a packet that is not correctly received by the apparatus; and the processing unit is specifically configured to determine the packet loss status of the service flow on the second link based on the fourth packet loss information.

In a possible implementation, when the apparatus is the anchor user plane gateway, for an uplink packet, the communication unit is configured to receive fifth packet loss information from the access network device, where the fifth packet loss information is used to indicate a packet that is in the service flow and that is lost on the first link; and the processing unit is specifically configured to determine the packet loss status of the service flow on the first link based on the fifth packet loss information.

In a possible implementation, a PDCP SN of each packet correctly received by the access network device corresponds to an N3 GTP-U SN of the packet sent by the access network device, N3 GTP-U SNs of packets consecutively sent by the access network device are consecutive, the fifth packet loss information is used to indicate an N3 GTP-U SN of a correctly received packet previous to the packet that is not correctly received by the access network device on the first link, and the fifth packet loss information is further used to indicate that one packet or a plurality of consecutive packets subsequent to the packet indicated by the fifth packet loss information is/are lost. Alternatively, a difference between a PDCP SN of each packet correctly received by the access network device and an N3 GTP-U SN of the packet sent by the access network device is the same, and the fifth packet loss information is an N3 GTP-U SN of a packet that is not correctly received by the access network device on the first link.

In a possible implementation, when the apparatus is the anchor user plane gateway, for an uplink packet, the communication unit is configured to receive the packet in the service flow from the access network device; and the processing unit is specifically configured to determine the packet loss status of the service flow on the second link based on consecutiveness of N3 GTP-U SNs of correctly received packets. Alternatively, the communication unit is configured to receive the packet in the service flow from the access network device; the communication unit is further configured to send an ACK to the access network device for each correctly received packet; the communication unit is further configured to receive sixth packet loss information from the access network device, where the sixth packet loss information is used to indicate an N3 GTP-U SN of a packet that is not correctly received by the apparatus; and the processing unit is specifically configured to determine the packet loss status of the service flow on the second link based on the sixth packet loss information.

In a possible implementation, when the apparatus is the anchor user plane gateway, for a downlink packet, the communication unit is configured to receive seventh packet loss information from the access network device, where the seventh packet loss information is used to indicate an N3 GTP-U SN of a packet that is in the service flow and that is lost on the first link; and the processing unit is specifically configured to determine the packet loss status of the service flow on the first link based on the seventh packet loss information.

In a possible implementation, when the apparatus is the anchor user plane gateway, for a downlink packet, the communication unit is configured to receive eighth packet loss information from the access network device, where the eighth packet loss information is used to indicate an N3 GTP-U SN of a packet that is not correctly received by the access network device; and the processing unit is specifically configured to determine the packet loss status of the service flow on the second link based on the eighth packet loss information. Alternatively, the communication unit is configured to send the packet in the service flow to the access network device; the communication unit is further configured to receive, from the access network device, an ACK sent by the access network device for each correctly received packet; and the processing unit is specifically configured to determine the packet loss status of the service flow on the second link based on depending on whether an ACK for each sent packet is received.

In a possible implementation, the anchor user plane gateway communicates with the access network device through an intermediate user plane gateway, the second link includes a first sublink and a second sublink, the first sublink is a user plane data link for communication between the access network device and the intermediate user plane gateway, and the second sublink is a user plane data link for communication between the intermediate user plane gateway and the anchor user plane gateway.

In a possible implementation, that the quantity of consecutive lost packets of the service flow on the user plane path reaches a first threshold is specifically: A quantity of consecutive lost packets of the service flow on the first link in the user plane path is less than the first threshold, a quantity of consecutive lost packets of the service flow on the first sublink is less than the first threshold, a quantity of consecutive lost packets of the service flow on the second sublink is also less than the first threshold, and a total quantity of consecutive lost packets of the service flow on any two or all of the first link, the first sublink, and the second sublink reaches the first threshold. The processing unit is specifically configured to trigger enabling of a high-reliability transmission mechanism between the terminal and the anchor user plane gateway for the service flow.

In a possible implementation, the apparatus further includes a communication unit. The processing unit is configured to send seventh enabling information to a session management network element through the communication unit, where the seventh enabling information indicates that the high-reliability transmission mechanism between the terminal and the anchor user plane gateway for the service flow needs to be enabled.

In a possible implementation, when the apparatus is the access network device, for an uplink packet, the communication unit is configured to receive the packet in the service flow from the terminal; and the processing unit is specifically configured to determine the packet loss status of the service flow on the first link based on consecutiveness of PDCP SNs of correctly received packets. Alternatively, the communication unit is configured to receive the packet in the service flow from the terminal; the communication unit is further configured to send an ACK to the terminal for each correctly received packet; the communication unit is further configured to receive ninth packet loss information from the terminal, where the ninth packet loss information is used to indicate a PDCP SN of a packet that is not correctly received by the apparatus; and the processing unit is specifically configured to determine the packet loss status of the service flow on the first link based on the ninth packet loss information.

In a possible implementation, when the apparatus is the access network device, for an uplink packet, the communication unit is configured to receive tenth packet loss information from the intermediate user plane gateway, where the tenth packet loss information is used to indicate an N3 GTP-U SN of a packet that is not correctly received by the intermediate user plane gateway on the first sublink and an N3 GTP-U SN of a packet that is not correctly received by the anchor user plane gateway on the second sublink; and the processing unit is specifically configured to determine the packet loss status of the service flow on the second link based on the tenth packet loss information. Alternatively, the communication unit is configured to send the packet in the service flow to the intermediate user plane gateway; the communication unit is further configured to receive, from the intermediate user plane gateway, an ACK sent by the intermediate user plane gateway for each correctly received packet; the processing unit is specifically configured to determine a packet loss status of the service flow on the first sublink based on depending on whether an ACK for each sent packet is received; the communication unit is further configured to receive eleventh packet loss information from the intermediate user plane gateway, where the eleventh packet loss information is used to indicate an N3 GTP-U SN of a packet that is not correctly received by the anchor user plane gateway on the second sublink; and the processing unit is specifically configured to determine the packet loss status of the service flow on the second link based on the eleventh packet loss information and the packet loss status of the service flow on the first sublink.

In a possible implementation, when the apparatus is the access network device, for a downlink packet, the communication unit is configured to receive twelfth packet loss information from the terminal, where the twelfth packet loss information is used to indicate a PDCP SN of a packet that is not correctly received by the terminal; and the processing unit is specifically configured to determine the packet loss status of the service flow on the first link based on the twelfth packet loss information. Alternatively, the communication unit is configured to send the packet in the service flow to the terminal; the communication unit is further configured to receive, from the terminal, an ACK sent by the terminal for each correctly received packet; and the processing unit is specifically configured to determine the packet loss status of the service flow on the first link based on depending on whether an ACK for each sent packet is received.

In a possible implementation, when the apparatus is the access network device, for a downlink packet, the communication unit is configured to receive the packet in the service flow from the intermediate user plane gateway; the processing unit is specifically configured to determine, based on consecutiveness of N3 GTP-U SNs of correctly received packets, an N3 GTP-U SN of a packet that is not correctly received by the apparatus on the first sublink; the communication unit is further configured to receive thirteenth packet loss information from the intermediate user plane gateway, where the thirteenth packet loss information is used to indicate a packet that is not correctly received by the intermediate user plane gateway on the second sublink; and the processing unit is specifically configured to determine the packet loss status of the service flow on the second link based on the thirteenth packet loss information and the N3 GTP-U SN of the packet that is not correctly received by the apparatus on the first sublink. Alternatively, the communication unit is configured to receive the packet in the service flow from the intermediate user plane gateway; the communication unit is further configured to send an ACK to the intermediate user plane gateway for each correctly received packet; the communication unit is further configured to receive thirteenth packet loss information and fourteenth packet loss information from the intermediate user plane gateway, where the thirteenth packet loss information is used to indicate a packet that is not correctly received by the intermediate user plane gateway on the second sublink, and the fourteenth packet loss information is used to indicate an N3 GTP-U SN of a packet that is not correctly received by the apparatus on the first sublink; and the processing unit is specifically configured to determine the packet loss status of the service flow on the second link based on the thirteenth packet loss information and the fourteenth packet loss information.

In a possible implementation, an N9 GTP-U SN of each packet correctly received by the intermediate user plane gateway corresponds to an N3 GTP-U SN of the packet sent by the intermediate user plane gateway, N3 GTP-U SNs of packets consecutively sent by the intermediate user plane gateway are consecutive, the thirteenth packet loss information is used to indicate an N3 GTP-U SN of a correctly received packet previous to the packet that is not correctly received by the intermediate user plane gateway on the second sublink, and the thirteenth packet loss information is further used to indicate that one packet or a plurality of consecutive packets subsequent to the packet indicated by the thirteenth packet loss information is/are lost. Alternatively, a difference between an N9 GTP-U SN of each packet correctly received by the intermediate user plane gateway and an N3 GTP-U SN of the packet sent by the intermediate user plane gateway is the same, and the thirteenth packet loss information is an N3 GTP-U SN of the packet that is not correctly received by the intermediate user plane gateway on the second sublink.

In a possible implementation, when the apparatus is the anchor user plane gateway, for an uplink packet, the communication unit is configured to receive fifteenth packet loss information from the intermediate user plane gateway, where the fifteenth packet loss information is used to indicate a packet that is in the service flow and that is lost on the first link; and the processing unit is specifically configured to determine the packet loss status of the service flow on the first link based on the fifteenth packet loss information.

In a possible implementation, a PDCP SN of each packet correctly received by the access network device corresponds to an N3 GTP-U SN of the packet sent by the access network device, N3 GTP-U SNs of packets consecutively sent by the access network device are consecutive, the fifteenth packet loss information is used to indicate an N9 GTP-U SN of a correctly received packet previous to the packet that is not correctly received by the access network device on the first link, and the fifteenth packet loss information is further used to indicate that one packet or a plurality of consecutive packets subsequent to the packet indicated by the fifteenth packet loss information is/are lost. Alternatively, a difference between a PDCP SN of each packet correctly received by the access network device and an N3 GTP-U SN of the packet sent by the access network device is the same, a difference between an N3 GTP-U SN of each packet correctly received by the intermediate user plane gateway and an N9 GTP-U SN of the packet sent by the intermediate user plane gateway is the same, and the fifteenth packet loss information is an N9 GTP-U SN of the packet that is not correctly received by the access network device on the first link.

In a possible implementation, when the apparatus is the anchor user plane gateway, for an uplink packet, the communication unit is configured to receive sixteenth packet loss information from the intermediate user plane gateway, where the sixteenth packet loss information is used to indicate a packet that is in the service flow and that is lost on the first sublink; the communication unit is further configured to receive the packet in the service flow from the intermediate user plane gateway; the processing unit is specifically configured to determine a packet loss status of the service flow on the second sublink based on consecutiveness of N9 GTP-U SNs of correctly received packets; and the processing unit is specifically configured to determine the packet loss status of the service flow on the second link based on the sixteenth packet loss information and the packet loss status of the service flow on the second sublink. Alternatively, the communication unit is configured to receive the packet in the service flow from the intermediate user plane gateway; the communication unit is further configured to send an ACK to the intermediate user plane gateway for each correctly received packet; the communication unit is further configured to receive sixteenth packet loss information and seventeenth packet loss information from the intermediate user plane gateway, where the sixteenth packet loss information is used to indicate a packet that is in the service flow and that is lost on the first sublink, and the seventeenth packet loss information is used to indicate an N9 GTP-U SN of a packet that is not correctly received by the anchor user plane gateway; and the processing unit is specifically configured to determine the packet loss status of the service flow on the second link based on the sixteenth packet loss information and the seventeenth packet loss information.

In a possible implementation, an N3 GTP-U SN of each packet correctly received by the intermediate user plane gateway corresponds to an N9 GTP-U SN of the packet sent by the intermediate user plane gateway, N9 GTP-U SNs of packets consecutively sent by the intermediate user plane gateway are consecutive, the sixteenth packet loss information is used to indicate an N9 GTP-U SN of a correctly received packet previous to the packet that is not correctly received by the intermediate user plane gateway on the first sublink, and the sixteenth packet loss information is further used to indicate that one packet or a plurality of consecutive packets subsequent to the packet indicated by the sixteenth packet loss information is/are lost. Alternatively, a difference between an N3 GTP-U SN of each packet correctly received by the intermediate user plane gateway and an N9 GTP-U SN of the packet sent by the intermediate user plane gateway is the same, and the sixteenth packet loss information is an N9 GTP-U SN of the packet that is not correctly received by the intermediate user plane gateway on the first sublink.

In a possible implementation, when the apparatus is the anchor user plane gateway, for a downlink packet, the communication unit is configured to receive eighteenth packet loss information from the intermediate user plane gateway, where the eighteenth packet loss information is used to indicate an N9 GTP-U SN of a packet that is in the service flow and that is lost on the first link; and the processing unit is specifically configured to determine the packet loss status of the service flow on the first link based on the eighteenth packet loss information.

In a possible implementation, when the apparatus is the anchor user plane gateway, for a downlink packet, the communication unit is configured to receive nineteenth packet loss information from the intermediate user plane gateway, where the nineteenth packet loss information is used to indicate N9 GTP-U SNs of packets in the service flow that are lost on the first sublink and the second sublink; and the processing unit is specifically configured to determine the packet loss status of the service flow on the second link based on the nineteenth packet loss information.

According to a third aspect, a communication apparatus is provided, and includes a processor. The processor is connected to a memory, the memory is configured to store computer-executable instructions, and the processor executes the computer-executable instructions stored in the memory, to implement any method provided in the first aspect. The memory and the processor may be integrated together, or may be independent components. If the memory and the processor are independent components, the memory may be located inside the communication apparatus, or may be located outside the communication apparatus.

In a possible implementation, the processor includes a logic circuit, and further includes at least one of an input interface and an output interface. The output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected via the communication bus. The communication interface is configured to perform receiving and sending actions in the corresponding method. The communication interface may also be referred to as a transceiver. Optionally, the communication interface includes at least one of a transmitter and a receiver. In this case, the transmitter is configured to perform the sending action in the corresponding method, and the receiver is configured to perform the receiving action in the corresponding method.

In a possible implementation, the communication apparatus exists in a product form of a chip.

According to a fourth aspect, a computer-readable storage medium is provided, and includes instructions. When the instructions are run on a computer, the computer is enabled to perform any method provided in the first aspect.

According to a fifth aspect, a computer program product including instructions is provided. When the instructions are run on a computer, the computer is enabled to perform any method provided in the first aspect.

According to a sixth aspect, a communication system is provided. The communication system includes an access network device and a session management network element. A PDU session of a terminal is anchored to an anchor user plane gateway through the access network device, a user plane path between the terminal and the anchor user plane gateway includes a first link and a second link, the first link is a user plane data link for communication between the terminal and the access network device, and the second link is a user plane data link for communication between the access network device and the anchor user plane gateway. The session management network element is configured to send information about survival time corresponding to a service flow to a first device, where the first device is the access network device or the anchor user plane gateway. The first device is configured to receive the information about the survival time from the session management network element, and determine a first threshold based on the information about the survival time. The first device is further configured to obtain packet loss statuses of the service flow on the first link and the second link. The first device is further configured to determine a quantity of consecutive lost packets of the service flow on the user plane path based on the packet loss statuses of the service flow on the first link and the second link. When the quantity of consecutive lost packets of the service flow on the user plane path reaches the first threshold, the first device is further configured to trigger enabling of a high-reliability transmission mechanism for the service flow.

In a possible implementation, that the quantity of consecutive lost packets of the service flow on the user plane path reaches the first threshold is specifically: A quantity of consecutive lost packets of the service flow on the first link in the user plane path reaches the first threshold. The first device is specifically configured to trigger enabling of a high-reliability transmission mechanism between the terminal and the access network device for the service flow; or the first device is specifically configured to trigger enabling of a high-reliability transmission mechanism between the terminal and the anchor user plane gateway for the service flow.

In a possible implementation, when the first device is the access network device, the first device is specifically configured to send first enabling information to the terminal, and trigger the first device to enable the high-reliability transmission mechanism between the first device and the terminal for the service flow, where the first enabling information indicates that the high-reliability transmission mechanism between the terminal and the access network device for the service flow needs to be enabled. The terminal is configured to receive the first enabling information from the first device, and enable the high-reliability transmission mechanism between the terminal and the access network device for the service flow based on the first enabling information.

In a possible implementation, the first device is specifically configured to send second enabling information to the session management network element, where the second enabling information indicates that the high-reliability transmission mechanism between the terminal and the access network device for the service flow needs to be enabled. The session management network element is configured to receive the second enabling information from the first device, and control the enabling of the high-reliability transmission mechanism between the terminal and the access network device for the service flow based on the second enabling information.

In a possible implementation, that the quantity of consecutive lost packets of the service flow on the user plane path reaches the first threshold is specifically: A quantity of consecutive lost packets of the service flow on the second link in the user plane path reaches the first threshold. The first device is specifically configured to trigger enabling of a high-reliability transmission mechanism between the anchor user plane gateway and the access network device for the service flow; or the first device is specifically configured to trigger enabling of a high-reliability transmission mechanism between the terminal and the anchor user plane gateway for the service flow.

In a possible implementation, when the first device is the access network device, the first device is specifically configured to send third enabling information to the anchor user plane gateway, and trigger the first device to enable the high-reliability transmission mechanism between the first device and the anchor user plane gateway for the service flow, where the third enabling information indicates that the high-reliability transmission mechanism between the anchor user plane gateway and the access network device for the service flow needs to be enabled. The anchor user plane gateway is configured to receive the third enabling information from the first device, and enable the high-reliability transmission mechanism between the anchor user plane gateway and the access network device for the service flow based on the third enabling information.

In a possible implementation, when the first device is the anchor user plane gateway, the first device is specifically configured to send fourth enabling information to the access network device, and trigger the first device to enable the high-reliability transmission mechanism between the first device and the access network device for the service flow, where the fourth enabling information indicates that the high-reliability transmission mechanism between the anchor user plane gateway and the access network device for the service flow needs to be enabled. The access network device is configured to receive the fourth enabling information from the first device, and enable the high-reliability transmission mechanism between the access network device and the anchor user plane gateway for the service flow based on the fourth enabling information.

In a possible implementation, the first device is specifically configured to send fifth enabling information to the session management network element, where the fifth enabling information indicates that the high-reliability transmission mechanism between the anchor user plane gateway and the access network device for the service flow needs to be enabled. The session management network element is configured to receive the fifth enabling information from the first device, and control the enabling of the high-reliability transmission mechanism between the anchor user plane gateway and the access network device for the service flow based on the fifth enabling information.

In a possible implementation, that the quantity of consecutive lost packets of the service flow on the user plane path reaches the first threshold is specifically: A quantity of consecutive lost packets of the service flow on the first link in the user plane path is less than the first threshold, a quantity of consecutive lost packets of the service flow on the second link is less than the first threshold, and a total quantity of consecutive lost packets of the service flow on the first link and the second link reaches the first threshold. The first device is specifically configured to trigger enabling of a high-reliability transmission mechanism between the terminal and the anchor user plane gateway for the service flow.

In a possible implementation, the first device is specifically configured to send sixth enabling information to the session management network element, where the sixth enabling information indicates that the high-reliability transmission mechanism between the terminal and the anchor user plane gateway for the service flow needs to be enabled. The session management network element is configured to receive the sixth enabling information from the first device, and control the enabling of the high-reliability transmission mechanism between the terminal and the anchor user plane gateway for the service flow based on the sixth enabling information.

In a possible implementation, the first device is the access network device. The first device is configured to determine the quantity of consecutive lost packets of the service flow on the user plane path based on a PDCP SN of a packet that is in the service flow and that is lost on the first link, an N3 GTP-U SN of a packet that is in the service flow and that is lost on the second link, and a mapping relationship between a PDCP SN and an N3 GTP-U SN of a packet in the service flow.

In a possible implementation, when the first device is the access network device, for an uplink packet, the terminal is configured to send the packet in the service flow to the access network device; and the access network device is configured to receive the packet in the service flow from the terminal, and determine the packet loss status of the service flow on the first link based on consecutiveness of PDCP SNs of correctly received packets.

In a possible implementation, when the first device is the access network device, for an uplink packet, the terminal is configured to send the packet in the service flow to the access network device; the access network device is configured to receive the packet in the service flow from the terminal, and send an ACK to the terminal for each correctly received packet; the terminal is further configured to receive, from the access network device, the ACK sent by the access network device to the terminal for each correctly received packet, and send first packet loss information to the access network device based on depending on whether an ACK for each sent packet is received, where the first packet loss information is used to indicate a PDCP SN of a packet that is not correctly received by the access network device; and the access network device is further configured to receive the first packet loss information from the terminal, and determine the packet loss status of the service flow on the first link based on the first packet loss information.

In a possible implementation, when the first device is the access network device, for an uplink packet, the anchor user plane gateway is configured to send second packet loss information to the access network device, where the second packet loss information is used to indicate an N3 GTP-U SN of a packet that is not correctly received by the anchor user plane gateway; and the access network device is configured to receive the second packet loss information from the anchor user plane gateway, and determine the packet loss status of the service flow on the second link based on the second packet loss information.

In a possible implementation, when the first device is the access network device, for an uplink packet, the access network device is configured to send the packet in the service flow to the anchor user plane gateway; the anchor user plane gateway is configured to receive the packet in the service flow from the access network device, and send an ACK to the access network device for each correctly received packet; and the access network device is further configured to receive, from the anchor user plane gateway, the ACK sent by the anchor user plane gateway for each correctly received packet, and determine the packet loss status of the service flow on the second link based on depending on whether an ACK for each sent packet is received.

In a possible implementation, when the first device is the access network device, for a downlink packet, the terminal is configured to send third packet loss information to the access network device, where the third packet loss information is used to indicate a PDCP SN of a packet that is not correctly received by the terminal; and the access network device is configured to receive the third packet loss information from the terminal, and determine the packet loss status of the service flow on the first link based on the third packet loss information.

In a possible implementation, when the first device is the access network device, for a downlink packet, the access network device is configured to send the packet in the service flow to the terminal; the terminal is configured to receive the packet in the service flow from the access network device, and send an ACK to the access network device for each correctly received packet; and the access network device is further configured to receive, from the terminal, the ACK sent by the terminal for each correctly received packet, and determine the packet loss status of the service flow on the first link based on depending on whether an ACK for each sent packet is received.

In a possible implementation, when the first device is the access network device, for a downlink packet, the anchor user plane gateway is configured to send the packet in the service flow to the access network device; and the access network device is configured to receive the packet in the service flow from the anchor user plane gateway, and determine the packet loss status of the service flow on the second link based on consecutiveness of N3 GTP-U SNs of correctly received packets.

In a possible implementation, for a downlink packet, the anchor user plane gateway is configured to send the packet in the service flow to the access network device; the access network device is configured to receive the packet in the service flow from the anchor user plane gateway, and send an ACK to the anchor user plane gateway for each correctly received packet; the anchor user plane gateway is further configured to receive, from the access network device, the ACK sent by the access network device to the anchor user plane gateway for each correctly received packet, and send fourth packet loss information to the access network device based on depending on whether an ACK for each sent packet is received, where the fourth packet loss information is used to indicate an N3 GTP-U SN of a packet that is not correctly received by the access network device; and the access network device is further configured to receive the fourth packet loss information from the anchor user plane gateway, and determine the packet loss status of the service flow on the second link based on the fourth packet loss information.

In a possible implementation, when the first device is the anchor user plane gateway, for an uplink packet, the access network device is configured to send fifth packet loss information to the anchor user plane gateway, where the fifth packet loss information is used to indicate a packet that is in the service flow and that is lost on the first link; and the anchor user plane gateway is configured to receive the fifth packet loss information from the access network device, and determine the packet loss status of the service flow on the first link based on the fifth packet loss information.

In a possible implementation, a PDCP SN of each packet correctly received by the access network device corresponds to an N3 GTP-U SN of the packet sent by the access network device, N3 GTP-U SNs of packets consecutively sent by the access network device are consecutive, the fifth packet loss information is used to indicate an N3 GTP-U SN of a correctly received packet previous to the packet that is not correctly received by the access network device on the first link, and the fifth packet loss information is further used to indicate that one packet or a plurality of consecutive packets subsequent to the packet indicated by the fifth packet loss information is/are lost. Alternatively, a difference between a PDCP SN of each packet correctly received by the access network device and an N3 GTP-U SN of the packet sent by the access network device is the same, and the fifth packet loss information is an N3 GTP-U SN of a packet that is not correctly received by the access network device on the first link.

In a possible implementation, when the first device is the anchor user plane gateway, for an uplink packet, the access network device is configured to send the packet in the service flow to the anchor user plane gateway; and the anchor user plane gateway is configured to receive the packet in the service flow from the access network device, and determine the packet loss status of the service flow on the second link based on consecutiveness of N3 GTP-U SNs of correctly received packets.

In a possible implementation, when the first device is the anchor user plane gateway, for an uplink packet, the access network device is configured to send the packet in the service flow to the anchor user plane gateway; the anchor user plane gateway is configured to receive the packet in the service flow from the access network device, and send an ACK to the access network device for each correctly received packet; the access network device is further configured to receive, from the anchor user plane gateway, the ACK sent by the anchor user plane gateway for each correctly received packet, and send sixth packet loss information to the anchor user plane gateway based on depending on whether an ACK for each sent packet is received, where the sixth packet loss information is used to indicate an N3 GTP-U SN of a packet that is not correctly received by the anchor user plane gateway; and the anchor user plane gateway is further configured to receive the sixth packet loss information from the access network device, and determine the packet loss status of the service flow on the second link based on the sixth packet loss information.

In a possible implementation, when the first device is the anchor user plane gateway, for a downlink packet, the access network device is configured to send seventh packet loss information to the anchor user plane gateway, where the seventh packet loss information is used to indicate an N3 GTP-U SN of a packet that is in the service flow and that is lost on the first link; and the anchor user plane gateway is configured to receive the seventh packet loss information from the access network device, and determine the packet loss status of the service flow on the first link based on the seventh packet loss information.

In a possible implementation, when the first device is the anchor user plane gateway, for a downlink packet, the access network device is configured to send eighth packet loss information to the anchor user plane gateway, where the eighth packet loss information is used to indicate an N3 GTP-U SN of a packet that is not correctly received by the access network device; and the anchor user plane gateway is configured to receive the eighth packet loss information from the access network device, and determine the packet loss status of the service flow on the second link based on the eighth packet loss information.

In a possible implementation, when the first device is the anchor user plane gateway, for a downlink packet, the anchor user plane gateway is configured to send the packet in the service flow to the access network device; the access network device is configured to receive the packet in the service flow from the anchor user plane gateway, and send an ACK to the anchor user plane gateway for each correctly received packet; and the anchor user plane gateway is further configured to receive, from the access network device, the ACK sent by the access network device for each correctly received packet, and determine the packet loss status of the service flow on the second link based on depending on whether an ACK for each sent packet is received.

In a possible implementation, the anchor user plane gateway communicates with the access network device through an intermediate user plane gateway, the second link includes a first sublink and a second sublink, the first sublink is a user plane data link for communication between the access network device and the intermediate user plane gateway, and the second sublink is a user plane data link for communication between the intermediate user plane gateway and the anchor user plane gateway.

In a possible implementation, that the quantity of consecutive lost packets of the service flow on the user plane path reaches the first threshold is specifically: A quantity of consecutive lost packets of the service flow on the first link in the user plane path is less than the first threshold, a quantity of consecutive lost packets of the service flow on the first sublink is less than the first threshold, a quantity of consecutive lost packets of the service flow on the second sublink is also less than the first threshold, and a total quantity of consecutive lost packets of the service flow on any two or all of the first link, the first sublink, and the second sublink reaches the first threshold. The first device is configured to trigger enabling of a high-reliability transmission mechanism between the terminal and the anchor user plane gateway for the service flow.

In a possible implementation, the first device is specifically configured to send seventh enabling information to the session management network element, where the seventh enabling information indicates that the high-reliability transmission mechanism between the terminal and the anchor user plane gateway for the service flow needs to be enabled. The session management network element is configured to receive the seventh enabling information from the first device, and control the enabling of the high-reliability transmission mechanism between the terminal and the anchor user plane gateway for the service flow based on the seventh enabling information.

In a possible implementation, when the first device is the access network device, for an uplink packet, the terminal is configured to send the packet in the service flow to the access network device; and the access network device is configured to receive the packet in the service flow from the terminal, and determine the packet loss status of the service flow on the first link based on consecutiveness of PDCP SNs of correctly received packets.

In a possible implementation, when the first device is the access network device, for an uplink packet, the terminal is configured to send the packet in the service flow to the access network device; the access network device is configured to receive the packet in the service flow from the terminal, and send an ACK to the terminal for each correctly received packet; the terminal is further configured to receive, from the access network device, the ACK sent by the access network device to the terminal for each correctly received packet, and send ninth packet loss information to the access network device based on depending on whether an ACK for each sent packet is received, where the ninth packet loss information is used to indicate a PDCP SN of a packet that is not correctly received by the access network device; and the access network device is further configured to receive the ninth packet loss information from the terminal, and determine the packet loss status of the service flow on the first link based on the ninth packet loss information.

In a possible implementation, when the first device is the access network device, for an uplink packet, the intermediate user plane gateway is configured to send tenth packet loss information to the access network device, where the tenth packet loss information is used to indicate an N3 GTP-U SN of a packet that is not correctly received by the intermediate user plane gateway on the first sublink and an N3 GTP-U SN of a packet that is not correctly received by the anchor user plane gateway on the second sublink; and the access network device is configured to receive the tenth packet loss information from the intermediate user plane gateway, and determine the packet loss status of the service flow on the second link based on the tenth packet loss information.

In a possible implementation, when the first device is the access network device, for an uplink packet, the access network device is configured to send the packet in the service flow to the intermediate user plane gateway; the intermediate user plane gateway is configured to receive the packet in the service flow from the access network device, and send an ACK to the access network device for each correctly received packet; the access network device is further configured to receive, from the intermediate user plane gateway, the ACK sent by the intermediate user plane gateway for each correctly received packet, and determine a packet loss status of the service flow on the first sublink based on depending on whether an ACK for each sent packet is received. The intermediate user plane gateway is further configured to send eleventh packet loss information to the access network device, where the eleventh packet loss information is used to indicate an N3 GTP-U SN of a packet that is not correctly received by the anchor user plane gateway on the second sublink; and the access network device is further configured to receive the eleventh packet loss information from the intermediate user plane gateway, and determine the packet loss status of the service flow on the second link based on the eleventh packet loss information and the packet loss status of the service flow on the first sublink.

In a possible implementation, when the first device is the access network device, for a downlink packet, the terminal is configured to send twelfth packet loss information to the access network device, where the twelfth packet loss information is used to indicate a PDCP SN of a packet that is not correctly received by the terminal; and the access network device is configured to receive the twelfth packet loss information from the terminal, and determine the packet loss status of the service flow on the first link based on the twelfth packet loss information.

In a possible implementation, when the first device is the access network device, for a downlink packet, the access network device is configured to send the packet in the service flow to the terminal; the terminal is configured to receive the packet in the service flow from the access network device, and send an ACK to the access network device for each correctly received packet; and the access network device is configured to receive, from the terminal, the ACK sent by the terminal for each correctly received packet, and determine the packet loss status of the service flow on the first link based on depending on whether an ACK for each sent packet is received.

In a possible implementation, when the first device is the access network device, for a downlink packet, the intermediate user plane gateway is configured to send the packet in the service flow to the access network device; the access network device is configured to receive the packet in the service flow from the intermediate user plane gateway, and determine, based on consecutiveness of N3 GTP-U SNs of correctly received packets, an N3 GTP-U SN of a packet that is not correctly received by the access network device on the first sublink; the intermediate user plane gateway is further configured to send thirteenth packet loss information to the access network device, where the thirteenth packet loss information is used to indicate a packet that is not correctly received by the intermediate user plane gateway on the second sublink; and the access network device is further configured to receive the thirteenth packet loss information from the intermediate user plane gateway, and determine the packet loss status of the service flow on the second link based on the thirteenth packet loss information and the N3 GTP-U SN of the packet that is not correctly received by the access network device on the first sublink.

In a possible implementation, when the first device is the access network device, for a downlink packet, the intermediate user plane gateway is configured to send the packet in the service flow to the access network device; the access network device is configured to receive the packet in the service flow from the intermediate user plane gateway, and send an ACK to the intermediate user plane gateway for each correctly received packet; the intermediate user plane gateway is further configured to receive, from the access network device, the ACK sent by the access network device to the intermediate user plane gateway for each correctly received packet, and send thirteenth packet loss information and fourteenth packet loss information to the access network device based on depending on whether an ACK for each sent packet is received, where the thirteenth packet loss information is used to indicate a packet that is not correctly received by the intermediate user plane gateway on the second sublink, and the fourteenth packet loss information is used to indicate an N3 GTP-U SN of a packet that is not correctly received by the access network device on the first sublink; and the access network device is further configured to receive the thirteenth packet loss information and the fourteenth packet loss information from the intermediate user plane gateway, and determine the packet loss status of the service flow on the second link based on the thirteenth packet loss information and the fourteenth packet loss information.

In a possible implementation, an N9 GTP-U SN of each packet correctly received by the intermediate user plane gateway corresponds to an N3 GTP-U SN of the packet sent by the intermediate user plane gateway, N3 GTP-U SNs of packets consecutively sent by the intermediate user plane gateway are consecutive, the thirteenth packet loss information is used to indicate an N3 GTP-U SN of a correctly received packet previous to the packet that is not correctly received by the intermediate user plane gateway on the second sublink, and the thirteenth packet loss information is further used to indicate that one packet or a plurality of consecutive packets subsequent to the packet indicated by the thirteenth packet loss information is/are lost. Alternatively, a difference between an N9 GTP-U SN of each packet correctly received by the intermediate user plane gateway and an N3 GTP-U SN of the packet sent by the intermediate user plane gateway is the same, and the thirteenth packet loss information is an N3 GTP-U SN of the packet that is not correctly received by the intermediate user plane gateway on the second sublink.

In a possible implementation, when the first device is the anchor user plane gateway, for an uplink packet, the intermediate user plane gateway is configured to send fifteenth packet loss information to the anchor user plane gateway, where the fifteenth packet loss information is used to indicate a packet that is in the service flow and that is lost on the first link; and the anchor user plane gateway is configured to receive the fifteenth packet loss information from the intermediate user plane gateway, and determine the packet loss status of the service flow on the first link based on the fifteenth packet loss information.

In a possible implementation, a PDCP SN of each packet correctly received by the access network device corresponds to an N3 GTP-U SN of the packet sent by the access network device, N3 GTP-U SNs of packets consecutively sent by the access network device are consecutive, the fifteenth packet loss information is used to indicate an N9 GTP-U SN of a correctly received packet previous to the packet that is not correctly received by the access network device on the first link, and the fifteenth packet loss information is further used to indicate that one packet or a plurality of consecutive packets subsequent to the packet indicated by the fifteenth packet loss information is/are lost. Alternatively, a difference between a PDCP SN of each packet correctly received by the access network device and an N3 GTP-U SN of the packet sent by the access network device is the same, a difference between an N3 GTP-U SN of each packet correctly received by the intermediate user plane gateway and an N9 GTP-U SN of the packet sent by the intermediate user plane gateway is the same, and the fifteenth packet loss information is an N9 GTP-U SN of the packet that is not correctly received by the access network device on the first link.

In a possible implementation, when the first device is the anchor user plane gateway, for an uplink packet, the intermediate user plane gateway is configured to send sixteenth packet loss information to the anchor user plane gateway, where the sixteenth packet loss information is used to indicate a packet that is in the service flow and that is lost on the first sublink; the anchor user plane gateway is configured to receive the sixteenth packet loss information from the intermediate user plane gateway; the intermediate user plane gateway is further configured to send the packet in the service flow to the anchor user plane gateway; the anchor user plane gateway is further configured to receive the packet in the service flow from the intermediate user plane gateway, and determine a packet loss status of the service flow on the second sublink based on consecutiveness of N9 GTP-U SNs of correctly received packets; and the anchor user plane gateway is further configured to determine the packet loss status of the service flow on the second link based on the sixteenth packet loss information and the packet loss status of the service flow on the second sublink.

In a possible implementation, when the first device is the anchor user plane gateway, for an uplink packet, the intermediate user plane gateway is configured to send the packet in the service flow to the anchor user plane gateway; the anchor user plane gateway is configured to receive the packet in the service flow from the intermediate user plane gateway, and send an ACK to the intermediate user plane gateway for each correctly received packet; the intermediate user plane gateway is further configured to receive, from the anchor user plane gateway, the ACK sent by the anchor user plane gateway for each correctly received packet, and send sixteenth packet loss information and seventeenth packet loss information to the anchor user plane gateway based on depending on whether an ACK for each sent packet is received, where the sixteenth packet loss information is used to indicate a packet that is in the service flow and that is lost on the first sublink, and the seventeenth packet loss information is used to indicate an N9 GTP-U SN of a packet that is not correctly received by the anchor user plane gateway; and the anchor user plane gateway is further configured to receive the sixteenth packet loss information and the seventeenth packet loss information from the intermediate user plane gateway, and determine the packet loss status of the service flow on the second link based on the sixteenth packet loss information and the seventeenth packet loss information.

In a possible implementation, an N3 GTP-U SN of each packet correctly received by the intermediate user plane gateway corresponds to an N9 GTP-U SN of the packet sent by the intermediate user plane gateway, N9 GTP-U SNs of packets consecutively sent by the intermediate user plane gateway are consecutive, the sixteenth packet loss information is used to indicate an N9 GTP-U SN of a correctly received packet previous to the packet that is not correctly received by the intermediate user plane gateway on the first sublink, and the sixteenth packet loss information is further used to indicate that one packet or a plurality of consecutive packets subsequent to the packet indicated by the sixteenth packet loss information is/are lost. Alternatively, a difference between an N3 GTP-U SN of each packet correctly received by the intermediate user plane gateway and an N9 GTP-U SN of the packet sent by the intermediate user plane gateway is the same, and the sixteenth packet loss information is an N9 GTP-U SN of the packet that is not correctly received by the intermediate user plane gateway on the first sublink.

In a possible implementation, when the first device is the anchor user plane gateway, for a downlink packet, the intermediate user plane gateway is configured to send eighteenth packet loss information to the anchor user plane gateway, where the eighteenth packet loss information is used to indicate an N9 GTP-U SN of a packet that is in the service flow and that is lost on the first link; and the anchor user plane gateway is configured to receive the eighteenth packet loss information from the intermediate user plane gateway, and determine the packet loss status of the service flow on the first link based on the eighteenth packet loss information.

In a possible implementation, when the first device is the anchor user plane gateway, for a downlink packet, the intermediate user plane gateway is configured to send nineteenth packet loss information to the anchor user plane gateway, where the nineteenth packet loss information is used to indicate N9 GTP-U SNs of packets in the service flow that are lost on the first sublink and the second sublink; and the anchor user plane gateway is configured to receive the nineteenth packet loss information from the intermediate user plane gateway, and determine the packet loss status of the service flow on the second link based on the nineteenth packet loss information.

For technical effects brought by any implementation of the second aspect to the sixth aspect, refer to technical effects brought by a corresponding implementation of the first aspect. Details are not described herein again.

DESCRIPTION OF EMBODIMENTS

In descriptions of this application, unless otherwise specified, "/" means "or". For example, A/B may represent A or B. The term "and/or" in this specification describes only an association relationship for associated objects and represents that three relationships may exist. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and do not indicate a definite difference.

It should be noted that, in this application, words such as "example" or "for example" are used to represent giving an example, an illustration, or a description. Any embodiment or design scheme described as an "example" or "for example" in this application should not be explained as being more preferred or having more advantages than another embodiment or design scheme. Exactly, use of the words such as "example" or "for example" is intended to present a related concept in a specific manner.

Technical solutions provided in embodiments of this application may be applied to various communication systems such as a 5th-generation (5G) system, a new radio (NR) system, a multi-radio access technology dual connectivity (MR-DC) system, and a future evolved system, or a system converging a plurality of communication technologies. The 5G system may be a non-standalone (NSA) 5G system or a standalone (SA) 5G system.

Figure 1:
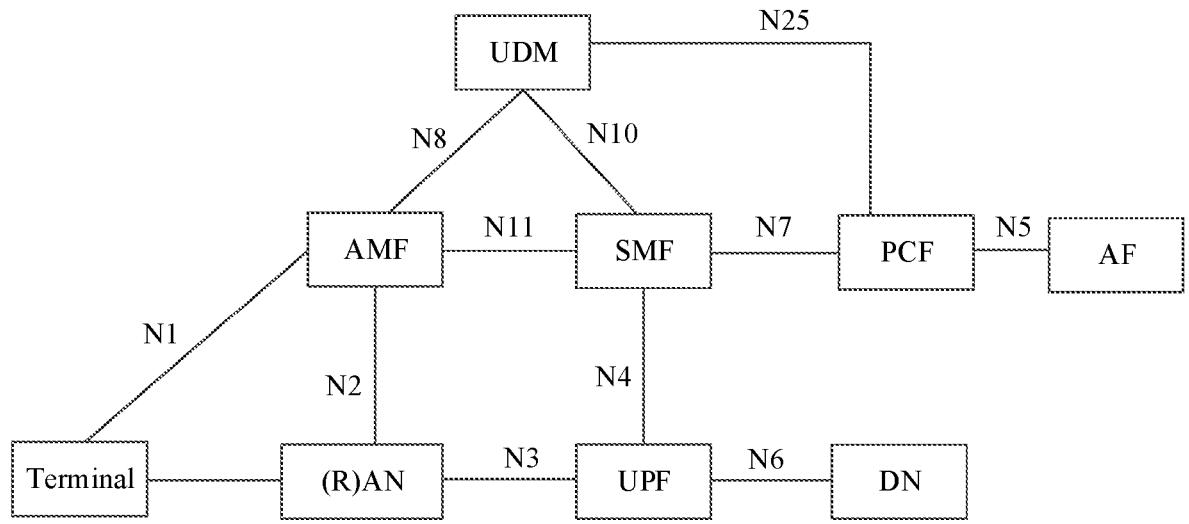
FIG. 1 to FIG. 3 are schematic composition diagrams of a network architecture according to an embodiment of this application.

FIG. 1 shows a network architecture of a 5G system to which the technical solutions provided in the embodiments of this application are applicable. The 5G system may include the following network function (NF) entities: a unified data management (UDM) entity, an access and mobility management function (AMF) entity, a session management function (SMF) entity, a policy control function (PCF) entity, an application function (AF) entity, a radio access network (RAN) or an access network (AN) (the RAN and the AN are collectively referred to as a (R)AN below) entity, a user plane function (UPF) entity, a terminal, a data network (DN), and the like. For interfaces used for communication among the NF entities, refer to FIG. 1. For example, the (R)AN communicates with the AMF through an N2 interface, and the (R)AN communicates with the UPF through an N3 interface.

The UDM has functions such as managing subscription data of a user and generating authentication information of the user.

The AMF is mainly responsible for functions such as registration management of the terminal, connection management of the terminal, reachability management of the terminal, access authorization and access authentication of the terminal, a security function of the terminal, mobility management of the terminal, network slice selection, and SMF selection. The AMF serves as an anchor of an N1/N2 interface signaling connection, provides the SMF with routing of an N1/N2 interface session management (SM) message, and maintains and manages status information of the terminal.

The SMF is mainly responsible for all control plane functions in terminal session management. The control plane functions include UPF selection and control, internet protocol (IP) address assignment and management, quality of service (QoS) management of a session, obtaining of a policy and charging control (PCC) policy from the PCF, and the like. The SMF also serves as a termination of an SM part that is in a non-access stratum (NAS) message.

The PCF has functions such as providing a policy rule for a control plane function entity.

The AF may be an application server that may belong to an operator or a third party.

The UPF serves as an anchor of a protocol data unit (PDU) session connection, and is responsible for data packet filtering, data transmission/forwarding, rate control, charging information generation, user plane QoS processing, uplink transmission authentication, transmission level verification, downlink data packet buffering, downlink data notification triggering, and the like of the terminal. The UPF may also serve as a branching point of a multi-homed PDU session.

The (R)AN is a network including a plurality of 5G-RAN nodes (referred to as RAN nodes for short below), and implements radio physical layer functions, resource scheduling and radio resource management, radio access control, and mobility management functions.

The RAN node may also be referred to as an access network device, and may be specifically a base station. There may be base stations in various forms, for example, a macro base station, a micro base station (also referred to as a small cell), a relay station, and an access point. The base station may be specifically an access point (AP) in a wireless local area network (WLAN), a base transceiver station (BTS) in global system for mobile communications (GSM) or code division multiple access (CDMA), a NodeB (NB) in wideband code division multiple access (WCDMA), an evolved NodeB (eNB or eNodeB), a relay station, an access point, a vehicle-mounted device, or a wearable device in LTE, a next generation NodeB (gNB) in a future 5G system, a base station in a future evolved public land mobile network (PLMN), or the like.

The terminal may be a device having a wireless transceiver function. The terminal may have different names, for example, a user equipment (UE), an access terminal, a terminal unit, a terminal station, a mobile station, a mobile station, a remote station, a remote terminal, a mobile device, a wireless communication device, a terminal agent, or a terminal apparatus. The terminal may be deployed on land, including an indoor or outdoor device, a handheld device, or a vehicle-mounted device, or may be deployed on a water surface (for example, on a ship), or may be deployed in air (for example, on an airplane, a balloon, or a satellite). The terminal includes a handheld device, a vehicle-mounted device, a wearable device, or a computing device that has a wireless communication function. For example, the terminal may be a mobile phone, a tablet computer, or a computer having a wireless transceiver function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, an apparatus for implementing functions of a terminal may be a terminal, or may be an apparatus, for example, a chip system, that can support the terminal in implementing the functions. In the embodiments of this application, the chip system may include a chip, or may include a chip and another discrete component. In the embodiments of this application, an example in which the apparatus for implementing the functions of the terminal is the terminal is used to describe the technical solutions provided in the embodiments of this application.

The DN is a network that provides a data transmission service for a user, for example, is an IP multimedia service (IMS) or the Internet. The DN may include an application server (AS). The AS is a software framework, provides an environment in which an application program runs, and is configured to provide the application program with services such as security, data, transaction support, load balancing, and large-scale distributed system management. The terminal communicates with the AS to obtain an application packet. It should be noted that the AF is a control plane of the AS.

It may be understood that, in addition to the function entities shown in FIG. 1, the network architecture of the 5G network may further include another function entity. For example, a network exposure function (NEF) entity may be further included between the AF entity and the PCF entity, and may be configured to exchange information inside and outside the network, and so on. In the embodiments of this application, an entity may also be referred to as a network element, a device, or the like.

It should be noted that the (R)AN entity, the AMF entity, the SMF entity, the UDM entity, the UPF entity, the PCF entity, and the like in FIG. 1 are merely names, and the names constitute no limitation on the entities. In the 5G network and other future networks, network elements or devices corresponding to these entities may alternatively have other names. This is not specifically limited in the embodiments of this application. For example, the UDM entity may be replaced with a home subscriber server (HSS), a user subscription database (USD), a database entity, or the like. Unified descriptions are provided herein, and details are not described below again.

In addition, the UDM entity, the PCF entity, the AMF entity, and the SMF entity in FIG. 1 may also be collectively referred to as control plane function (CPF) entities, and these entities belong to a 5G core network control plane (5GC CP). For ease of description, the AMF entity, the SMF entity, the UDM entity, the UPF entity, and the PCF entity are respectively denoted as the AMF, the SMF, the UDM, the UPF, and the PCF below.

In the foregoing 5G system, the terminal establishes a PDU session to the DN to perform data exchange with the DN. In a process of establishing the PDU session, the SMF selects a PDU session anchor (PSA) UPF (which may also be referred to as an "anchor UPF" for short) for the terminal.

Figure 2:
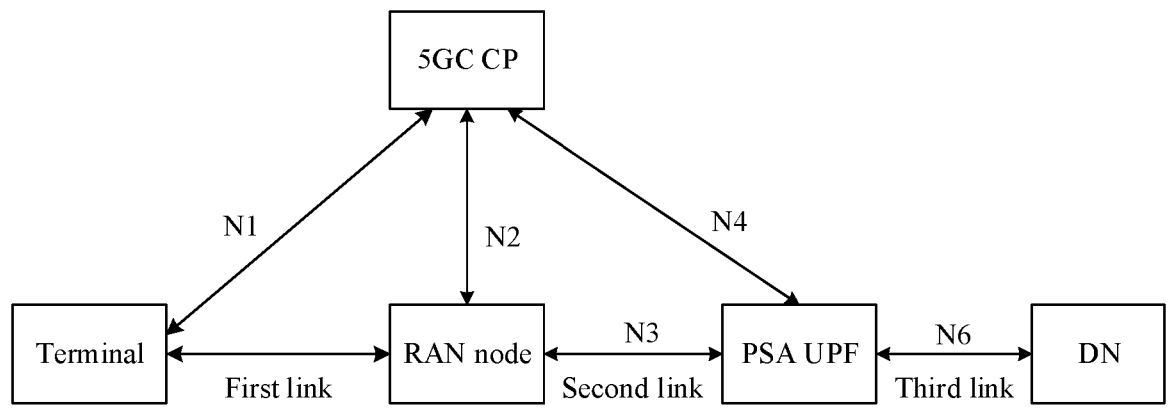

When a RAN node accessed by the terminal is in a service area of the PSA UPF, the terminal may establish a PDU session that passes through the RAN node and the PSA UPF, and perform data exchange with the DN through the PDU session. In this case, refer to FIG. 2. A user plane packet transmission path (referred to as a "user plane path" for short below) between the terminal and the DN includes a user plane path between the terminal and the RAN node (where the user plane path is denoted as a first link and corresponds to a radio bearer between the terminal and the RAN node), a user plane path between the RAN node and the PSA UPF (where the user plane path is denoted as a second link and corresponds to an N3 GTP-U tunnel between the RAN node and the PSA UPF), and a user plane path between the PSA UPF and the AS in the DN (where the user plane path is denoted as a third link and corresponds to an N6 tunnel between the PSA UPF and the AS). A scenario shown in FIG. 2 may be referred to as a single-UPF scenario for short. In this scenario, the RAN node communicates with the PSA UPF through an N3 interface, and the PSA UPF communicates with the AS in the DN through an N6 interface. A user plane path between two network nodes may also be referred to as a user plane data link.

Figure 3:
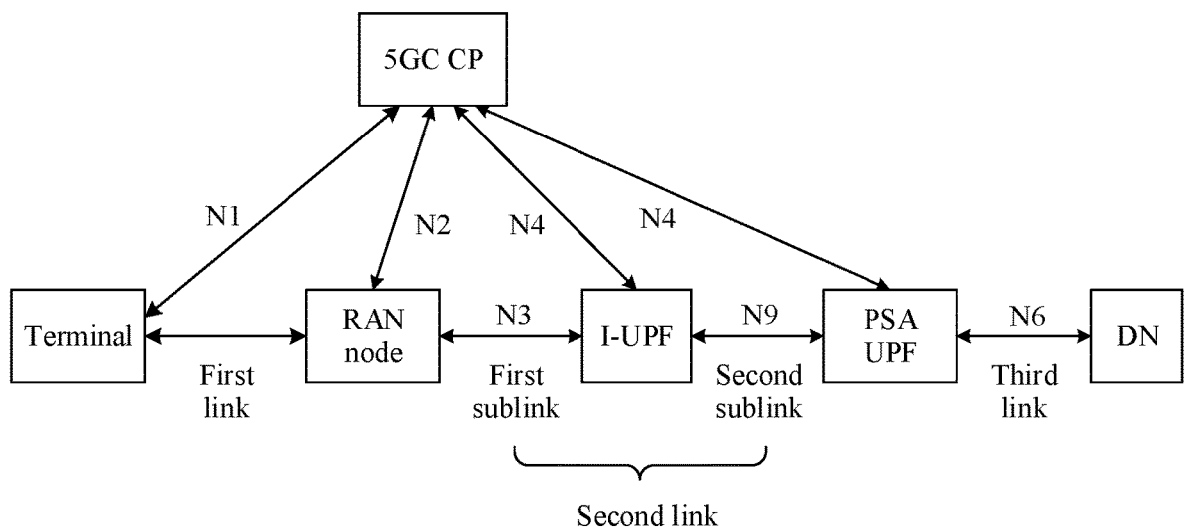

When a RAN node accessed by the terminal is not in a service area of the PSA UPF, the SMF inserts an intermediate UPF (I-UPF) between the RAN node and the PSA UPF, and the RAN node accessed by the terminal is in a service area of the I-UPF. The terminal may establish a PDU session that passes through the RAN node, the I-UPF, and the PSA UPF, and perform data exchange with the DN through the PDU session. In this case, refer to FIG. 3. A user plane path between the terminal and the DN includes a user plane path between the terminal and the RAN node (where the user plane path is denoted as a first link and corresponds to a radio bearer between the terminal and the RAN node), a user plane path between the RAN node and the PSA UPF (where the user plane path is denoted as a second link), and a user plane path between the PSA UPF and the AS in the DN (where the user plane path is denoted as a third link and corresponds to an N6 tunnel between the PSA UPF and the AS). The second link further includes a user plane path between the RAN node and the I-UPF (where the user plane path is denoted as a first sublink and corresponds to an N3 GTP-U tunnel between the RAN node and the I-UPF) and a user plane path between the I-UPF and the PSA UPF (where the user plane path is denoted as a second sublink and corresponds to an N9 GTP-U tunnel between the I-UPF and the PSA UPF). A scenario shown in FIG. 3 may be referred to as a multi-UPF scenario for short. In this scenario, the RAN node communicates with the I-UPF through an N3 interface, the I-UPF communicates with the PSA UPF through an N9 interface, and the PSA UPF communicates with the AS in the DN through an N6 interface.

A method provided in the embodiments of this application may be applied to the foregoing single-UPF scenario and multi-UPF scenario. To make the embodiments of this application clearer, the following briefly describes some concepts in the method provided in the embodiments of this application.

1. Survival Time

Survival time of an application is a time period for which the application continues to run when an application server or an application layer of a terminal receives no anticipated message. The survival time may be expressed as duration. For a periodic service, the survival time may alternatively be expressed as a maximum quantity of consecutive messages that are allowed to be lost or incorrectly received.

The message herein may also be referred to as a user plane packet, and the user plane packet is referred to as a packet for short below. In addition, the packet may also be referred to as a data packet.

2. Service Flow

The service flow in the embodiments of this application may be a QoS flow established for a service.

Because the service corresponds to an application, the service flow of the service also corresponds to survival time, and the survival time is survival time of the application corresponding to the service.

3. High-Reliability Transmission Mechanism for a User Plane Path

The high-reliability transmission mechanism for the user plane path is a mechanism that enables a packet to be transmitted with high reliability on the user plane path. For example, the high-reliability transmission mechanism for the user plane path may be a dual-path redundant transmission mechanism.

The dual-path redundant transmission mechanism includes: a redundant session-based high-reliability transmission mechanism, a redundant service flow-based high-reliability transmission mechanism, and a redundant transport layer-based high-reliability transmission mechanism.

The redundant session-based high-reliability transmission mechanism is specifically as follows: A terminal is connected to two RAN nodes by using a dual connectivity (DC) technology, and separately establishes two different PDU sessions to different PSA UPFs through the different RAN nodes. Based on the two PDU sessions, two independent redundant paths are provided for the terminal to transmit a same packet.

The redundant service flow-based high-reliability transmission mechanism is specifically: establishing two independent N3 tunnels for a single PDU session, where in this case, redundant transmission is deployed between a PSA UPF and a RAN node or between an I-UPF and a RAN node; or establishing two independent N9 tunnels for a single PDU session, where in this case, redundant transmission is deployed between a PSA UPF and an I-UPF. Based on different independent tunnels, two independent redundant paths are provided for the terminal to transmit a same packet.

The redundant transport layer-based high-reliability transmission mechanism is specifically: establishing two independent transport layer paths for a single N3 tunnel, where in this case, redundant transmission is deployed between a PSA UPF and a RAN node or between an I-UPF and a RAN node; or establishing two independent transport layer paths for a single N9 tunnel, where in this case, redundant transmission is deployed between a PSA UPF and an I-UPF. Based on different independent transport layer paths, two independent redundant paths are provided for the terminal to transmit a same packet.

The redundant service flow-based high-reliability transmission mechanism and the redundant transport layer-based high-reliability transmission mechanism are used to ensure high-reliability transmission of a packet between the RAN node and the PSA UPF.

4. PDU

In a communication network, a data unit exchanged between peer protocol layers of different network nodes is a PDU. PDU exchange between the peer protocol layers is indirectly performed through lower-level protocol layers.

Figure 4:
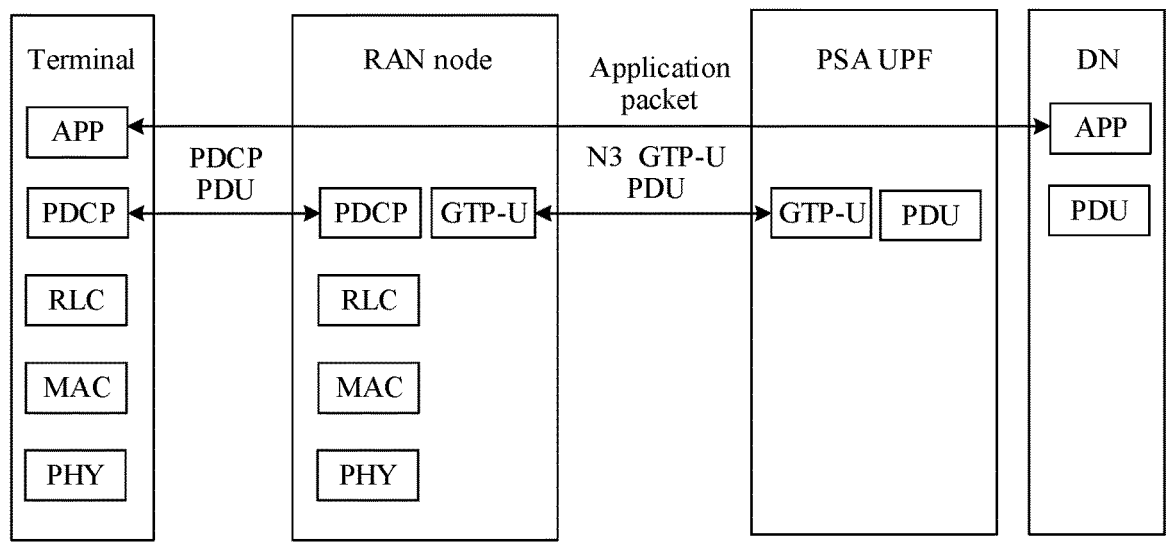
FIG. 4 and FIG. 5 are schematic diagrams of a packet transmitted on each link according to an embodiment of this application.

Refer to FIG. 4. For example, in a single-UPF scenario, a data unit exchanged between application (APP) layers of a DN and a terminal is an application packet, and a data unit exchanged between peer packet data convergence protocol (PDCP) layers of the terminal and a RAN node is a PDCP PDU. A data unit exchanged between peer general packet radio service tunneling protocol-user plane (GTP-U) layers of the RAN node and a PSA UPF is a GTP-U PDU over an N3 interface ("N3 GTP-U PDU" for short).

Figure 5:
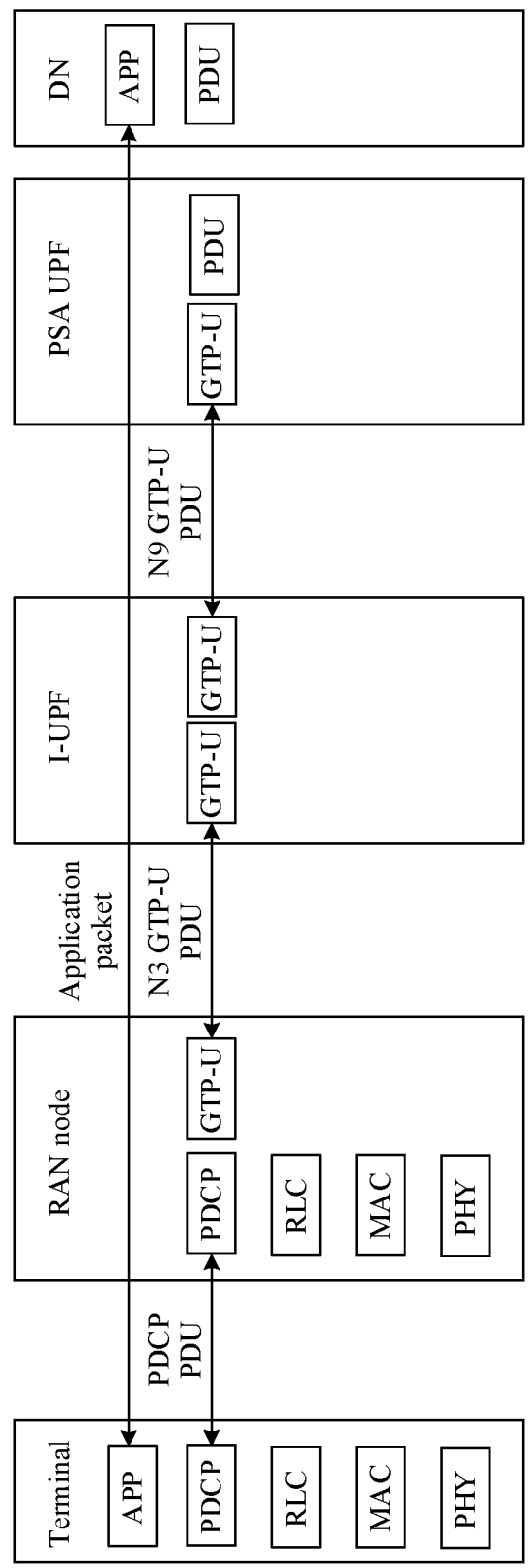

Refer to FIG. 5. For example, in a multi-UPF scenario, a data unit exchanged between APP layers of a DN and a terminal is an application packet, and a data unit exchanged between peer PDCP layers of the terminal and a RAN node is a PDCP PDU. A data unit exchanged between peer GTP-U layers of the RAN node and an I-UPF is an N3 GTP-U PDU. A data unit exchanged between peer GTP-U layers of the I-UPF and a PSA UPF is a GTP-U PDU over an N9 interface ("N9 GTP-U PDU" for short).

In FIG. 4 and FIG. 5, RLC refers to a radio link control layer, MAC refers to a media access control layer, and PHY refers to a physical layer. FIG. 4 and FIG. 5 show only some protocol layers related to this application in each network node, and each network node may further include another protocol layer. Specific included protocol layers are not limited in this application. For example, an SDAP layer may be further included above the PDCP layer of the terminal.

To prevent repetition and disorder, each PDCP PDU carries a specific number during transmission, and the number may be referred to as a PDCP SN. Similarly, numbers of the N3 GTP-U PDU and the N9 GTP-U PDU may be respectively referred to as an N3 GTP-U SN and an N9 GTP-U SN.

Packets that are transmitted between different network nodes but encapsulated with a same application packet may be considered as a same packet, but are encapsulated in different packet encapsulation manners and carry SNs of different protocol layers during transmission between the different network nodes. For example, in the single-UPF scenario, a PDCP PDU and an N3 GTP-U PDU that are encapsulated with a same application packet may be considered as a same packet, and the packet may be identified by using a PDCP SN on the first link, and may be identified by using an N3 GTP-U SN on the second link. This case is used as an example in the following descriptions of this application to describe the method provided in this application. However, it may be understood that the packets that are transmitted between the different network nodes but encapsulated with the same application packet may alternatively be considered as different packets due to different protocol layer headers. For example, a PDCP PDU and an N3 GTP-U PDU that are encapsulated with a same application packet may be considered as different packets. However, this does not affect the essence of this application, and only a corresponding replacement is required for understanding.

5. Mapping Between a PDCP SN and an N3 GTP-U SN and Mapping Between an N3 GTP-U SN and an N9 GTP-U SN Different rules may be used to number PDUs at different protocol layers. Therefore, to ensure that packets are accurately identified at the different protocol layers, SNs of the PDUs at the different protocol layers need to be mapped.

After receiving a PDCP PDU and obtaining information in the PDCP PDU through parsing, a RAN node performs re-encapsulation at a GTP-U layer to obtain an N3 GTP-U PDU, and then sends the N3 GTP-U PDU. There is a mapping relationship between a PDCP SN of the PDCP PDU and an N3 GTP-U SN of the N3 GTP-U PDU. Specifically, there is a one-to-one mapping relationship between a PDCP SN and an N3 GTP-U SN, and the PDCP SN and the N3 GTP-U SN that are in the mapping relationship correspond to a same packet. Specifically, there may be the following two mapping manners.

SN mapping manner 1: The RAN node maps PDCP SNs of correctly received PDCP PDUs to consecutive N3 GTP-U SNs. For example, if a terminal sends four PDCP PDUs to the RAN node, PDCP SNs of the four PDCP PDUs are a PDCP 1, a PDCP 2, a PDCP 3, and a PDCP 4, the RAN node correctly receives the PDCP PDUs whose PDCP SNs are the PDCP 1, the PDCP 3, and the PDCP 4, and the PDCP PDU whose PDCP SN is the PDCP 2 is lost, the RAN node may respectively map the PDCP 1, the PDCP 3, and the PDCP 4 to an N3 GTP-U 1, an N3 GTP-U 2, and an N3 GTP-U 3.

SN mapping manner 2: The RAN node maps a PDCP SN of a correctly received PDCP PDU to an N3 GTP-U SN whose difference is x (x is an integer) from the PDCP SN. For example, if x=4, and if a terminal sends four PDCP PDUs to the RAN node, PDCP SNs of the four PDCP PDUs are a PDCP 1, a PDCP 2, a PDCP 3, and a PDCP 4, the RAN node correctly receives the PDCP PDUs whose PDCP SNs are the PDCP 1, the PDCP 3, and the PDCP 4, and the PDCP PDU whose PDCP SN is the PDCP 2 is lost, the RAN node may respectively map the PDCP 1, the PDCP 3, and the PDCP 4 to an N3 GTP-U 5, an N3 GTP-U 7, and an N3 GTP-U 8.

In the SN mapping manner 2, it should be noted that a cycle range of the PDCP SN may be different from a cycle range of the N3 GTP-U SN. For example, the cycle range of the PDCP SN may be 0 to 99, that is, every 100 PDCP SNs are from 0 to 99; and the cycle range of the N3 GTP-U SN may be 0 to 199, that is, every 200 N3 GTP-U SNs are from 0 to 199.

In this case, if a cycle range of an SN whose corresponding cycle range is smaller is considered as one numbering periodicity, a value of x does not change in one numbering periodicity, and changes in different numbering periodicities. Refer to Table 1. For example, if the cycle range of the PDCP SN is 0 to 99, and the cycle range of the N3 GTP-U SN is 0 to 199, 0 to 99 corresponding to the PDCP SN is one numbering periodicity. In the first numbering periodicity, $x=0$; in the second numbering periodicity, $x=100$; in the third numbering periodicity, $x=0$; in the fourth numbering periodicity, $x=100$; and so on. In this case, for a PDCP SN of each PDCP PDU and an N3 GTP-U SN of each N3 GTP-U PDU, refer to Table 1.

TABLE 1

| Cycle range of a PDCP SN | PDCP PDU | PDCP SN | Cycle range of an N3 GTP-U SN | N3 GTP-U PDU | N3 GTP-U SN |
| --- | --- | --- | --- | --- | --- |
| 0 to 99 | First PDCP PDU | 0 | 0 to 199 | First GTP-U PDU | 0 |
|  | Second PDCP PDU | 1 |  | Second GTP-U PDU | 1 |
|  | ... | ... |  | ... | ... |
|  | 100$^{th}$ PDCP PDU | 99 |  | 100$^{th}$ GTP-U PDU | 99 |

TABLE 1-continued

| Cycle range of a PDCP SN | PDCP PDU | PDCP SN | Cycle range of an N3 GTP-U SN | N3 GTP-U PDU | N3 GTP-U SN |
|---|---|---|---|---|---|
| 0 to 99 | $101^{st}$ PDCP PDU | 0 | | $101^{st}$ GTP-U PDU | 100 |
| | $102^{nd}$ PDCP PDU | 1 | | $102^{nd}$ GTP-U PDU | 101 |
| | ... | ... | | ... | ... |
| | $200^{th}$ PDCP PDU | 99 | | $200^{th}$ GTP-U PDU | 199 |
| 0 to 99 | $201^{st}$ PDCP PDU | 0 | 0 to 199 | $201^{st}$ GTP-U PDU | 0 |
| | $202^{nd}$ PDCP PDU | 1 | | $202^{nd}$ GTP-U PDU | 1 |
| | ... | ... | | ... | ... |
| | $300^{th}$ PDCP PDU | 99 | | $300^{th}$ GTP-U PDU | 99 |
| 0 to 99 | $301^{st}$ PDCP PDU | 0 | | $301^{st}$ GTP-U PDU | 100 |
| | $302^{nd}$ PDCP PDU | 1 | | $302^{nd}$ GTP-U PDU | 101 |
| | ... | ... | | ... | ... |

In the SN mapping manner 1 and the SN mapping manner 2, the SN mapping manner 1 is an existing mapping manner, and the SN mapping manner 2 is a new mapping manner proposed in this application.

For the mapping between an N3 GTP-U SN and an N9 GTP-U SN, if a GTP-U SN is transparently transmitted between the RAN node and a PSA UPF in the multi-UPF scenario, that is, for an uplink packet, an I-UPF directly reuses the N3 GTP-U SN as the N9 GTP-U SN; and for a downlink packet, the I-UPF directly reuses the N9 GTP-U SN as the N3 GTP-U SN, an N3 GTP-U SN and an N9 GTP-U SN of a same packet are always the same. In this case, it may be considered that the SN mapping manner 2 is used for the mapping between an N3 GTP-U SN and an N9 GTP-U SN, where x=0; and a cycle range of the N3 GTP-U SN is the same as a range cycle of the N9 GTP-U SN. If a GTP-U SN is not transparently transmitted between the RAN node and a PSA UPF, that is, independent GTP-U SNs are separately used for an N3 tunnel and an N9 tunnel, the mapping between an N3 GTP-U SN and an N9 GTP-U SN is similar to the mapping between a PDCP SN and an N3 GTP-U SN. For understanding, refer to the mapping between a PDCP SN and an N3 GTP-U SN. Details are not described again.

In the embodiments of this application, "map" may also be described as "correspond". For example, "N3 GTP-U SN to which a PDCP SN is mapped" may also be described as "N3 GTP-U SN corresponding to a PDCP SN". The following uses "correspond" as an example for description.

6. Acknowledgment (ACK)

After a transmit end sends a packet to a receive end and the receive end correctly receives the packet, the receive end sends a feedback to the transmit end for the packet. The feedback may be used by the transmit end to determine that the packet is correctly received by the receive end, and the feedback is an ACK in the embodiments of this application.

A flag bit in a GTP-U layer header may be used between the RAN node and the I-UPF or between the RAN node and the PSA UPF to indicate ACK information for an N3 GTP-U PDU, and a flag bit in a GTP-U layer header may be used between the I-UPF and the PSA UPF to indicate ACK information for an N9 GTP-U PDU. A status report sent by the receive end may be used between the RAN node and the terminal to carry ACK information for a PDCP PDU.

Figure 6:
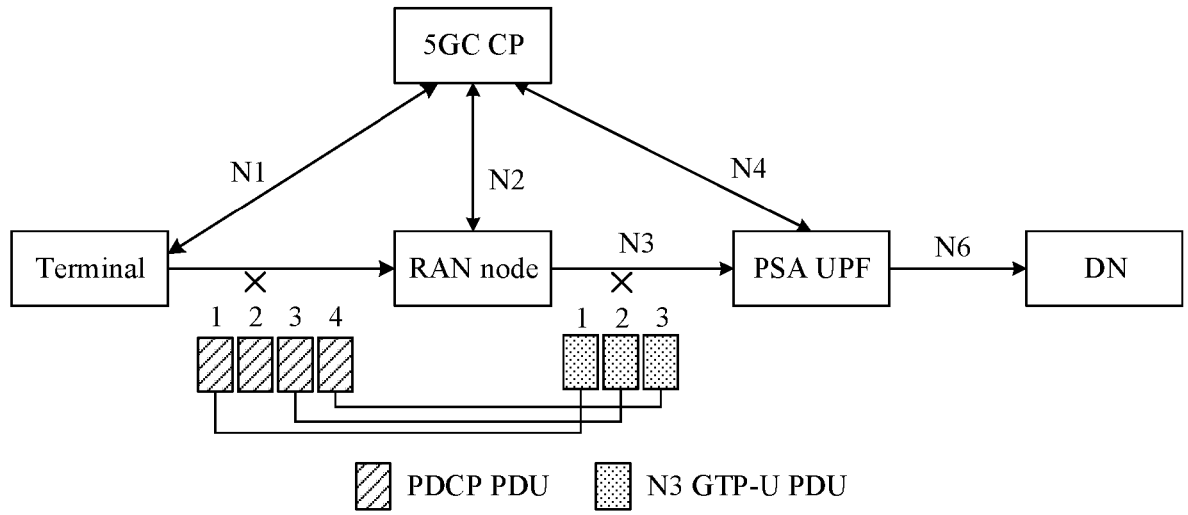
FIG. 6 is a schematic diagram of packet loss on a user plane path according to an embodiment of this application.

A problem that application shutdown causes poor user experience is mentioned in the background. In addition, on the user plane path, the RAN node or the PSA UPF cannot directly obtain a quantity of consecutive lost packets on the user plane path. Refer to FIG. 6. For example, in the existing mapping manner (namely, the foregoing mapping manner 1) used between a PDCP SN and an N3 GTP-U SN, if a terminal sends PDCP PDUs whose PDCP SNs are a PDCP 1, a PDCP 2, a PDCP 3, and a PDCP 4 to a RAN node, but the PDCP PDU whose PDCP SN is the PDCP 2 is lost in a transmission process, the RAN node receives the PDCP PDUs whose PDCP SNs are the PDCP 1, the PDCP 3, and the PDCP 4, and N3 GTP-U SNs of three N3 GTP-U PDUs corresponding to the three PDCP PDUs are an N3 GTP-U 1, an N3 GTP-U 2 and an N3 GTP-U 3. In this case, for a PSA UPF, the PSA UPF receives three N3 GTP-U PDUs with consecutive SNs, cannot learn of a packet loss status of a packet on a first link, and therefore cannot determine a quantity of consecutive lost packets on a user plane path.

To resolve the two problems, the embodiments of this application provide a communication method, where the method may be applied to the foregoing single-UPF scenario and multi-UPF scenario. For ease of description, an access network device is represented by a RAN node below, an intermediate user plane gateway is represented by an I-UPF, an anchor user plane gateway is represented by a PSA UPF, and a session management network element is represented by an SMF. The following specifically uses two application scenarios for description. In a first application scenario, a user plane path is a user plane path between the RAN node and the PSA UPF; and in a second application scenario, a user plane path is a user plane path between the RAN node and a DN.

First application scenario: The user plane path is the user plane path between the RAN node and the PSA UPF.

Figure 7:
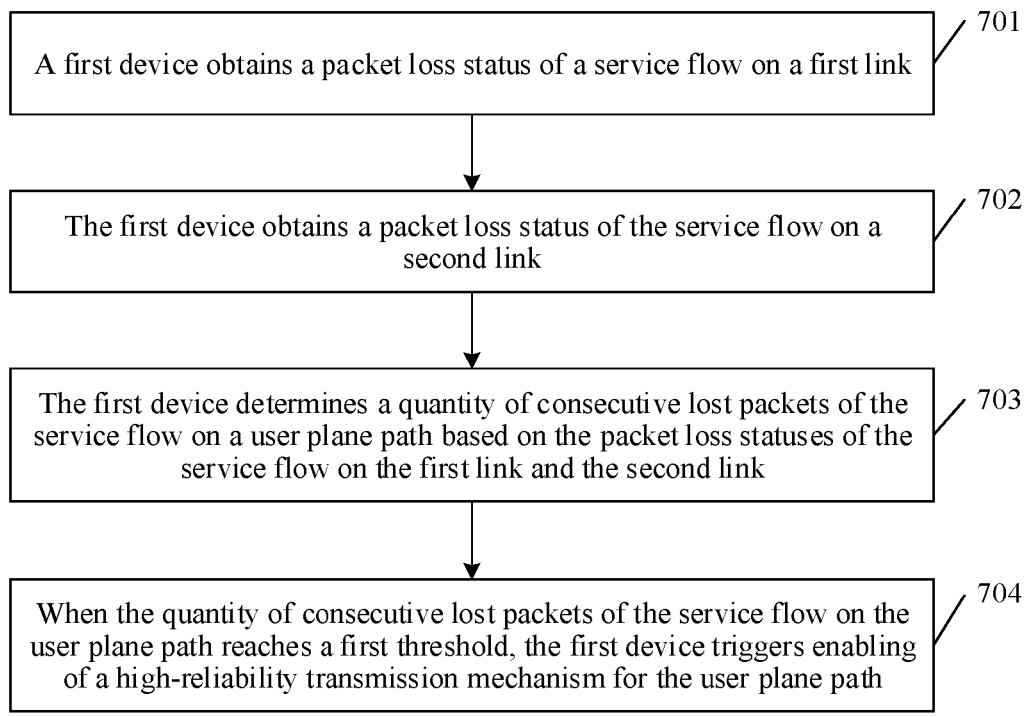
FIG. 7 to FIG. 12A to FIG. 12C are flowcharts of a communication method according to an embodiment of this application.

Refer to FIG. 7. In the first application scenario, the communication method provided in this application includes the following steps.

701: A first device obtains a packet loss status of a service flow on a first link.

The first device may be the RAN node or the PSA UPF on the user plane path.

The packet loss status includes information such as whether a packet is lost and which packet is lost (when packet loss occurs).

Optionally, a latency requirement of a service to which the service flow belongs is less than or equal to a threshold, and the threshold may be preset, predefined, specified in a protocol, or preconfigured. This is not limited in this application.

It should be noted that, in this embodiment of this application, a packet that is not correctly received by a receive end is considered as a lost packet, and that a packet is not correctly received includes: the packet is not received; and/or the packet is received but is not correctly decoded. In the following of this application, a description of "packet that is not correctly received" is used in some context, and a description of "lost packet" is used in some other context. However, it may be understood that the two descriptions have a same meaning.

702: The first device obtains a packet loss status of the service flow on a second link.

There is no sequence of performing step 701 and step 702, and a specific sequence is related to an application scenario. For example, when the first device is the RAN node, for an uplink packet, step 701 may be performed before step 702; and for a downlink packet, step 702 may be performed before step 701.

703: The first device determines a quantity of consecutive lost packets of the service flow on the user plane path based on the packet loss statuses of the service flow on the first link and the second link.

During specific implementation of step 703, when the first device is the RAN node, the first device may determine the quantity of consecutive lost packets of the service flow on the user plane path based on a PDCP SN of a packet that is in the service flow and that is lost on the first link, an N3 GTP-U SN of a packet that is in the service flow and that is lost on the second link, and a mapping relationship between a PDCP SN and an N3 GTP-U SN of a packet in the service flow.

When the first device is the PSA UPF, the first device may determine the quantity of consecutive lost packets of the service flow on the user plane path based on N9 GTP-U SNs corresponding to packets in the service flow that are lost on the first link and the second link.

704: When the quantity of consecutive lost packets of the service flow on the user plane path reaches a first threshold, the first device triggers enabling of a high-reliability transmission mechanism for the user plane path.

Optionally, the first threshold is determined based on survival time corresponding to the service flow. When the survival time is duration (denoted as T1), if a service periodicity is T2, the first threshold may be less than or equal to $$\left\lfloor \frac{T1}{T2} \right\rfloor,$$

where "$\lfloor \ \rfloor$" is a round-down symbol. When the survival time is a quantity (denoted as S) of consecutive lost packets, the first threshold may be less than or equal to S. In this optional method, data transmission may be performed on the user plane path by using the high-reliability transmission mechanism for the user plane path before application shutdown, to improve data transmission reliability, avoid the application shutdown, and improve user experience.

During specific implementation of step 704, the first device may enable a high-reliability transmission mechanism for the entire user plane path, or may enable a high-reliability transmission mechanism for a part of links in the user plane path. This is not limited in this application.

In the communication method shown in FIG. 7, the first device obtains the packet loss statuses on the first link and the second link, to determine the quantity of consecutive lost packets on the user plane path. If the quantity of consecutive lost packets reaches the first threshold, the first device enables the high-reliability transmission mechanism for the user plane path. This improves the data transmission reliability, avoids the application shutdown, and improves user experience.

In this embodiment of this application, for a low-latency service with the survival time, the high-reliability transmission mechanism for the user plane path may not be enabled initially, but is enabled when the quantity of consecutive lost packets on the user plane path reaches the first threshold. Therefore, the data transmission reliability is improved. Optionally, after the high-reliability transmission mechanism for the user plane path is enabled, if determining that a quantity of consecutive lost packets on the user plane path within a specific time period is to be less than or equal to a second threshold (the second threshold is less than the first threshold), the first device may disable the high-reliability transmission mechanism for the user plane path, to save transmission resources. The second threshold may be preset, predefined, specified in a protocol, or preconfigured. This is not limited in this application.

The following describes in detail the communication method shown in FIG. 7 by using a scenario 1 (the single-UPF scenario) and a scenario 2 (the multi-UPF scenario).

Scenario 1: Single-UPF Scenario

In the single-UPF scenario, specific implementation of step 704 is separately described by using the following first case, second case, and third case.

First case: That the quantity of consecutive lost packets of the service flow on the user plane path reaches a first threshold is specifically: A quantity of consecutive lost packets of the service flow on the first link in the user plane path reaches the first threshold.

In the first case, a high-reliability transmission mechanism for the first link may be enabled. In this case, step 704 may specifically include: The first device triggers enabling of the high-reliability transmission mechanism for the first link in the user plane path. This may be specifically implemented in the following manner (1) or manner (2).

Manner (1):

In the manner (1), the first device is the RAN node, and step 704 specifically includes the following steps:

704-1a: The first device sends first enabling information to a terminal, where the first enabling information indicates that the high-reliability transmission mechanism for the first link needs to be enabled.

704-1b: The first device triggers the first device to enable the high-reliability transmission mechanism for the first link.

During specific implementation of step 704-1a, the first enabling information may be carried in a radio resource control (RRC) message. The first enabling information may be indicated by using one or more bits in the RRC message, for example, indicated by using one bit. When the bit is set to 1, the bit indicates the terminal to enable the high-reliability transmission mechanism for the first link. A process in which the RAN node sends other enabling information to the terminal is similar, and details are not described below again.

For the first link (namely, an air interface), the RAN node and the terminal may enable the high-reliability transmission mechanism for the first link by adjusting a transmission parameter, for example, reducing a modulation and coding scheme (MCS) value. This improves data packet transmission reliability and prevents packet loss over the air interface. Alternatively, the first device and the terminal may enable the high-reliability transmission mechanism for the first link by using another method. This is not limited in this application.

Manner (2):

In the manner (2), step 704 specifically includes the following steps:

704-2*a*: The first device sends second enabling information to the SMF, where the second enabling information indicates that the high-reliability transmission mechanism for the first link needs to be enabled. Correspondingly, the SMF receives the second enabling information from the first device.

704-2*b*: The SMF controls the enabling of the high-reliability transmission mechanism for the first link based on the second enabling information.

When the first device is the RAN node, the second enabling information may be transferred to the SMF by using a message in a PDU session modification process. For example, the second enabling information may be carried in a PDU session modification request message sent by the RAN node to the SMF. The second enabling information includes indication information indicating to enable a high-reliability user plane transmission mechanism. Optionally, the second enabling information further includes a cause value for enabling the high-reliability user plane transmission mechanism. The cause value is used to indicate that the high-reliability user plane transmission mechanism for the first link needs to be enabled to ensure the survival time of the application. A process in which the RAN node sends other enabling information (for example, sixth enabling information below) to the SMF is similar, and details are not described below again.

When the first device is the PSA UPF, the second enabling information may be transferred to the SMF by using a message in an N4 session modification process. For example, the second enabling information may be carried in an N4 session modification request message sent by the PSA UPF to the SMF. The second enabling information includes a QoS flow identifier and indication information indicating to enable a high-reliability user plane transmission mechanism. Optionally, the second enabling information further includes a cause value for enabling the high-reliability user plane transmission mechanism. The cause value is used to indicate that the high-reliability user plane transmission mechanism for the first link needs to be enabled to ensure the survival time of the application. A process in which the PSA UPF sends other enabling information (for example, sixth enabling information below) to the SMF is similar, and details are not described below again.

A possible implementation of step 704-2*b* includes the following steps:

704-2*b*-1: The SMF separately sends enabling information to the RAN node and the terminal based on the second enabling information, where the enabling information indicates that the high-reliability transmission mechanism for the first link needs to be enabled. Correspondingly, the RAN node and the terminal separately receive the enabling information.

704-2*b*-2: The RAN node and the terminal enable the high-reliability transmission mechanism for the first link based on the enabling information received by the RAN node and the terminal.

In another possible implementation of step 704-2*b*, the SMF sends enabling information to the terminal only, so that the terminal enables the high-reliability transmission mechanism for the first link. When determining that the quantity of consecutive lost packets of the service flow on the first link in the user plane path reaches the first threshold, the RAN node triggers the RAN node to enable the high-reliability transmission mechanism for the first link.

The SMF may send the enabling information to the RAN node through an AMF. The enabling information may be transferred to the terminal by using a message in the PDU session modification process. For example, the enabling information may be carried in an N2 session message sent by the SMF to the RAN node through the AMF. The enabling information includes a PDU session identifier, the QoS flow identifier, and the indication information indicating to enable the high-reliability user plane transmission mechanism. Optionally, the enabling information further includes the cause value for enabling the high-reliability user plane transmission mechanism. The cause value is used to indicate that the high-reliability user plane transmission mechanism for the first link needs to be enabled to ensure the survival time of the application.

The SMF may send the enabling information to the terminal through an AMF and the RAN node. The enabling information may be transferred to the terminal by using a message in the PDU session modification process. For example, the enabling information may be carried in a NAS message sent by the SMF to the terminal through the AMF and the RAN node. The enabling information includes a PDU session identifier, the QoS flow identifier, and the indication information indicating to enable the high-reliability user plane transmission mechanism. Optionally, the enabling information further includes the cause value for enabling the high-reliability user plane transmission mechanism. The cause value is used to indicate that the high-reliability user plane transmission mechanism for the first link needs to be enabled to ensure the survival time of the application.

Compared with the manner (2), the manner (1) can implement quicker enabling of the high-reliability transmission mechanism for the first link.

In the first case, the high-reliability transmission mechanism for the entire user plane path may alternatively be enabled. In this case, step 704 may specifically include: The first device triggers enabling of high-reliability transmission mechanisms for the first link and the second link in the user plane path. This may be specifically implemented in the following manner (3).

Manner (3):

In the manner (3), step 704 specifically includes the following steps:

704-3*a*: The first device sends sixth enabling information to the SMF, where the sixth enabling information indicates that the high-reliability transmission mechanisms for the first link and the second link need to be enabled. Correspondingly, the SMF receives the sixth enabling information from the first device.

704-3*b*: The SMF controls the enabling of the high-reliability transmission mechanisms for the first link and the second link based on the sixth enabling information.

A first possible implementation of step 704-3*b* includes the following steps:

704-3*b*-11: The SMF separately sends enabling information to the terminal and an AF based on the sixth enabling information, where the enabling information indicates that the high-reliability transmission mechanism for the user plane path needs to be enabled. Correspondingly, the terminal and the AF separately receive the enabling information from the SMF.

The SMF may send the enabling information to the AF through a PCF or a NEF. Correspondingly, the AF receives the enabling information from the SMF through the PCF or the NEF.

**704-3*b*-12**: The terminal enables the high-reliability transmission mechanism for the user plane path based on the received enabling information to communicate with an AS.

**704-3*b*-13**: The AF sends enabling information to the AS, where the enabling information indicates that the high-reliability transmission mechanism for the user plane path needs to be enabled. Correspondingly, the AS receives the enabling information from the AF.

**704-3*b*-14**: The AS enables the high-reliability user plane transmission mechanism based on the received enabling information to communicate with the terminal.

In this possible implementation, the high-reliability transmission mechanism for the user plane path that is enabled between the terminal and the AS may be a redundant session-based high-reliability transmission mechanism.

A second possible implementation of step **704-3*b*** includes the following steps:

**704-3*b*-21**: The SMF separately sends enabling information to the terminal, the RAN node, and the PSA UPF based on the sixth enabling information, where the enabling information indicates that the high-reliability transmission mechanism for the user plane path needs to be enabled. Correspondingly, the terminal, the RAN node, and the PSA UPF separately receive the enabling information.

**704-3*b*-22**: The terminal, the RAN node, and the PSA UPF separately enable the high-reliability transmission mechanism for the entire user plane path based on the received enabling information. Specifically, the terminal may enable the high-reliability transmission mechanism for the first link, the RAN node may enable the high-reliability transmission mechanisms for the first link and the second link, and the PSA UPF may enable the high-reliability transmission mechanism for the second link.

In step **704-3*b*-21**, the enabling information sent by the SMF to the PSA UPF may be transferred by using a message in an N4 session modification process. For example, the enabling information may be carried in an N4 session modification request message sent by the SMF to the PSA UPF. The enabling information includes a QoS flow identifier and indication information indicating to enable a high-reliability user plane transmission mechanism. Optionally, the enabling information further includes a cause value for enabling the high-reliability user plane transmission mechanism. The cause value is used to indicate that the high-reliability transmission mechanism for the second link (or the entire user plane path) needs to be enabled to ensure the survival time of the application.

In the manner (3), for the first link, the RAN node and the terminal may enable the high-reliability transmission mechanism for the first link by adjusting a transmission parameter. The high-reliability user plane transmission mechanism between the RAN node and the PSA UPF may be a high-reliability transmission mechanism based on a redundant service flow for an N3 interface or a high-reliability transmission mechanism based on a redundant transport layer for an N3 interface.

Second case: That the quantity of consecutive lost packets of the service flow on the user plane path reaches a first threshold is specifically: A quantity of consecutive lost packets of the service flow on the second link in the user plane path reaches the first threshold.

In the second case, a high-reliability transmission mechanism for the second link may be enabled. In this case, step 704 may specifically include: The first device triggers enabling of the high-reliability transmission mechanism for the second link in the user plane path. This may be specifically implemented in the following manner (4), manner (5), or manner (6).

Manner (4):

In the manner (4), the first device is the RAN node, and step 704 specifically includes the following steps:

**704-4*a***: The first device sends third enabling information to the PSA UPF, where the third enabling information indicates that the high-reliability transmission mechanism for the second link needs to be enabled.

**704-4*b***: The first device triggers the first device to enable the high-reliability transmission mechanism for the second link.

Manner (5):

In the manner (5), the first device is the PSA UPF, and step 704 specifically includes the following steps:

**704-5*a***: The first device sends fourth enabling information to the RAN node, where the fourth enabling information indicates that the high-reliability transmission mechanism for the second link needs to be enabled.

**704-5*b***: The first device triggers the first device to enable the high-reliability transmission mechanism for the second link.

In the manner (4) and the manner (5), the third enabling information may be carried in a protocol layer header of an N3 GTP-U PDU. The third enabling information includes a QoS flow identifier and indication information indicating to enable a high-reliability user plane transmission mechanism. Optionally, the third enabling information further includes a cause value for enabling the high-reliability user plane transmission mechanism. The cause value is used to indicate that the high-reliability transmission mechanism for the second link needs to be enabled to ensure the survival time of the application.

In the manner (4) and the manner (5), the high-reliability user plane transmission mechanism between the RAN node and the PSA UPF may be a high-reliability transmission mechanism based on a redundant service flow for an N3 interface or a high-reliability transmission mechanism based on a redundant transport layer for an N3 interface.

Manner (6):

In the manner (6), step 704 specifically includes the following steps:

**704-6*a***: The first device sends fifth enabling information to the SMF, where the fifth enabling information indicates that the high-reliability transmission mechanism for the second link needs to be enabled. Correspondingly, the SMF receives the fifth enabling information from the first device.

**704-6*b***: The SMF controls the enabling of the high-reliability transmission mechanism for the second link based on the fifth enabling information.

A possible implementation of step **704-6*b*** includes the following steps:

**704-6*b*-1**: The SMF separately sends enabling information to the RAN node and the PSA UPF based on the fifth enabling information, where the enabling information indicates that the high-reliability transmission mechanism for the second link needs to be enabled. Correspondingly, the RAN node and the PSA UPF separately receive the enabling information.

**704-6*b*-2**: The RAN node and the PSA UPF enable the high-reliability transmission mechanism for the second link based on the enabling information received by the RAN node and the PSA UPF.

In another possible implementation of step **704-6*b***, when the first device is the RAN node, the SMF sends enabling information to the PSA UPF only, so that the PSA UPF enables the high-reliability transmission mechanism for the second link. When determining that the quantity of consecutive lost packets of the service flow on the second link in the user plane path reaches the first threshold, the RAN node triggers the RAN node to enable the high-reliability transmission mechanism for the second link. When the first device is the PSA UPF, the SMF sends enabling information to the RAN node only, so that the RAN node enables the high-reliability transmission mechanism for the second link. When determining that the quantity of consecutive lost packets of the service flow on the second link in the user plane path reaches the first threshold, the PSA UPF triggers the PSA UPF to enable the high-reliability transmission mechanism for the second link.

Compared with the manner (6), the manner (4) and the manner (5) can implement quicker enabling of the high-reliability transmission mechanism for the second link.

In the second case, the high-reliability transmission mechanism for the entire user plane path may alternatively be enabled. For specific implementation, refer to the foregoing descriptions. Details are not described again.

Third case: That the quantity of consecutive lost packets of the service flow on the user plane path reaches a first threshold is specifically: A quantity of consecutive lost packets of the service flow on the first link in the user plane path is less than the first threshold, a quantity of consecutive lost packets of the service flow on the second link is less than the first threshold, and a total quantity of consecutive lost packets of the service flow on the first link and the second link reaches the first threshold.

In the third case, the high-reliability transmission mechanism for the entire user plane path is enabled. For specific implementation, refer to the foregoing descriptions. Details are not described again.

The following uses a case 1 (the first device is the RAN node) and a case 2 (the first device is the PSA UPF) to describe in detail a process of determining the packet loss status on each link in the scenario 1.

Case 1: The first device is the RAN node.

The following uses a case 1.1 as an example to describe determining of a packet loss status of an uplink packet on each link in the case 1, and uses a case 1.2 as an example to describe determining of a packet loss status of a downlink packet on each link in the case 1.

Case 1.1: Uplink Packet

The following uses a case 1.1.1 as an example to describe determining of the packet loss status on the first link in the case 1.1, and uses a case 1.1.2 as an example to describe determining of the packet loss status on the second link in the case 1.1.

Case 1.1.1: Packet Loss Status on the First Link

The case 1.1.1 may be implemented in the following manner 1 or manner 2.

Manner 1:

The manner 1 includes the following steps 1.1.1-11 and 1.1.1-12.

1.1.1-11: The terminal sends a packet (namely, a PDCP PDU) in the service flow to the RAN node. Correspondingly, the RAN node receives the packet in the service flow from the terminal.

1.1.1-12: The RAN node determines the packet loss status of the service flow on the first link based on consecutiveness of PDCP SNs of correctly received packets.

In the manner 1, because PDCP SNs of PDCP PDUs sent by the terminal are consecutive, if PDCP SNs of PDCP PDUs correctly received by the RAN node are nonconsecutive, a PDCP PDU corresponding to a PDCP SN that causes the PDCP SNs to be nonconsecutive is a lost PDCP PDU. For example, if the terminal sends eight PDCP PDUs, and PDCP SNs of the eight PDCP PDUs are a PDCP 0, a PDCP 1, a PDCP 2, . . . , and a PDCP 7; and if the RAN node correctly receives six PDCP PDUs, and PDCP SNs of the six PDCP PDUs are the PDCP 0, the PDCP 1, the PDCP 2, the PDCP 3, the PDCP 5, and the PDCP 7, the RAN node may determine that the PDCP PDUs corresponding to the PDCP 4 and the PDCP 6 are lost.

Manner 2:

The manner 2 includes the following steps 1.1.1-21 to 1.1.1-24.

1.1.1-21: The terminal sends a packet (namely, a PDCP PDU) in the service flow to the RAN node. Correspondingly, the RAN node receives the packet in the service flow from the terminal.

1.1.1-22: The RAN node sends an ACK to the terminal for each correctly received packet. Correspondingly, the terminal receives, from the RAN node, the ACK sent by the RAN node to the terminal for each correctly received packet.

During specific implementation of step 1.1.1-22, for a packet, if the RAN node correctly receives the packet, the RAN node feeds back an ACK for the packet to the terminal. A method used by another receive end to feed back an ACK for a packet in another manner below is similar to that used by the RAN node, and details are not described below again.

1.1.1-23: The terminal sends first packet loss information to the RAN node based on depending on whether an ACK for each sent packet is received, where the first packet loss information is used to indicate a PDCP SN of a packet that is not correctly received by the RAN node. Correspondingly, the RAN node receives the first packet loss information from the terminal.

During specific implementation of step 1.1.1-23, the terminal may set a timer for each sent packet. For a packet, the terminal starts the timer after sending the packet. If the terminal receives an ACK for the packet before the timer corresponding to the packet expires, the terminal may determine that the RAN node correctly receives the packet; otherwise, the terminal may determine that the RAN node does not correctly receive the packet. A method used by another transmit end to determine, based on depending on whether an ACK for each sent packet is received, whether a receive end receives a packet in another manner below is similar to that used by the terminal, and details are not described below again.

1.1.1-24: The RAN node determines the packet loss status of the service flow on the first link based on the first packet loss information.

In the manner 2, for example, the terminal sends eight PDCP PDUs, and PDCP SNs of the eight PDCP PDUs are a PDCP 0, a PDCP 1, a PDCP 2, . . . , and a PDCP 7; and each time the RAN node correctly receives a PDCP PDU, the RAN node feeds back an ACK for the PDCP PDU to the terminal. In this case, if the terminal receives no ACK for the PDCP PDU corresponding to the PDCP 4 when a timer corresponding to the PDCP PDU expires, the terminal may determine that the RAN node does not correctly receive the PDCP PDU corresponding to the PDCP 4; and if the terminal receives no ACK for the PDCP PDU corresponding to the PDCP 6 when a timer corresponding to the PDCP PDU expires, the terminal may determine that the RAN node does not correctly receive the PDCP PDU corresponding to the PDCP 6.

It should be noted that, in this embodiment of this application, the first packet loss information may indicate a PDCP SN of one or more packets not correctly received by the RAN node. When a plurality of packets are not correctly received by the RAN node, information about PDCP SNs of the plurality of packets may be sent to the RAN node in one transmission, or may be sent to the RAN node in a plurality of transmissions. For example, each time the terminal determines that a packet is lost, the terminal reports information about a PDCP SN of the lost packet to the RAN node in time. A case of other packet loss information below is similar, and details are not described below again.

When the terminal reports, each time the terminal determines that a packet is lost, information about a PDCP SN of the lost packet to the RAN node in time, compared with the manner 1, the manner 2 can enable the RAN node to obtain information about the lost packet more quickly. For example, the terminal sends five PDCP PDUs. If three PDCP PDUs in the middle are lost, in the manner 1, the RAN node may learn, only when receiving the fifth PDCP PDU, that the three PDCP PDUs in the middle are lost. In this case, a latency is relatively long, and consequently subsequent PDCP PDU retransmission may be affected. If the terminal reports, each time the terminal determines that a packet is lost, information about a PDCP SN of the lost packet to the RAN node in time, this problem can be avoided.

Case 1.1.2: Packet Loss Status on the Second Link

The case 1.1.2 may be implemented in the following manner 1 or manner 2.

Manner 1:

The manner 1 includes the following steps 1.1.2-11 and 1.1.2-12.

1.1.2-11: The PSA UPF sends second packet loss information to the RAN node, where the second packet loss information is used to indicate an N3 GTP-U SN of a packet (namely, an N3 GTP-U PDU) that is not correctly received by the PSA UPF.

Before step 1.1.2-11, the RAN node may send an N3 GTP-U PDU in the service flow to the PSA UPF, where N3 GTP-U SNs of N3 GTP-U PDUs sent by the RAN node are consecutive. Therefore, the PSA UPF determines, based on consecutiveness of N3 GTP-U SNs of correctly received N3 GTP-U PDUs, an N3 GTP-U PDU that is not correctly received. Specifically, if the N3 GTP-U SNs of the N3 GTP-U PDUs correctly received by the PSA UPF are nonconsecutive, an N3 GTP-U PDU corresponding to an N3 GTP-U SN that causes the N3 GTP-U SNs to be nonconsecutive is the N3 GTP-U PDU that is not correctly received.

1.1.2-12: The RAN node receives the second packet loss information from the PSA UPF, and determines the packet loss status of the service flow on the second link based on the second packet loss information.

During specific implementation of step 1.1.2-12, the RAN node may directly determine the lost N3 GTP-U PDU based on the N3 GTP-U SN indicated by the second packet loss information.

For example, if the RAN node sends six N3 GTP-U PDUs, and N3 GTP-U SNs of the six N3 GTP-U PDUs are an N3 GTP-U 0, an N3 GTP-U 1, an N3 GTP-U 2, . . . , and an N3 GTP-U 5; and if the PSA UPF correctly receives four N3 GTP-U PDUs, and N3 GTP-U SNs of the four N3 GTP-U PDUs are the N3 GTP-U 0, the N3 GTP-U 1, the N3 GTP-U 2, and the N3 GTP-U 5, the PSA UPF may determine that the N3 GTP-U PDUs corresponding to the N3 GTP-U 3 and the N3 GTP-U 4 are lost, and the second packet loss information may include the N3 GTP-U 3 and the N3 GTP-U 4. The RAN node may determine, based on the second packet loss information, that the N3 GTP-U PDUs corresponding to the N3 GTP-U 3 and the N3 GTP-U 4 are lost.

Manner 2:

The manner 2 includes the following steps 1.1.2-21 to 1.1.2-23.

1.1.2-21: The RAN node sends a packet (namely, an N3 GTP-U PDU) in the service flow to the PSA UPF. Correspondingly, the PSA UPF receives the packet in the service flow from the RAN node.

1.1.2-22: The PSA UPF sends an ACK to the RAN node for each correctly received packet. Correspondingly, the RAN node receives, from the PSA UPF, the ACK sent by the PSA UPF for each correctly received packet.

1.1.2-23: The RAN node determines the packet loss status of the service flow on the second link based on depending on whether an ACK for each sent packet is received.

In the manner 2, for example, the RAN node sends six N3 GTP-U PDUs, and N3 GTP-U SNs of the six N3 GTP-U PDUs are an N3 GTP-U 0, an N3 GTP-U 1, an N3 GTP-U 2, . . . , and an N3 GTP-U 5; and each time the PSA UPF correctly receives an N3 GTP-U PDU, the PSA UPF feeds back an ACK for the N3 GTP-U PDU to the RAN node. In this case, if the RAN node receives no ACK for the N3 GTP-U PDU corresponding to the N3 GTP-U 3 when a timer corresponding to the N3 GTP-U PDU expires, the RAN node may determine that the PSA UPF does not correctly receive the N3 GTP-U PDU corresponding to the N3 GTP-U 3; and if the RAN node receives no ACK for the N3 GTP-U PDU corresponding to the N3 GTP-U 4 when a timer corresponding to the N3 GTP-U PDU expires, the RAN node may determine that the PSA UPF does not correctly receive the N3 GTP-U PDU corresponding to the N3 GTP-U 4.

Case 1.2: Downlink Packet

The following uses a case 1.2.1 as an example to describe determining of the packet loss status on the first link in the case 1.2, and uses a case 1.2.2 as an example to describe determining of the packet loss status on the second link in the case 1.2.

Case 1.2.1: Packet Loss Status on the First Link

The case 1.2.1 may be implemented in the following manner 1 or manner 2.

Manner 1:

The manner 1 includes the following steps 1.2.1-11 and 1.2.1-12.

1.2.1-11: The terminal sends third packet loss information to the RAN node, where the third packet loss information is used to indicate a PDCP SN of a packet (namely, a PDCP PDU) that is not correctly received by the terminal. Correspondingly, the RAN node receives the third packet loss information from the terminal.

Before step 1.2.1-11, the RAN node may send a PDCP PDU in the service flow to the terminal, and PDCP SNs of PDCP PDUs sent by the RAN node are consecutive. Therefore, the terminal determines, based on consecutiveness of PDCP SNs of correctly received PDCP PDUs, the PDCP PDU that is not correctly received. Specifically, if the PDCP SNs of the PDCP PDUs correctly received by the terminal are nonconsecutive, a PDCP PDU corresponding to a PDCP SN that causes the PDCP SNs to be nonconsecutive is the PDCP PDU that is not correctly received.

1.2.1-12: The RAN node determines the packet loss status of the service flow on the first link based on the third packet loss information.

During specific implementation of step 1.2.1-12, the RAN node may directly determine the lost PDCP PDU based on the PDCP SN indicated by the third packet loss information.

For example, if the RAN node sends six PDCP PDUs, and PDCP SNs of the six PDCP PDUs area PDCP 0, a PDCP 1, a PDCP 2, . . . , and a PDCP 5; and if the terminal correctly receives four PDCP PDUs, and PDCP SNs of the four PDCP PDUs are the PDCP 0, the PDCP 1, the PDCP 2, and the PDCP 5, the terminal may determine that the PDCP PDUs corresponding to the PDCP 3 and the PDCP 4 are lost, and the third packet loss information may include the PDCP 3 and the PDCP 4. The RAN node may determine, based on the third packet loss information, that the PDCP PDUs corresponding to the PDCP 3 and the PDCP 4 are lost.

Manner 2:

The manner 2 includes the following steps 1.2.1-21 to 1.2.1-23.

1.2.1-21: The RAN node sends a packet (namely, a PDCP PDU) in the service flow to the terminal. Correspondingly, the terminal receives the packet in the service flow from the RAN node.

1.2.1-22: The terminal sends an ACK to the RAN node for each correctly received packet. Correspondingly, the RAN node receives, from the terminal, the ACK sent by the terminal for each correctly received packet.

1.2.1-23: The RAN node determines the packet loss status of the service flow on the first link based on depending on whether an ACK for each sent packet is received.

In the manner 2, for example, the RAN node sends six PDCP PDUs, PDCP SNs of the six PDCP PDUs are a PDCP 0, a PDCP 1, a PDCP 2, . . . , and a PDCP 5; and each time the terminal correctly receives a PDCP PDU, the terminal feeds back an ACK for the PDCP PDU to the RAN node. In this case, if the RAN node receives no ACK for the PDCP PDU corresponding to the PDCP 3 when a timer corresponding to the PDCP PDU expires, the RAN node may determine that the terminal does not correctly receive the PDCP PDU corresponding to the PDCP 3; and if the RAN node receives no ACK for the PDCP PDU corresponding to the PDCP 4 when a timer corresponding to the PDCP PDU expires, the RAN node may determine that the terminal does not correctly receive the PDCP PDU corresponding to the PDCP 4.

Case 1.2.2: Packet Loss Status on the Second Link

The case 1.2.2 may be implemented in the following manner 1 or manner 2.

Manner 1:

The manner 1 includes the following steps 1.2.2-11 and 1.2.2-12.

1.2.2-11: The PSA UPF sends a packet (namely, an N3 GTP-U PDU) in the service flow to the RAN node. Correspondingly, the RAN node receives the packet in the service flow from the PSA UPF.

1.2.2-12: The RAN node determines the packet loss status of the service flow on the second link based on consecutiveness of N3 GTP-U SNs of correctly received packets.

In the manner 1, because N3 GTP-U SNs of N3 GTP-U PDUs sent by the PSA UPF are consecutive, if N3 GTP-U SNs of N3 GTP-U PDUs correctly received by the RAN node are nonconsecutive, an N3 GTP-U PDU corresponding to an N3 GTP-U SN that causes the N3 GTP-U SNs to be nonconsecutive is a lost N3 GTP-U PDU. For example, if the PSA UPF sends eight N3 GTP-U PDUs, and N3 GTP-U SNs of the eight N3 GTP-U PDUs are an N3 GTP-U 0, an N3 GTP-U 1, an N3 GTP-U 2, . . . , and an N3 GTP-U 7; and if the RAN node correctly receives six N3 GTP-U PDUs, and N3 GTP-U SNs of the six N3 GTP-U PDUs are the N3 GTP-U 0, the N3 GTP-U 1, the N3 GTP-U 2, the N3 GTP-U 3, the N3 GTP-U 5, and the N3 GTP-U 7, the RAN node may determine that the N3 GTP-U PDUs corresponding to the N3 GTP-U 4 and the N3 GTP-U 6 are lost.

Manner 2:

The manner 2 includes the following steps 1.2.2-21 to 1.2.2-24.

1.2.2-21: The PSA UPF sends a packet (namely, an N3 GTP-U PDU) in the service flow to the RAN node. Correspondingly, the RAN node receives the packet in the service flow from the PSA UPF.

1.2.2-22: The RAN node sends an ACK to the PSA UPF for each correctly received packet. Correspondingly, the PSA UPF receives, from the RAN node, the ACK sent by the RAN node to the PSA UPF for each correctly received packet.

1.2.2-23: The PSA UPF sends fourth packet loss information to the RAN node based on depending on whether an ACK for each sent packet is received, where the fourth packet loss information is used to indicate an N3 GTP-U SN of a packet that is not correctly received by the RAN node. Correspondingly, the RAN node receives the fourth packet loss information from the PSA UPF.

1.2.2-24: The RAN node determines the packet loss status of the service flow on the second link based on the fourth packet loss information.

In the manner 2, for example, the PSA UPF sends eight N3 GTP-U PDUs, N3 GTP-U SNs of the eight N3 GTP-U PDUs are an N3 GTP-U 0, an N3 GTP-U 1, an N3 GTP-U 2, . . . , and an N3 GTP-U 7; and each time the RAN node correctly receives an N3 GTP-U PDU, the RAN node feeds back an ACK for the N3 GTP-U PDU to the PSA UPF. In this case, if the PSA UPF receives no ACK for the N3 GTP-U PDU corresponding to the N3 GTP-U 4 when a timer corresponding to the N3 GTP-U PDU expires, the PSA UPF may determine that the RAN node does not correctly receive the N3 GTP-U PDU corresponding to the N3 GTP-U 4; and if the PSA UPF receives no ACK for the N3 GTP-U PDU corresponding to the N3 GTP-U 6 when a timer corresponding to the N3 GTP-U PDU expires, the PSA UPF may determine that the RAN node does not correctly receive the N3 GTP-U PDU corresponding to the N3 GTP-U 6.

When the PSA UPF reports, each time the PSA UPF determines that a packet is lost, information about an N3 GTP-U SN of the lost packet to the RAN node in time, compared with the manner 1, the manner 2 can enable the RAN node to obtain information about the lost packet more quickly. For example, the PSA UPF sends five N3 GTP-U PDUs. If three N3 GTP-U PDUs in the middle are lost, in the manner 1, the RAN node may learn, only when receiving the fifth N3 GTP-U PDU, that the three N3 GTP-U PDUs in the middle are lost. In this case, a latency is relatively long, and consequently subsequent N3 GTP-U PDU retransmission may be affected. If the PSA UPF reports, each time the PSA UPF determines that a packet is lost, information about an N3 GTP-U SN of the lost packet to the RAN node in time, this problem can be avoided.

In the case 1, the RAN node may perform determining by combining a PDCP SN of a PDCP PDU lost on the first link and a PDCP SN corresponding to an N3 GTP-U SN of an N3 GTP-U PDU lost on the second link, to determine the quantity of consecutive lost packets on the user plane path. Alternatively, the RAN node may perform determining by combining an N3 GTP-U SN corresponding to a PDCP SN of a PDCP PDU lost on the first link and an N3 GTP-U SN of an N3 GTP-U PDU lost on the second link, to determine the quantity of consecutive lost packets on the user plane path.

For example, the terminal sends eight PDCP PDUs, and PDCP SNs of the eight PDCP PDUs are a PDCP 0, a PDCP 1, a PDCP 2, . . . , and a PDCP 7; and the RAN node correctly receives six PDCP PDUs, PDCP SNs of the six PDCP PDUs are the PDCP 0, the PDCP 1, the PDCP 2, the PDCP 3, the PDCP 5, and the PDCP 7, and N3 GTP-U SNs of six N3 GTP-U PDUs corresponding to the six PDCP PDUs are an N3 GTP-U 0, an N3 GTP-U 1, an N3 GTP-U 2, . . . , and an N3 GTP-U 5. In this case, the RAN node may determine that the PDCP PDUs corresponding to the PDCP 4 and the PDCP 6 are lost. If the RAN node further determines that the N3 GTP-U PDUs corresponding to the N3 GTP-U 3 and the N3 GTP-U 4 are lost on an N3 link, because a PDCP SN corresponding to the N3 GTP-U 3 is the PDCP 3, and a PDCP SN corresponding to the N3 GTP-U 4 is the PDCP 5, that is, PDCP PDUs corresponding to the PDCP 3, the PDCP 4, the PDCP 5, and the PDCP 6 are all lost, the RAN node may determine that a quantity of consecutive lost packets is 4.

For example, the PSA UPF sends eight N3 GTP-U PDUs, and N3 GTP-U SNs of the eight N3 GTP-U PDUs are an N3 GTP-U 0, an N3 GTP-U 1, an N3 GTP-U 2, . . . , and an N3 GTP-U 7; and the RAN node correctly receives six N3 GTP-U PDUs, N3 GTP-U SNs of the six N3 GTP-U PDUs are the N3 GTP-U 0, the N3 GTP-U 1, the N3 GTP-U 2, the N3 GTP-U 3, the N3 GTP-U 5, and the N3 GTP-U 7, and PDCP SNs of six PDCP PDUs corresponding to the six N3 GTP-U PDUs are a PDCP 0, a PDCP 1, a PDCP 2, . . . , and a PDCP 5. In this case, the RAN node may determine that the N3 GTP-U PDUs corresponding to the N3 GTP-U 4 and the N3 GTP-U 6 are lost. If the RAN node further determines that the PDCP PDUs corresponding to the PDCP 3 and the PDCP 4 are lost over an air interface, because a GTP-U SN corresponding to the PDCP 3 is the N3 GTP-U 3, and a GTP-U SN corresponding to the PDCP 4 is the N3 GTP-U 5, that is, the N3 GTP-U PDUs corresponding to the N3 GTP-U 3, the N3 GTP-U 4, the N3 GTP-U 5, and the N3 GTP-U 6 are all lost, the RAN node may determine that a quantity of consecutive lost packets is 4.

In the case 1, optionally, the method further includes: The SMF sends indication information to the terminal and the PSA UPF, where the indication information is used to indicate a corresponding network node to feed back packet loss information. After receiving the indication information, the terminal may feed back packet loss information on the first link to the RAN node based on the indication information. After receiving the indication information, the PSA UPF feeds back packet loss information on the second link to the RAN node based on the indication information.

The indication information may explicitly indicate, for example, by using a value of one or more bits, whether to feed back the packet loss information. The indication information may alternatively give an implicit indication, for example, by using the survival time corresponding to the service. In this case, when a QoS parameter that corresponds to a QoS flow and that is received by the terminal (or the PSA UPF) includes the survival time corresponding to the service, the terminal (or the PSA UPF) determines to feed back the packet loss information.

Case 2: The first device is the PSA UPF.

The following uses a case 2.1 as an example to describe determining of a packet loss status of an uplink packet on each link in the case 2, and uses a case 2.2 as an example to describe determining of a packet loss status of a downlink packet on each link in the case 2.

Case 2.1: Uplink Packet

The following uses a case 2.1.1 as an example to describe determining of the packet loss status on the first link in the case 2.1, and uses a case 2.1.2 as an example to describe determining of the packet loss status on the second link in the case 2.1.

Case 2.1.1: Packet Loss Status on the First Link

The case 2.1.1 may include the following steps 2.1.1-11 and 2.1.1-12.

2.1.1-11: The RAN node sends fifth packet loss information to the PSA UPF, where the fifth packet loss information is used to indicate a packet (namely, a PDCP PDU) that is in the service flow and that is lost on the first link. Correspondingly, the PSA UPF receives the fifth packet loss information from the RAN node.

For a method used by the RAN node to obtain the packet lost on the first link, refer to the foregoing descriptions. Details are not described herein again.

2.1.1-12: The PSA UPF determines the packet loss status of the service flow on the first link based on the fifth packet loss information.

In different SN mapping manners used between a PDCP SN and an N3 GTP-U SN, the fifth packet loss information indicates different information. The following provides descriptions separately.

SN Mapping Manner 1:

In the SN mapping manner 1, a PDCP SN of each packet correctly received by the RAN node corresponds to an N3 GTP-U SN of the packet sent by the RAN node, and N3 GTP-U SNs of packets consecutively sent by the RAN node are consecutive. In this case, because the lost packet has no N3 GTP-U SN, the fifth packet loss information may be used to indicate an N3 GTP-U SN of a correctly received packet previous to the packet that is not correctly received by the RAN node on the first link, and the fifth packet loss information is further used to indicate that one packet or a plurality of consecutive packets subsequent to the packet indicated by the fifth packet loss information is/are lost.

In this case, during specific implementation of step 2.1.1-12, the PSA UPF may determine that one or more consecutive packets subsequent to the packet indicated by the fifth packet loss information are lost. During specific implementation, each time a packet is lost, the RAN node may report an N3 GTP-U SN of a correctly received packet previous to the packet to the PSA UPF. In this case, if an N3 GTP-U SN is reported m (m is an integer greater than 0) times, the PSA UPF may determine that m consecutive packets subsequent to the packet are lost.

For example, the terminal sends eight PDCP PDUs, and PDCP SNs of the eight PDCP PDUs are a PDCP 0, a PDCP 1, a PDCP 2, . . . , and a PDCP 7; and the RAN node correctly receives six PDCP PDUs, PDCP SNs of the six PDCP PDUs are the PDCP 0, the PDCP 1, the PDCP 2, the PDCP 3, the PDCP 5, and the PDCP 7, and N3 GTP-U SNs of six N3 GTP-U PDUs corresponding to the six PDCP PDUs are an N3 GTP-U 0, an N3 GTP-U 1, an N3 GTP-U 2, . . . , and an N3 GTP-U 5. In this case, for a correspondence between the PDCP SNs of the six PDCP PDUs and the N3 GTP-U SNs of the six N3 GTP-U PDUs, refer to Table 2. The PDCP PDUs corresponding to the PDCP 4 and the PDCP 6 are lost; for the PDCP PDU corresponding to the PDCP 4, a PDCP SN of a previous PDCP PDU that is correctly received by the RAN node is the PDCP 3, and the PDCP 3 corresponds to the N3 GTP-U 3; and for the PDCP PDU corresponding to the PDCP 6, a PDCP SN of a previous PDCP PDU that is correctly received by the RAN node is the PDCP 5, and the PDCP 5 corresponds to the N3 GTP-U 4. Therefore, after detecting that the PDCP PDU corresponding to the PDCP 4 is lost, the RAN node sends the N3 GTP-U 3 corresponding to the PDCP 3 to the PSA UPF, and the PSA UPF determines, based on the N3 GTP-U 3, that an N3 GTP-U PDU subsequent to the N3 GTP-U PDU corresponding to the N3 GTP-U 3 is lost; and after detecting that the PDCP PDU corresponding to the PDCP 6 is lost, the RAN node sends the N3 GTP-U 4 corresponding to the PDCP 5 to the PSA UPF, and the PSA UPF determines, based on the N3 GTP-U 4, that an N3 GTP-U PDU subsequent to the N3 GTP-U PDU corresponding to N3 GTP-U 4 is lost.

TABLE 2

| PDCP SN | N3 GTP-U SN |
|---------|-------------|
| 0       | 0           |
| 1       | 1           |
| 2       | 2           |
| 3       | 3           |
| 4       | —           |
| 5       | 4           |
| 6       | —           |
| 7       | 5           |

SN Mapping Manner 2:

In the SN mapping manner 2, a difference (namely, x) between a PDCP SN of each packet correctly received by the RAN node and an N3 GTP-U SN of the packet sent by the RAN node is the same (for a same numbering periodicity). In this case, because the lost packet essentially has an N3 GTP-U SN, the fifth packet loss information is an N3 GTP-U SN of the packet that is not correctly received by the RAN node on the first link.

In this case, during specific implementation of step 2.1.1-12, the PSA UPF may determine the packet loss status of the service flow on the first link based on consecutiveness of N3 GTP-U SNs of received packets.

For example, the terminal sends eight PDCP PDUs, and PDCP SNs of the eight PDCP PDUs are a PDCP 0, a PDCP 1, a PDCP 2, . . . , and a PDCP 7. For N3 GTP-U SNs of N3 GTP-U PDUs corresponding to the eight PDCP PDUs, refer to Table 3. The RAN node correctly receives six PDCP PDUs, PDCP SNs of the six PDCP PDUs are the PDCP 0, the PDCP 1, the PDCP 2, the PDCP 3, the PDCP 5, and the PDCP 7, and N3 GTP-U SNs of six N3 GTP-U PDUs corresponding to the six PDCP PDUs are an N3 GTP-U 0, an N3 GTP-U 1, an N3 GTP-U 2, an N3 GTP-U 3, an N3 GTP-U 5, and an N3 GTP-U 7. In this case, the fifth packet loss information may include an N3 GTP-U4 and an N3 GTP-U 6. The PSA UPF may determine, based on the fifth packet loss information, that an N3 GTP-U PDU corresponding to the N3 GTP-U4 is lost and an N3 GTP-U PDU corresponding to the N3 GTP-U 6 is lost.

TABLE 3

| PDCP SN | N3 GTP-U SN |
|---------|-------------|
| 0       | 0           |
| 1       | 1           |
| 2       | 2           |
| 3       | 3           |
| 4       | 4           |
| 5       | 5           |
| 6       | 6           |
| 7       | 7           |

Case 2.1.2: Packet Loss Status on the Second Link

The case 2.1.2 may be implemented in the following manner 1 or manner 2.

Manner 1:

The manner 1 includes the following steps 2.1.2-11 and 2.1.2-12.

Step 2.1.2-11: The RAN node sends a packet (namely, an N3 GTP-U PDU) in the service flow to the PSA UPF. Correspondingly, the PSA UPF receives the packet in the service flow from the RAN node.

Step 2.1.2-12: The PSA UPF determines the packet loss status of the service flow on the second link based on consecutiveness of N3 GTP-U SNs of correctly received packets.

In the manner 1, because N3 GTP-U SNs of N3 GTP-U PDUs sent by the RAN node are consecutive, if N3 GTP-U SNs of N3 GTP-U PDUs correctly received by the PSA UPF are nonconsecutive, an N3 GTP-U PDU corresponding to an N3 GTP-U SN that causes the N3 GTP-U SNs to be nonconsecutive is a lost N3 GTP-U PDU. For example, if the RAN node sends eight N3 GTP-U PDUs, and N3 GTP-U SNs of the eight N3 GTP-U PDUs are an N3 GTP-U 0, an N3 GTP-U 1, an N3 GTP-U 2, . . . , and an N3 GTP-U 7; and if the PSA UPF correctly receives six N3 GTP-U PDUs, and N3 GTP-U SNs of the six N3 GTP-U PDUs are the N3 GTP-U 0, the N3 GTP-U 1, the N3 GTP-U 2, the N3 GTP-U 3, the N3 GTP-U 5, and the N3 GTP-U 7, the PSA UPF may determine that the N3 GTP-U PDUs corresponding to the N3 GTP-U 4 and the N3 GTP-U 6 are lost.

Manner 2:

The manner 2 includes the following steps 2.1.2-21 to 2.1.2-24.

2.1.2-21: The RAN node sends a packet (namely, an N3 GTP-U PDU) in the service flow to the PSA UPF. Correspondingly, the PSA UPF receives the packet in the service flow from the RAN node.

2.1.2-22: The PSA UPF sends an ACK to the RAN node for each correctly received packet. Correspondingly, the RAN node receives, from the PSA UPF, the ACK sent by the PSA UPF for each correctly received packet.

2.1.2-23: The RAN node sends sixth packet loss information to the PSA UPF based on depending on whether an ACK for each sent packet is received, where the sixth packet loss information is used to indicate an N3 GTP-U SN of a packet that is not correctly received by the PSA UPF. Correspondingly, the PSA UPF receives the sixth packet loss information from the RAN node.

2.1.2-24: The PSA UPF determines the packet loss status of the service flow on the second link based on the sixth packet loss information.

In the manner 2, for example, the RAN node sends eight N3 GTP-U PDUs, N3 GTP-U SNs of the eight N3 GTP-U PDUs are an N3 GTP-U 0, an N3 GTP-U 1, an N3 GTP-U 2, . . . , and an N3 GTP-U 7; and each time the PSA UPF correctly receives an N3 GTP-U PDU, the PSA UPF feeds back an ACK for the N3 GTP-U PDU to the RAN node. In this case, if the RAN node receives no ACK for the N3 GTP-U PDU corresponding to the N3 GTP-U 4 when a timer corresponding to the N3 GTP-U PDU expires, the RAN node may determine that the PSA UPF does not correctly receive the N3 GTP-U PDU corresponding to the N3 GTP-U 4; and if the RAN node receives no ACK for the N3 GTP-U PDU corresponding to the N3 GTP-U 6 when a timer corresponding to the N3 GTP-U PDU expires, the RAN node may determine that the PSA UPF does not correctly receive the N3 GTP-U PDU corresponding to the N3 GTP-U 6.

When the RAN node reports, each time the RAN node determines that a packet is lost, information about an N3 GTP-U SN of the lost packet to the PSA UPF in time, compared with the manner 1, the manner 2 can enable the PSA UPF to obtain information about the lost packet more quickly. For example, the RAN node sends five N3 GTP-U PDUs. If three N3 GTP-U PDUs in the middle are lost, in the manner 1, the PSA UPF may learn, only when receiving the fifth N3 GTP-U PDU, that the three N3 GTP-U PDUs in the middle are lost. In this case, a latency is relatively long, and consequently subsequent N3 GTP-U PDU retransmission may be affected. If the RAN node reports, each time the RAN node determines that a packet is lost, information about an N3 GTP-U SN of the lost packet to the PSA UPF in time, this problem can be avoided.

Case 2.2: Downlink Packet

The following uses a case 2.2.1 as an example to describe determining of the packet loss status on the first link in the case 2.2, and uses a case 2.2.2 as an example to describe determining of the packet loss status on the second link in the case 2.2.

Case 2.2.1: Packet Loss Status on the First Link

The case 2.2.1 includes the following steps 2.2.1-11 and 2.2.1-12.

2.2.1-11: The RAN node sends seventh packet loss information to the PSA UPF, where the seventh packet loss information is used to indicate an N3 GTP-U SN of a packet (namely, a PDCP PDU) that is in the service flow and that is lost on the first link. Correspondingly, the PSA UPF receives the seventh packet loss information from the RAN node.

For a method used by the RAN node to obtain the packet that is in the service flow and that is lost on the first link, refer to the foregoing descriptions. Details are not described herein again. After obtaining a PDCP SN of the PDCP PDU that is in the service flow and that is lost on the first link, the RAN node may send the N3 GTP-U SN (namely, the seventh packet loss information) that is of an N3 GTP-U PDU and that corresponds to the PDCP SN to the PSA UPF.

2.2.1-12: The PSA UPF determines the packet loss status of the service flow on the first link based on the seventh packet loss information.

For example, the PSA UPF sends four N3 GTP-U PDUs to the RAN node, N3 GTP-U SNs of the four N3 GTP-U PDUs are an N3 GTP-U 0, an N3 GTP-U 1, an N3 GTP-U 2, and an N3 GTP-U 3, and PDCP SNs of four PDCP PDUs corresponding to the four N3 GTP-U PDUs are a PDCP 0, a PDCP 1, a PDCP 2, and a PDCP 3. After the RAN node sends the four PDCP PDUs to the terminal, if the terminal does not receive the PDCP PDU whose PDCP SN is the PDCP 2, the RAN node sends the N3 GTP-U 2 corresponding to the PDCP 2 to the PSA UPF. The PSA UPF determines, based on the N3 GTP-U 2, that the N3 GTP-U PDU corresponding to N3 GTP-U 2 is lost.

Case 2.2.2: Packet Loss Status on the Second Link

The case 2.2.2 may be implemented in the following manner 1 or manner 2.

Manner 1:

The manner 1 includes the following steps 2.2.2-11 and 2.2.2-12.

2.2.2-11: The RAN node sends eighth packet loss information to the PSA UPF, where the eighth packet loss information is used to indicate an N3 GTP-U SN of a packet (namely, an N3 GTP-U PDU) that is not correctly received by the RAN node. Correspondingly, the PSA UPF receives the eighth packet loss information from the RAN node.

Before step 2.2.2-11, the PSA UPF sends a packet in the service flow to the RAN node. The RAN node receives the packet sent by the PSA UPF, and determines, based on consecutiveness of N3 GTP-U SNs of received packets, the packet that is not correctly received.

2.2.2-12: The PSA UPF determines the packet loss status of the service flow on the second link based on the eighth packet loss information.

During specific implementation of step 2.2.2-12, the PSA UPF may directly determine that the N3 GTP-U PDU corresponding to the N3 GTP-U SN indicated by the eighth packet loss information is lost.

Manner 2:

The manner 2 includes the following steps 2.2.2-21 to 2.2.2-23.

2.2.2-21: The PSA UPF sends a packet (namely, an N3 GTP-U PDU) in the service flow to the RAN node. Correspondingly, the RAN node receives the packet in the service flow from the PSA UPF.

2.2.2-22: The RAN node sends an ACK to the PSA UPF for each correctly received packet. Correspondingly, the PSA UPF receives, from the RAN node, the ACK sent by the RAN node for each correctly received packet.

2.2.2-23: The PSA UPF determines the packet loss status of the service flow on the second link based on depending on whether an ACK for each sent packet is received.

In the manner 2, for example, the PSA UPF sends six N3 GTP-U PDUs, N3 GTP-U SNs of the six N3 GTP-U PDUs are an N3 GTP-U 0, an N3 GTP-U 1, an N3 GTP-U 2, . . . , and an N3 GTP-U 5; and each time the RAN node correctly receives an N3 GTP-U PDU, the RAN node feeds back an ACK for the N3 GTP-U PDU to the PSA UPF. In this case, if the PSA UPF receives no ACK for the N3 GTP-U PDU corresponding to the N3 GTP-U 3 when a timer corresponding to the N3 GTP-U PDU expires, the PSA UPF may determine that the RAN node does not correctly receive the N3 GTP-U PDU corresponding to the N3 GTP-U 3; and if the PSA UPF receives no ACK for the N3 GTP-U PDU corresponding to the N3 GTP-U 4 when a timer corresponding to the N3 GTP-U PDU expires, the PSA UPF may determine that the RAN node does not correctly receive the N3 GTP-U PDU corresponding to the N3 GTP-U 4.

In the case 2, the PSA UPF may perform determining by combining an N3 GTP-U SN corresponding to a PDCP SN of a PDCP PDU lost on the first link and an N3 GTP-U SN of an N3 GTP-U PDU lost on the second link, to determine the quantity of consecutive lost packets on the user plane path.

For example, based on the example shown in Table 2, if the PSA UPF determines that a packet subsequent to the N3 GTP-U PDU corresponding to the N3 GTP-U 3 is lost and a packet subsequent to the N3 GTP-U PDU corresponding to the N3 GTP-U 4 is lost, and if the PSA UPF further determines that an N3 GTP-U PDU corresponding to the N3 GTP-U 4 is lost on the second link, the PSA UPF determines that three consecutive packets are lost.

In the case 2, optionally, the method further includes: The SMF sends indication information to the terminal and the RAN node, where the indication information is used to indicate a corresponding network node to feed back packet loss information. After receiving the indication information, the terminal may feed back packet loss information on the first link to the RAN node based on the indication information. After receiving the indication information, the RAN node feeds back packet loss information on the second link to the PSA UPF based on the indication information.

The indication information may explicitly indicate, for example, by using a value of one or more bits, whether to feed back the packet loss information. The indication information may alternatively give an implicit indication, for example, by using the survival time corresponding to the service. In this case, when a QoS parameter that corresponds to a QoS flow and that is received by the terminal (or the RAN node) includes the survival time corresponding to the service, the terminal (or the RAN node) determines to feed back the packet loss information.

Scenario 2: Multi-UPF Scenario

In the multi-UPF scenario, the second link includes a first sublink and a second sublink.

In the multi-UPF scenario, specific implementation of step 704 is separately described by using the following first case, second case, third case, and fourth case.

First case: That the quantity of consecutive lost packets of the service flow on the user plane path reaches a first threshold is specifically: A quantity of consecutive lost packets of the service flow on the first link in the user plane path reaches the first threshold.

In the first case, a high-reliability transmission mechanism for the first link may be enabled. For a specific process, refer to the foregoing descriptions, and details are not described again.

In the first case, the high-reliability transmission mechanism for the entire user plane path may alternatively be enabled. In this case, step 704 may specifically include: The first device triggers enabling of high-reliability transmission mechanisms for the first link, the first sublink, and the second sublink in the user plane path. This may be specifically implemented in the following manner (7).

Manner (7):

In the manner (7), step 704 specifically includes the following steps:

704-7*a*: The first device sends seventh enabling information to the SMF, where the seventh enabling information indicates that the high-reliability transmission mechanisms for the first link, the first sublink, and the second sublink (in other words, the high-reliability transmission mechanism for the entire user plane path) need to be enabled.

704-7*b*: The SMF controls the enabling of the high-reliability transmission mechanisms for the first link, the first sublink, and the second sublink based on the seventh enabling information.

A first possible implementation of step 704-7*b* is similar to the first possible implementation of step 704-3*b*. For details, refer to the foregoing descriptions, and the details are not described herein again.

A second possible implementation of step 704-7*b* includes the following steps:

704-7*b*-1: The SMF separately sends enabling information to the terminal, the RAN node, the I-UPF, and the PSA UPF based on the seventh enabling information, where the enabling information indicates that the high-reliability transmission mechanism for the user plane path needs to be enabled. Correspondingly, the terminal, the RAN node, the I-UPF, and the PSA UPF separately receive the enabling information.

704-7*b*-2: The terminal, the RAN node, the I-UPF, and the PSA UPF separately enable the high-reliability transmission mechanism for the entire user plane path based on the received enabling information. Specifically, the terminal may enable the high-reliability transmission mechanism for the first link, the RAN node may enable the high-reliability transmission mechanisms for the first link and the first sublink, the I-UPF may enable the high-reliability transmission mechanisms for the first sublink and the second sublink, and the PSA UPF may enable the high-reliability transmission mechanism for the second sublink.

In step 704-7*b*-1, a process in which the SMF sends the enabling information to the I-UPF is the same as a process in which the SMF sends the enabling information to the PSA UPF, and information included in the enabling information is the same. For details, refer to the foregoing descriptions, and the details are not described herein again.

In the manner (7), for the first link, the RAN node and the terminal may enable the high-reliability transmission mechanism for the first link by adjusting a transmission parameter. The high-reliability user plane transmission mechanism between the RAN node and the I-UPF may be a high-reliability transmission mechanism based on a redundant service flow for an N3 interface or a high-reliability transmission mechanism based on a redundant transport layer for an N3 interface. The high-reliability user plane transmission mechanism between the I-UPF and the PSA UPF may be a high-reliability transmission mechanism based on a redundant service flow for an N9 interface or a high-reliability transmission mechanism based on a redundant transport layer for an N9 interface.

Second case: That the quantity of consecutive lost packets of the service flow on the user plane path reaches a first threshold is specifically: A quantity of consecutive lost packets of the service flow on the first sublink in the user plane path reaches the first threshold.

In the second case, a high-reliability transmission mechanism for the first sublink may be enabled. In this case, step 704 may specifically include: The first device triggers enabling of the high-reliability transmission mechanism for the first sublink in the user plane path. This may be specifically implemented in the following manner (8) or manner (9).

Manner (8):

In the manner (8), the first device is the RAN node, and step 704 specifically includes the following steps:

704-8*a*: The first device sends enabling information to the I-UPF, where the enabling information indicates that the high-reliability transmission mechanism for the first sublink needs to be enabled. Correspondingly, the I-UPF receives the enabling information, and enables the high-reliability transmission mechanism for the first sublink based on the enabling information.

704-8*b*: The first device triggers the first device to enable the high-reliability transmission mechanism for the first sublink.

The enabling information sent by the first device to the I-UPF may be carried in a protocol layer header of an N3 GTP-U PDU. The enabling information includes a QoS flow identifier and indication information indicating to enable a high-reliability user plane transmission mechanism. Optionally, the enabling information further includes a cause value for enabling the high-reliability user plane transmission mechanism. The cause value is used to indicate that the high-reliability transmission mechanism for the first sublink needs to be enabled to ensure the survival time of the application.

In the manner (8), the high-reliability user plane transmission mechanism between the first device and the I-UPF may be a high-reliability transmission mechanism based on a redundant service flow for an N3 interface or a high-reliability transmission mechanism based on a redundant transport layer for an N3 interface.

Manner (9):

In the manner (9), step 704 specifically includes the following steps:

704-9*a*: The first device sends enabling information to the SMF, where the enabling information indicates that the high-reliability transmission mechanism for the first sublink needs to be enabled. Correspondingly, the SMF receives the enabling information from the first device.

704-9b: The SMF controls the enabling of the high-reliability transmission mechanism for the first sublink based on the enabling information.

A possible implementation of step 704-9b includes the following steps:

704-9b-1: The SMF separately sends enabling information to the first device and the I-UPF based on the enabling information, where the enabling information indicates that the high-reliability transmission mechanism for the first sublink needs to be enabled. Correspondingly, the first device and the I-UPF separately receive the enabling information.

704-9b-2: The first device and the I-UPF enable the high-reliability transmission mechanism for the first sublink based on the enabling information received by the first device and the I-UPF.

If the first device is the RAN node, in another possible implementation of step 704-9b, the SMF sends enabling information to the I-UPF only, so that the I-UPF enables the high-reliability transmission mechanism for the first sublink. When determining that the quantity of consecutive lost packets of the service flow on the first sublink in the user plane path reaches the first threshold, the first device triggers the first device to enable the high-reliability transmission mechanism for the first sublink.

Compared with the manner (9), the manner (8) can implement quicker enabling of the high-reliability transmission mechanism for the first sublink.

In the second case, the high-reliability transmission mechanism for the entire user plane path may alternatively be enabled. For specific implementation, refer to the foregoing descriptions. Details are not described again.

Third case: That the quantity of consecutive lost packets of the service flow on the user plane path reaches a first threshold is specifically: A quantity of consecutive lost packets of the service flow on the second sublink in the user plane path reaches the first threshold.

In the third case, a high-reliability transmission mechanism for the second sublink may be enabled. In this case, step 704 may specifically include: The first device triggers enabling of the high-reliability transmission mechanism for the second sublink in the user plane path. This may be specifically implemented in the following manner (10) or manner (11).

Manner (10):

In the manner (10), the first device is the PSA UPF, and step 704 specifically includes the following steps:

704-10a: The first device sends enabling information to the I-UPF, where the enabling information indicates that the high-reliability transmission mechanism for the second sublink needs to be enabled. Correspondingly, the I-UPF receives the enabling information, and enables the high-reliability transmission mechanism for the second sublink based on the enabling information.

704-10b: The first device triggers the first device to enable the high-reliability transmission mechanism for the second sublink.

The enabling information sent by the first device to the I-UPF may be carried in a protocol layer header of an N9 GTP-U PDU. The enabling information includes a QoS flow identifier and indication information indicating to enable a high-reliability user plane transmission mechanism. Optionally, the enabling information further includes a cause value for enabling the high-reliability user plane transmission mechanism. The cause value is used to indicate that the high-reliability transmission mechanism for the second sublink needs to be enabled to ensure the survival time of the application.

In the manner (10), the high-reliability user plane transmission mechanism between the first device and the I-UPF may be a high-reliability transmission mechanism based on a redundant service flow for an N9 interface or a high-reliability transmission mechanism based on a redundant transport layer for an N9 interface.

Manner (11):

In the manner (11), step 704 specifically includes the following steps:

704-11a: The first device sends enabling information to the SMF, where the enabling information indicates that the high-reliability transmission mechanism for the second sublink needs to be enabled. Correspondingly, the SMF receives the enabling information from the first device.

704-11b: The SMF controls the enabling of the high-reliability transmission mechanism for the second sublink based on the enabling information.

A possible implementation of step 704-11b includes the following steps:

704-11b-1: The SMF separately sends enabling information to the first device and the I-UPF based on the enabling information, where the enabling information indicates that the high-reliability transmission mechanism for the second sublink needs to be enabled. Correspondingly, the first device and the I-UPF separately receive the enabling information.

704-11b-2: The first device and the I-UPF enable the high-reliability transmission mechanism for the second sublink based on the enabling information received by the first device and the I-UPF.

If the first device is the PSA UPF, in another possible implementation of step 704-11b, the SMF sends enabling information to the I-UPF only, so that the I-UPF enables the high-reliability transmission mechanism for the second sublink. When determining that the quantity of consecutive lost packets of the service flow on the second sublink in the user plane path reaches the first threshold, the first device triggers the first device to enable the high-reliability transmission mechanism for the second sublink.

Compared with the manner (11), the manner (10) can implement quicker enabling of the high-reliability transmission mechanism for the second sublink.

In the third case, the high-reliability transmission mechanism for the entire user plane path may alternatively be enabled. For specific implementation, refer to the foregoing descriptions. Details are not described again.

Fourth case: That the quantity of consecutive lost packets of the service flow on the user plane path reaches a first threshold is specifically: A quantity of consecutive lost packets of the service flow on the first link in the user plane path is less than the first threshold, a quantity of consecutive lost packets of the service flow on the first sublink is less than the first threshold, a quantity of consecutive lost packets of the service flow on the second sublink is also less than the first threshold, and a total quantity of consecutive lost packets of the service flow on any two or all of the first link, the first sublink, and the second sublink reaches the first threshold.

In the fourth case, the high-reliability transmission mechanism for the entire user plane path is enabled. For specific implementation, refer to the foregoing descriptions. Details are not described again.

The following uses a case 3 (the first device is the RAN node) and a case 4 (the first device is the PSA UPF) to describe in detail a process of determining the packet loss status on each link in the scenario 2.

Case 3: The first device is the RAN node.

The following uses a case 3.1 as an example to describe determining of a packet loss status of an uplink packet on each link in the case 3, and uses a case 3.2 as an example to describe determining of a packet loss status of a downlink packet on each link in the case 3.

Case 3.1: Uplink Packet

The following uses a case 3.1.1 as an example to describe determining of the packet loss status on the first link in the case 3.1, and uses a case 3.1.2 as an example to describe determining of the packet loss status on the second link in the case 3.1.

Case 3.1.1: Packet Loss Status on the First Link

The case 3.1.1 may be implemented in the following manner 1 or manner 2.

Manner 1:

The manner 1 includes the following steps 3.1.1-11 and 3.1.1-12.

3.1.1-11: The terminal sends a packet (namely, a PDCP PDU) in the service flow to the RAN node. Correspondingly, the RAN node receives the packet in the service flow from the terminal.

3.1.1-12: The RAN node determines the packet loss status of the service flow on the first link based on consecutiveness of PDCP SNs of correctly received packets.

An implementation process of the manner 1 in the case 3.1.1 is similar to the implementation process of the manner 1 in the case 1.1.1. For details, refer to the implementation process of the manner 1 in the case 1.1.1 for understanding, and the details are not described herein again.

Manner 2:

The manner 2 includes the following steps 3.1.1-21 to 3.1.1-24.

3.1.1-21: The terminal sends a packet (namely, a PDCP PDU) in the service flow to the RAN node. Correspondingly, the RAN node receives the packet in the service flow from the terminal.

3.1.1-22: The RAN node sends an ACK to the terminal for each correctly received packet. Correspondingly, the terminal receives, from the RAN node, the ACK sent by the RAN node to the terminal for each correctly received packet.

3.1.1-23: The terminal sends ninth packet loss information to the RAN node based on depending on whether an ACK for each sent packet is received, where the ninth packet loss information is used to indicate a PDCP SN of a packet that is not correctly received by the RAN node. Correspondingly, the RAN node receives the ninth packet loss information from the terminal.

3.1.1-24: The RAN node determines the packet loss status of the service flow on the first link based on the ninth packet loss information.

An implementation process of the manner 2 in the case 3.1.1 is similar to the implementation process of the manner 2 in the case 1.1.1. For details, refer to the implementation process of the manner 2 in the case 1.1.1 for understanding, and the details are not described herein again.

Case 3.1.2: Packet Loss Status on the Second Link

The case 3.1.2 may be implemented in the following manner 1 or manner 2.

Manner 1:

The manner 1 includes the following steps 3.1.2-11 and 3.1.2-12.

3.1.2-11: The I-UPF sends tenth packet loss information to the RAN node, where the tenth packet loss information is used to indicate an N3 GTP-U SN of a packet that is not correctly received by the I-UPF on the first sublink and an N3 GTP-U SN corresponding to an N9 GTP-U SN of a packet that is not correctly received by the PSA UPF on the second sublink. Correspondingly, the RAN node receives the tenth packet loss information from the I-UPF.

During specific implementation of step 3.1.2-11, the I-UPF may obtain the packet that is not correctly received on the first sublink and the packet that is not correctly received by the PSA UPF on the second sublink. An implementation process in which the I-UPF obtains the packet that is not correctly received on the first sublink is similar to the implementation process in which the PSA UPF obtains the packet that is not correctly received on the second link in the scenario 1. An implementation process in which the I-UPF obtains the packet that is not correctly received by the PSA UPF on the second sublink is similar to the implementation process in which the RAN node obtains the packet that is not correctly received by the PSA UPF on the second link in the scenario 1. For details, refer to the foregoing corresponding parts for understanding, and the details are not described herein again.

It should be noted that, after the I-UPF obtains an N9 GTP-U SN of an N9 GTP-U PDU that is not correctly received by the PSA UPF on the second sublink, when generating the tenth packet loss information, the I-UPF needs to convert the N9 GTP-U SN to an N3 GTP-U SN.

3.1.2-12: The RAN node determines the packet loss status of the service flow on the second link based on the tenth packet loss information.

During specific implementation of step 3.1.2-12, the RAN node may directly determine, based on the tenth packet loss information, packets in the service flow that are lost on the second link.

Manner 2:

The manner 2 includes the following steps 3.1.2-21 to 3.1.2-25.

3.1.2-21: The RAN node sends a packet in the service flow to the I-UPF.

Correspondingly, the I-UPF receives the packet in the service flow from the RAN node.

3.1.2-22: The I-UPF sends an ACK to the RAN node for each correctly received packet. Correspondingly, the RAN node receives, from the I-UPF, the ACK sent by the I-UPF for each correctly received packet.

3.1.2-23: The RAN node determines a packet loss status of the service flow on the first sublink based on depending on whether an ACK for each sent packet is received.

3.1.2-24: The I-UPF sends eleventh packet loss information to the RAN node, where the eleventh packet loss information is used to indicate an N3 GTP-U SN corresponding to an N9 GTP-U SN of a packet that is not correctly received by the PSA UPF on the second sublink. Correspondingly, the RAN node receives the eleventh packet loss information from the I-UPF.

3.1.2-25: The RAN node determines the packet loss status of the service flow on the second link based on the eleventh packet loss information and the packet loss status of the service flow on the first sublink.

An implementation process in which the RAN node determines the packet loss status of the service flow on the first sublink in steps 3.1.2-21 to 3.1.2-23 is similar to the implementation process in which the RAN node determines the packet loss status of the service flow on the second link in the manner 2 in the case 1.1.2. For details, refer to the foregoing corresponding part for understanding, and the details are not described herein again.

Before step 3.1.2-24, the I-UPF may obtain the packet that is not correctly received by the PSA UPF on the second sublink. A specific implementation process is similar to the implementation process in which the RAN node obtains the packet that is not correctly received by the PSA UPF on the second link in the scenario 1. For details, refer to the foregoing corresponding part for understanding, and the details are not described herein again. It should be noted that, after the I-UPF obtains an N9 GTP-U SN of an N9 GTP-U PDU that is not correctly received by the PSA UPF on the second sublink, when generating the eleventh packet loss information, the I-UPF needs to convert the N9 GTP-U SN to an N3 GTP-U SN.

During specific implementation of step 3.1.2-25, the RAN node may determine a packet loss status of the service flow on the second sublink based on the eleventh packet loss information, and then determine the packet loss status of the service flow on the second link in combination with the packet loss status of the service flow on the first sublink.

In the manner 2, for example, for the first sublink, the RAN node sends eight N3 GTP-U PDUs, and N3 GTP-U SNs of the eight N3 GTP-U PDUs are an N3 GTP-U 0, an N3 GTP-U 1, an N3 GTP-U 2, . . . , and an N3 GTP-U 7; and each time the I-UPF correctly receives an N3 GTP-U PDU, the I-UPF feeds back an ACK for the N3 GTP-U PDU to the RAN node. In this case, if the RAN node receives no ACK for the N3 GTP-U PDU corresponding to the N3 GTP-U 4 when a timer corresponding to the N3 GTP-U PDU expires, the RAN node may determine that the I-UPF does not correctly receive the N3 GTP-U PDU corresponding to the N3 GTP-U 4; and if the RAN node receives no ACK for the N3 GTP-U PDU corresponding to the N3 GTP-U 6 when a timer corresponding to the N3 GTP-U PDU expires, the RAN node may determine that the I-UPF does not correctly receive the N3 GTP-U PDU corresponding to the N3 GTP-U 6. For the second sublink, for a correspondence between N3 GTP-U SNs of six N3 GTP-U PDUs received by the I-UPF and N9 GTP-U SNs of six N9 GTP-U PDUs sent by the I-UPF, refer to Table 4. If the I-UPF determines that an N9 GTP-U PDU corresponding to an N9 GTP-U 4 is lost on the second sublink, the I-UPF sends the N3 GTP-U 5 (namely, the eleventh packet loss information) corresponding to the N9 GTP-U 4 to the RAN node. The RAN node may determine, based on the N3 GTP-U 5, that a packet that is in the service flow and that is lost on the second sublink is the N3 GTP-U PDU corresponding to the N3 GTP-U 5. Because packets lost on the first sublink are the N3 GTP-U PDUs corresponding to the N3 GTP-U 4 and the N3 GTP-U 6, the RAN node may determine that packets lost on the second link are the N3 GTP-U PDUs corresponding to the N3 GTP-U 4, the N3 GTP-U 5, and the N3 GTP-U 6.

TABLE 4

| N3 GTP-U SN | N9 GTP-U SN |
|---|---|
| 0 | 0 |
| 1 | 1 |
| 2 | 2 |
| 3 | 3 |
| 5 | 4 |
| 7 | 5 |

Case 3.2: Downlink Packet

The following uses a case 3.2.1 as an example to describe determining of the packet loss status on the first link in the case 3.2, and uses a case 3.2.2 as an example to describe determining of the packet loss status on the second link in the case 3.2.

Case 3.2.1: Packet Loss Status on the First Link

The case 3.2.1 may be implemented in either of the following manner 1 and manner 2.

Manner 1:

The manner 1 includes the following steps 3.2.1-11 and 3.2.1-12.

3.2.1-11: The terminal sends twelfth packet loss information to the RAN node, where the twelfth packet loss information is used to indicate a PDCP SN of a packet (namely, a PDCP PDU) that is not correctly received by the terminal. Correspondingly, the RAN node receives the twelfth packet loss information from the terminal.

3.2.1-12: The RAN node determines the packet loss status of the service flow on the first link based on the twelfth packet loss information.

An implementation process of the manner 1 in the case 3.2.1 is similar to the implementation process of the manner 1 in the case 1.2.1. For details, refer to the implementation process of the manner 1 in the case 1.2.1 for understanding, and the details are not described herein again.

Manner 2:

The manner 2 includes the following steps 3.2.1-21 to 3.2.1-23.

3.2.1-21: The RAN node sends a packet (namely, a PDCP PDU) in the service flow to the terminal. Correspondingly, the terminal receives the packet in the service flow from the RAN node.

3.2.1-22: The terminal sends an ACK to the RAN node for each correctly received packet. Correspondingly, the RAN node receives, from the terminal, the ACK sent by the terminal for each correctly received packet.

3.2.1-23: The RAN node determines the packet loss status of the service flow on the first link based on depending on whether an ACK for each sent packet is received.

An implementation process of the manner 2 in the case 3.2.1 is similar to the implementation process of the manner 2 in the case 1.2.1. For details, refer to the implementation process of the manner 2 in the case 1.2.1 for understanding, and the details are not described herein again.

Case 3.2.2: Packet Loss Status on the Second Link

The case 3.2.2 may be implemented in the following manner 1, manner 2, or manner 3.

The manner 1 includes the following steps 3.2.2-11 to 3.2.2-14.

3.2.2-11: The I-UPF sends a packet in the service flow to the RAN node. Correspondingly, the RAN node receives the packet in the service flow from the I-UPF.

The packet sent by the I-UPF to the RAN node is received from the PSA UPF.

3.2.2-12: The RAN node determines, based on consecutiveness of N3 GTP-U SNs of correctly received packets, an N3 GTP-U SN of a packet that is not correctly received by the RAN node on the first sublink.

An implementation process in which the RAN node determines the packet that is not correctly received on the first sublink in steps 3.2.2-11 and 3.2.2-12 is similar to the implementation process in which the RAN node determines the packet loss status on the second link in the manner 1 in the case 1.2.2. For details, refer to the foregoing for understanding, and the details are not described herein again.

3.2.2-13: The I-UPF sends thirteenth packet loss information to the RAN node, where the thirteenth packet loss information is used to indicate a packet that is not correctly received by the I-UPF on the second sublink. Correspondingly, the RAN node receives the thirteenth packet loss information from the I-UPF.

Before step 3.2.2-13, the I-UPF may obtain the packet that is not correctly received by the I-UPF on the second sublink, and an obtaining method is similar to the method used by the RAN node to obtain the packet that is not correctly received by the RAN node on the second link. For details, refer to the foregoing for understanding, and the details are not described herein again.

3.2.2-14: The RAN node determines the packet loss status of the service flow on the second link based on the thirteenth packet loss information and the N3 GTP-U SN of the packet that is not correctly received by the RAN node on the first sublink.

Manner 2:

The manner 2 includes the following steps 3.2.2-21 to 3.2.2-24.

3.2.2-21: The I-UPF sends a packet in the service flow to the RAN node. Correspondingly, the RAN node receives the packet in the service flow from the I-UPF.

The packet sent by the I-UPF to the RAN node is received from the PSA UPF.

3.2.2-22: The RAN node sends an ACK to the I-UPF for each correctly received packet. Correspondingly, the I-UPF receives, from the RAN node, the ACK sent by the RAN node to the I-UPF for each correctly received packet.

3.2.2-23: The I-UPF sends thirteenth packet loss information and fourteenth packet loss information to the RAN node based on depending on whether an ACK for each sent packet is received, where the thirteenth packet loss information is used to indicate a packet that is not correctly received by the I-UPF on the second sublink, and the fourteenth packet loss information is used to indicate an N3 GTP-U SN of a packet that is not correctly received by the RAN node on the first sublink. Correspondingly, the RAN node receives the thirteenth packet loss information and the fourteenth packet loss information from the I-UPF.

Before step 3.2.2-23, the I-UPF may determine, based on the depending on whether the ACK for each sent packet is received, the packet that is not correctly received by the RAN node, and further determine the fourteenth packet loss information. In addition, the I-UPF may obtain the packet that is not correctly received by the I-UPF on the second sublink, and then determine the thirteenth packet loss information. An obtaining method is similar to the method used by the RAN node to obtain the packet that is not correctly received by the RAN node on the second link in the scenario 1. For details, refer to the foregoing for understanding, and the details are not described herein again.

3.2.2-24: The RAN node determines the packet loss status of the service flow on the second link based on the thirteenth packet loss information and the fourteenth packet loss information.

In different SN mapping manners used between an N9 GTP-U SN and an N3 GTP-U SN, the thirteenth packet loss information indicates different information. The following provides descriptions separately.

SN Mapping Manner 1:

In the SN mapping manner 1, an N9 GTP-U SN of each packet correctly received by the I-UPF corresponds to an N3 GTP-U SN of the packet sent by the I-UPF, and N3 GTP-U SNs of packets consecutively sent by the I-UPF are consecutive. In this case, the thirteenth packet loss information is used to indicate an N3 GTP-U SN corresponding to an N9 GTP-U SN of a correctly received packet previous to the packet that is not correctly received by the I-UPF on the second sublink, and the thirteenth packet loss information is further used to indicate that one packet or a plurality of consecutive packets subsequent to the packet indicated by the thirteenth packet loss information is/are lost.

In the SN mapping manner 1, after the I-UPF determines an N9 GTP-U SN of a correctly received N9 GTP-U PDU previous to an N9 GTP-U PDU that is not correctly received on the second sublink, when generating the thirteenth packet loss information, the I-UPF needs to convert the N9 GTP-U SN to an N3 GTP-U SN.

SN Mapping Manner 2:

In the SN mapping manner 2, a difference between an N9 GTP-U SN of each packet correctly received by the I-UPF and an N3 GTP-U SN of the packet sent by the I-UPF is the same (for a same numbering periodicity), and the thirteenth packet loss information is an N3 GTP-U SN of the packet that is not correctly received by the I-UPF on the second sublink.

In the SN mapping manner 2, after the I-UPF determines an N9 GTP-U SN of an N9 GTP-U PDU that is not correctly received on the second sublink, when generating the thirteenth packet loss information, the I-UPF needs to convert the N9 GTP-U SN to an N3 GTP-U SN.

For specific analysis about that information indicated by the thirteenth packet loss information varies due to different SN mapping manners, refer to the related descriptions about the SN mapping manner in the foregoing case 2.1.1. A principle is similar, and details are not described herein again.

Manner 3:

The manner 3 includes the following steps 3.2.2-31 and 3.2.2-32.

3.2.2-31: The I-UPF sends a packet in the service flow to the RAN node. Correspondingly, the RAN node receives the packet in the service flow from the I-UPF.

The packet sent by the I-UPF to the RAN node is received from the PSA UPF.

3.2.2-32: The RAN node determines, based on consecutiveness of N3 GTP-U SNs of correctly received packets, a packet that is not correctly received by the RAN node on the second link.

In the manner 3, the SN mapping manner 2 is used for SN mapping between an N9 GTP-U SN and an N3 GTP-U SN. In this case, because an N9 GTP-U SN of a lost N9 GTP-U PDU also corresponds to an N3 GTP-U SN, the RAN node may directly determine, based on consecutiveness of N3 GTP-U SNs of received N3 GTP-U PDUs, the packet that is not correctly received by the RAN node on the second link.

In the case 3, the RAN node may perform determining by combining a PDCP SN of a PDCP PDU lost on the first link, a PDCP SN corresponding to an N3 GTP-U SN of an N3 GTP-U PDU lost on the first sublink, and a PDCP SN corresponding to an N9 GTP-U SN of an N9 GTP-U PDU lost on the second sublink, to determine the quantity of consecutive lost packets on the user plane path. Alternatively, the RAN node may perform determining by combining an N3 GTP-U SN corresponding to a PDCP SN of a PDCP PDU lost on the first link, an N3 GTP-U SN of an N3 GTP-U PDU lost on the first sublink, and an N3 GTP-U SN corresponding to an N9 GTP-U SN of an N9 GTP-U PDU lost on the second sublink, to determine the quantity of consecutive lost packets on the user plane path.

In the case 3, optionally, the method further includes: The SMF sends indication information to the terminal, the I-UPF, and the PSA UPF, where the indication information is used to indicate a corresponding network node to feed back packet loss information. After receiving the indication information, the terminal may feed back packet loss information on the first link to the RAN node based on the indication information. After receiving the indication information, the I-UPF may feed back packet loss information on the first sublink to the RAN node and further feed back packet loss information on the second sublink to the PSA UPF, based on the indication information. After receiving the indication information, the PSA UPF feeds back packet loss information on the second sublink to the I-UPF based on the indication information.

The indication information may explicitly indicate, for example, by using a value of one or more bits, whether to feed back the packet loss information. The indication information may alternatively give an implicit indication, for example, by using the survival time corresponding to the service. In this case, when a QoS parameter that corresponds to a QoS flow and that is received by the terminal (or the I-UPF or the PSA UPF) includes the survival time corresponding to the service, the terminal (or the I-UPF or the PSA UPF) determines to feed back the packet loss information.

Case 4: The first device is the PSA UPF.

The following uses a case 4.1 as an example to describe determining of a packet loss status of an uplink packet on each link in the case 4, and uses a case 4.2 as an example to describe determining of a packet loss status of a downlink packet on each link in the case 4.

Case 4.1: Uplink Packet

The following uses a case 4.1.1 as an example to describe determining of the packet loss status on the first link in the case 4.1, and uses a case 4.1.2 as an example to describe determining of the packet loss status on the second link in the case 4.1.

Case 4.1.1: Packet Loss Status on the First Link

The case 4.1.1 includes the following steps 4.1.1-11 and 4.1.1-12.

4.1.1-11: The I-UPF sends fifteenth packet loss information to the PSA UPF, where the fifteenth packet loss information is used to indicate a packet that is in the service flow and that is lost on the first link. Correspondingly, the PSA UPF receives the fifteenth packet loss information from the I-UPF.

Before step 4.1.1-11, the RAN node may determine a packet that is not correctly received, and send, to the I-UPF, information used to indicate the packet, so that the I-UPF determines the packet that is in the service flow and that is lost on the first link.

4.1.1-12: The PSA UPF determines the packet loss status of the service flow on the first link based on the fifteenth packet loss information.

In different SN mapping manners used between a PDCP SN and an N3 GTP-U SN and between an N3 GTP-U SN and an N9 GTP-U SN, the fifteenth packet loss information indicates different information. The following provides descriptions separately.

The SN mapping manner 1 is used for mapping between a PDCP SN and an N3 GTP-U SN, and the SN mapping manner 1 or the SN mapping manner 2 is used for mapping between an N3 GTP-U SN and an N9 GTP-U SN.

In this case, a PDCP SN of each packet correctly received by the RAN node corresponds to an N3 GTP-U SN of the packet sent by the RAN node, and N3 GTP-U SNs of packets consecutively sent by the RAN node are consecutive. In this case, the fifteenth packet loss information is used to indicate an N9 GTP-U SN corresponding to a PDCP SN of a correctly received packet previous to the packet that is not correctly received by the RAN node on the first link, and the fifteenth packet loss information is further used to indicate that one packet or a plurality of consecutive packets subsequent to the packet indicated by the fifteenth packet loss information is/are lost.

In this case, before step 4.1.1-11, the RAN node may determine a PDCP SN of a correctly received PDCP PDU previous to a PDCP PDU that is not correctly received, convert the PDCP SN to an N3 GTP-U SN, and send the N3 GTP-U SN to the I-UPF. When generating the fifteenth packet loss information, the I-UPF further converts the N3 GTP-U SN to an N9 GTP-U SN.

The SN mapping manner 2 is used for both mapping between a PDCP SN and an N3 GTP-U SN and mapping between an N3 GTP-U SN and an N9 GTP-U SN.

In this case, a difference between a PDCP SN of each packet correctly received by the RAN node and an N3 GTP-U SN of the packet sent by the RAN node is the same (for a same numbering periodicity), and a difference between an N3 GTP-U SN of each packet correctly received by the I-UPF and an N9 GTP-U SN of the packet sent by the I-UPF is the same (for a same numbering periodicity). In this case, the fifteenth packet loss information is an N9 GTP-U SN corresponding to a PDCP SN of the packet that is not correctly received by the RAN node on the first link.

In this case, before step 4.1.1-11, the RAN node may determine a PDCP SN of a PDCP PDU that is not correctly received, convert the PDCP SN to an N3 GTP-U SN, and send the N3 GTP-U SN to the I-UPF. When generating the fifteenth packet loss information, the I-UPF converts the N3 GTP-U SN to an N9 GTP-U SN.

For specific analysis about that information indicated by the fifteenth packet loss information varies due to different SN mapping manners, refer to the related descriptions about the SN mapping manner in the foregoing case 2.1.1. A principle is similar, and details are not described herein again.

Case 4.1.2: Packet Loss Status on the Second Link

The case 4.1.2 may be implemented in the following manner 1, manner 2, or manner 3.

Manner 1:

The manner 1 includes the following steps 4.1.2-11 to 4.1.2-14.

4.1.2-11: The I-UPF sends sixteenth packet loss information to the PSA UPF, where the sixteenth packet loss information is used to indicate a packet that is in the service flow and that is lost on the first sublink. Correspondingly, the PSA UPF receives the sixteenth packet loss information from the I-UPF.

Before step 4.1.2-11, the I-UPF may determine the packet that is not correctly received by the I-UPF on the first sublink, and a determining method is similar to the method used by the UPF to determine the packet that is not correctly received by the UPF on the second link in the scenario 1. For details, refer to the descriptions of the foregoing related part, and the details are not described herein again.

4.1.2-12: The I-UPF sends a packet in the service flow to the PSA UPF. Correspondingly, the PSA UPF receives the packet in the service flow from the I-UPF.

The packet sent by the I-UPF to the PSA UPF is received from the RAN node. SNs of N9 GTP-U PDUs sent by the I-UPF to the PSA UPF are consecutive.

4.1.2-13: The PSA UPF determines a packet loss status of the service flow on the second sublink based on consecutiveness of N9 GTP-U SNs of correctly received packets.

4.1.2-14: The PSA UPF determines the packet loss status of the service flow on the second link based on the sixteenth packet loss information and the packet loss status of the service flow on the second sublink.

Manner 2:

The manner 2 includes the following steps 4.1.2-21 to 4.1.2-24.

4.1.2-21: The I-UPF sends a packet in the service flow to the PSA UPF. Correspondingly, the PSA UPF receives the packet in the service flow from the I-UPF.

The packet sent by the I-UPF to the PSA UPF is received from the RAN node. SNs of N9 GTP-U PDUs sent by the I-UPF to the PSA UPF are consecutive.

4.1.2-22: The PSA UPF sends an ACK to the I-UPF for each correctly received packet. Correspondingly, the I-UPF receives, from the PSA UPF, the ACK sent by the PSA UPF for each correctly received packet.

4.1.2-23: The I-UPF sends sixteenth packet loss information and seventeenth packet loss information to the PSA UPF based on depending on whether an ACK for each sent packet is received, where the sixteenth packet loss information is used to indicate a packet that is in the service flow and that is lost on the first sublink, and the seventeenth packet loss information is used to indicate an N9 GTP-U SN of a packet that is not correctly received by the PSA UPF. Correspondingly, the PSA UPF receives the sixteenth packet loss information and the seventeenth packet loss information from the I-UPF.

Before step 4.1.2-23, the I-UPF may determine, based on the depending on whether the ACK for each sent packet is received, the packet that is not correctly received by the PSA UPF, and further determine the seventeenth packet loss information. In addition, the I-UPF may obtain the packet that is not correctly received by the I-UPF on the first sublink, and then determine the sixteenth packet loss information. An obtaining method is similar to the method used by the UPF to obtain the packet that is not correctly received by the UPF on the second link in the scenario 1. For details, refer to the foregoing for understanding, and the details are not described herein again.

4.1.2-24: The PSA UPF determines the packet loss status of the service flow on the second link based on the sixteenth packet loss information and the seventeenth packet loss information.

In different SN mapping manners used between an N3 GTP-U SN and an N9 GTP-U SN, the sixteenth packet loss information indicates different information. The following provides descriptions separately.

SN Mapping Manner 1:

In the SN mapping manner 1, an N3 GTP-U SN of each packet correctly received by the I-UPF corresponds to an N9 GTP-U SN of the packet sent by the I-UPF, and N9 GTP-U SNs of packets consecutively sent by the I-UPF are consecutive. In this case, the sixteenth packet loss information is used to indicate an N9 GTP-U SN corresponding to an N3 GTP-U SN of a correctly received packet previous to the packet that is not correctly received by the I-UPF on the first sublink, and the sixteenth packet loss information is further used to indicate that one packet or a plurality of consecutive packets subsequent to the packet indicated by the sixteenth packet loss information is/are lost.

In this case, the I-UPF may determine an N3 GTP-U SN of a correctly received N3 GTP-U PDU previous to an N3 GTP-U PDU that is not correctly received. When generating the sixteenth packet loss information, the I-UPF converts the N3 GTP-U SN to an N9 GTP-U SN.

SN Mapping Manner 2:

In the SN mapping manner 2, a difference between an N3 GTP-U SN of each packet correctly received by the I-UPF and an N9 GTP-U SN of the packet sent by the I-UPF is the same. In this case, the sixteenth packet loss information is an N9 GTP-U SN corresponding to an N3 GTP-U SN of the packet that is not correctly received by the I-UPF on the first sublink.

In this case, the I-UPF may determine an N3 GTP-U SN of a correctly received N3 GTP-U PDU previous to an N3 GTP-U PDU that is not correctly received. When generating the sixteenth packet loss information, the I-UPF converts the N3 GTP-U SN to an N9 GTP-U SN.

For specific analysis about that information indicated by the sixteenth packet loss information varies due to different SN mapping manners, refer to the related descriptions about the SN mapping manner in the foregoing case 2.1.1. A principle is similar, and details are not described herein again.

Manner 3:

The manner 3 may include the following steps 4.1.2-31 and 4.1.2-32.

4.1.2-31: The I-UPF sends a packet in the service flow to the PSA UPF. Correspondingly, the PSA UPF receives the packet in the service flow from the I-UPF.

The packet sent by the I-UPF to the PSA UPF is received from the RAN node.

4.1.2-32: The PSA UPF determines the packet loss status of the service flow on the second link based on consecutiveness of N9 GTP-U SNs of correctly received packets.

In the manner 3, the SN mapping manner 2 is used for SN mapping between an N3 GTP-U SN and an N9 GTP-U SN. In this case, because an N3 GTP-U SN of a lost N3 GTP-U PDU also corresponds to an N9 GTP-U SN, the PSA UPF may directly determine, based on consecutiveness of N9 GTP-U SNs of received N9 GTP-U PDUs, a packet that is in the service flow and that is lost on the second link.

In the case 4.1, the PSA UPF may determine the quantity of consecutive lost packets on the user plane path based on the packet loss status on the first link and the packet loss status on the second link. When the SN mapping manner 2 is used for both SN mapping between a PDCP SN and an N3 GTP-U SN and SN mapping between an N3 GTP-U SN and an N9 GTP-U SN, because a PDCP SN of each lost PDCP PDU also corresponds to an N3 GTP-U SN, and an N3 GTP-U SN of each lost N3 GTP-U PDU also corresponds to an N9 GTP-U SN, the PSA UPF may directly determine, based on consecutiveness of N9 GTP-U SNs of correctly received N9 GTP-U PDUs, a packet that is in the service flow and that is lost on the user plane path.

Case 4.2: Downlink Packet

The following uses a case 4.2.1 as an example to describe determining of the packet loss status on the first link in the case 4.2, and uses a case 4.2.2 as an example to describe determining of the packet loss status on the second link in the case 4.2.

Case 4.2.1: Packet Loss Status on the First Link

The case 4.2.1 includes the following steps 4.2.1-11 and 4.2.1-12.

4.2.1-11: The I-UPF sends eighteenth packet loss information to the PSA UPF, where the eighteenth packet loss information is used to indicate an N9 GTP-U SN corresponding to a PDCP SN of a packet that is in the service flow and that is lost on the first link. Correspondingly, the PSA UPF receives the eighteenth packet loss information from the I-UPF.

Before step 4.2.1-11, the RAN node may determine a PDCP SN of a PDCP PDU that is not correctly received by the terminal, and send an N3 GTP-U SN corresponding to the PDCP SN to the I-UPF. The I-UPF determines an N9

GTP-U SN (namely, the eighteenth packet loss information) corresponding to the received N3 GTP-U SN.

4.2.1-12: The PSA UPF determines the packet loss status of the service flow on the first link based on the eighteenth packet loss information.

During specific implementation of step 4.2.1-12, the PSA UPF may determine that an N9 GTP-U PDU corresponding to the N9 GTP-U SN in the eighteenth packet loss information is lost.

Case 4.2.2: Packet Loss Status on the Second Link

The case 4.2.2 includes the following steps 4.2.2-11 and 4.2.2-12.

4.2.2-11: The I-UPF sends nineteenth packet loss information to the PSA UPF, where the nineteenth packet loss information is used to indicate N9 GTP-U SNs of packets in the service flow that are lost on the first sublink and the second sublink. Correspondingly, the PSA UPF receives the nineteenth packet loss information from the I-UPF.

During specific implementation of step 4.2.2-11, the I-UPF may obtain an N3 GTP-U SN of an N3 GTP-U PDU that is not correctly received by the RAN node on the first sublink, further obtain an N9 GTP-U SN of an N9 GTP-U PDU that is not correctly received by the I-UPF on the second sublink, and send, to the PSA UPF, an N9 GTP-U SN corresponding to the N3 GTP-U SN of the N3 GTP-U PDU that is not correctly received by the RAN node on the first sublink and the N9 GTP-U SN of the N9 GTP-U PDU that is not correctly received by the I-UPF on the second sublink.

4.2.2-12: The PSA UPF determines the packet loss status of the service flow on the second link based on the nineteenth packet loss information.

During specific implementation of step 4.2.2-12, the PSA UPF may determine that N9 GTP-U PDUs corresponding to the N9 GTP-U SNs in the nineteenth packet loss information are lost.

In the case 4, if the PSA UPF determines the quantity of consecutive lost packets on the user plane path based on the packet loss status on the first link and the packet loss status on the second link, the PSA UPF may perform determining by combining an N9 GTP-U SN corresponding to a PDCP SN of a PDCP PDU lost on the first link, an N9 GTP-U SN corresponding to an N3 GTP-U SN of an N3 GTP-U PDU lost on the first sublink, and an N9 GTP-U SN of an N9 GTP-U PDU lost on the second sublink, to determine the quantity of consecutive lost packets on the user plane path.

In the case 4, optionally, the method further includes: The SMF sends indication information to the terminal, the RAN node, and the I-UPF, where the indication information is used to indicate a corresponding network node to feed back packet loss information. After receiving the indication information, the terminal may feed back packet loss information on the first link to the RAN node based on the indication information. After receiving the indication information, the RAN node feeds back packet loss information on the first sublink to the I-UPF based on the indication information. After receiving the indication information, the I-UPF may feed back packet loss information on the first sublink to the RAN node and further feed back packet loss information on the second sublink to the PSA UPF, based on the indication information.

The indication information may explicitly indicate, for example, by using a value of one or more bits, whether to feed back the packet loss information. The indication information may alternatively give an implicit indication, for example, by using the survival time corresponding to the service. In this case, when a QoS parameter that corresponds to a QoS flow and that is received by the terminal (or the RAN node or the I-UPF) includes the survival time corresponding to the service, the terminal (or the RAN node or the I-UPF) determines to feed back the packet loss information.

Second application scenario: The user plane path is the user plane path between the RAN node and the DN.

Figure 8:
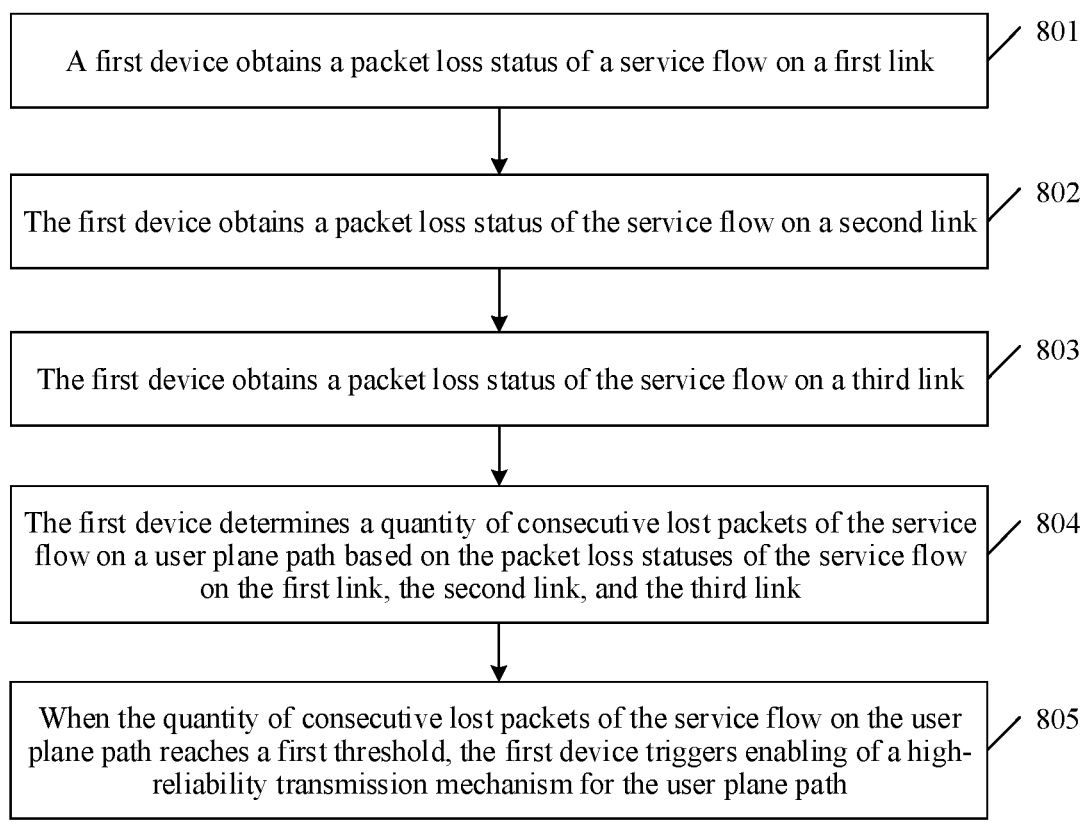

Refer to FIG. 8. In the second application scenario, the communication method provided in this application includes the following steps.

801: A first device obtains a packet loss status of a service flow on a first link.

In the single-UPF scenario and the multi-UPF scenario, the first device may be the RAN node or the PSA UPF.

In the single-UPF scenario and the multi-UPF scenario, for specific implementation of step 801, refer to the related descriptions in the first application scenario. Details are not described again.

802: The first device obtains a packet loss status of the service flow on a second link.

In the single-UPF scenario and the multi-UPF scenario, for specific implementation of step 802, refer to the related descriptions in the first application scenario. Details are not described again.

803: The first device obtains a packet loss status of the service flow on a third link.

In the single-UPF scenario, the PSA UPF may determine a packet lost on the third link. A method used by the PSA UPF to determine the packet lost on the third link includes: obtaining, by the PSA UPF, a periodicity of a packet in the service flow, and determining, based on the periodicity, whether packet loss occurs. For example, if the periodicity is T but a packet is received at an interval of 2T, it indicates that packet loss occurs. Alternatively, the PSA UPF maintains a timer for a service flow. When receiving a data packet in the service flow, the PSA UPF starts the timer. If no new data packet in the service flow is received when the timer expires, it indicates that the packet loss occurs. Duration of the timer is related to the periodicity T; or may be preset, predefined, specified in a protocol, or preconfigured. This is not limited in this application. The PSA UPF may obtain the periodicity of the packet in the service flow from the SMF or a network data analytics function (NWDAF), and the SMF may obtain the periodicity of the packet in the service flow from a PCF or an AF.

In the single-UPF scenario, if the first device is the RAN node, the PSA UPF further needs to send packet loss information to the RAN node, where the packet loss information indicates an N3 GTP-U SN of a packet that is correctly received by the PSA UPF and that is previous to the packet lost on the third link, and the packet loss information further indicates that one or more consecutive packets subsequent to the N3 GTP-U SN are lost, so that the RAN node determines the packet lost on the third link.

In the multi-UPF scenario, the PSA UPF may determine a packet lost on the third link. A determining method is similar to the method used by the PSA UPF to determine the packet lost on the third link in the single-UPF scenario, and details are not described herein again.

In the multi-UPF scenario, if the first device is the RAN node, the PSA UPF further needs to send packet loss information to the I-UPF, where the packet loss information indicates an N9 GTP-U SN of a packet that is correctly received by the PSA UPF and that is previous to the packet lost on the third link, and the packet loss information further indicates that one or more consecutive packets subsequent to the N9 GTP-U SN are lost. After receiving the packet loss information, the I-UPF sends, to the RAN node, an N3 GTP-U SN corresponding to the N9 GTP-U SN indicated by the packet loss information, and indicates, to the RAN node, that one or more consecutive packets subsequent to the N3 GTP-U SN are lost, so that the RAN node determines the packet lost on the third link.

There is no sequence of performing step 801, step 802, and step 803, and a specific sequence is related to an application scenario. For example, when the first device is the RAN node, for an uplink packet, an execution sequence may be step 801, step 802, and step 803; and for a downlink packet, an execution sequence may be step 803, step 802, and step 801.

804: The first device determines a quantity of consecutive lost packets of the service flow on the user plane path based on the packet loss statuses of the service flow on the first link, the second link, and the third link.

805: When the quantity of consecutive lost packets of the service flow on the user plane path reaches a first threshold, the first device triggers enabling of a high-reliability transmission mechanism for the user plane path.

When packets lost on all the links in the user plane path cause the quantity of consecutive lost packets on the user plane path to reach the first threshold, a high-reliability user plane transmission mechanism for the entire user plane path may be enabled. This is similar to the case in the first application scenario. When a quantity of consecutive lost packets on one or more links in the user plane path causes the quantity of consecutive lost packets on the user plane path to reach the first threshold, only a high-reliability user plane transmission mechanism for the corresponding link may be enabled, or a high-reliability user plane transmission mechanism for the entire user plane path may be enabled.

Specific implementation of the steps in the embodiment shown in FIG. 8 is similar to that in the first application scenario. For details, refer to the descriptions in the first application scenario for understanding, and the details are not described herein again.

In the communication method shown in FIG. 8, the first device may determine the quantity of consecutive lost packets on the user plane path from the terminal to an AS, to more accurately determine a packet loss status of the service flow; and enable the high-reliability transmission mechanism for the user plane path when the quantity of consecutive lost packets on the user plane path reaches the first threshold. This improves data transmission reliability, avoids application shutdown, and improves user experience.

To make the embodiments of this application clearer, the following uses Embodiment 1 to Embodiment 4 as examples to describe an implementation procedure of the foregoing method.

Embodiment 1

Figure 9A:
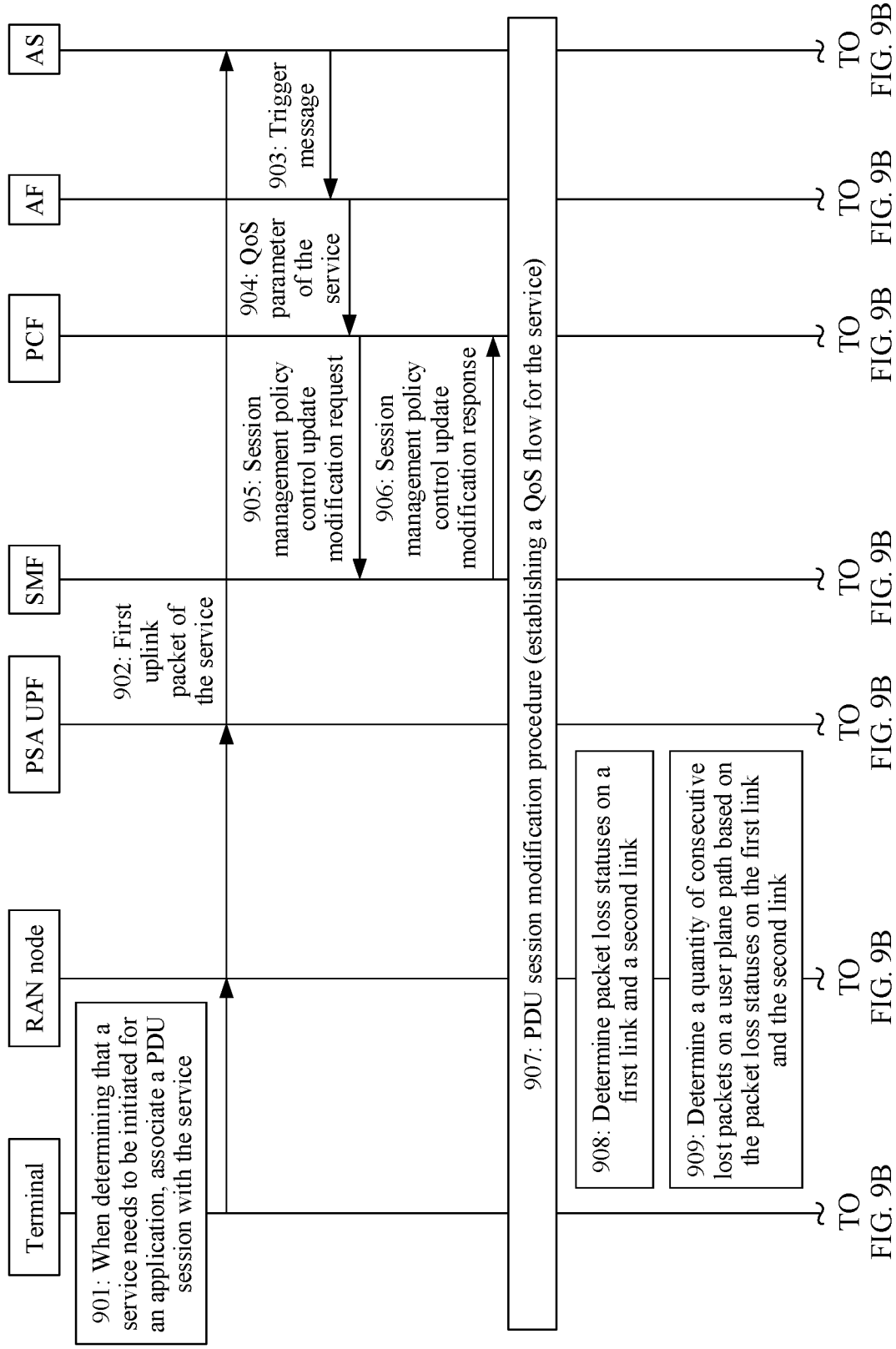

An example is used in Embodiment 1 to describe the procedure of the method provided in this application in the foregoing case 1. In this case, a communication scenario is a single-UPF scenario, and a first device is a RAN node. Refer to FIG. 9A and FIG. 9B. A method includes the following steps.

901: When determining that a service needs to be initiated for an application, a terminal associates a PDU session with the service.

During specific implementation of step 901, if a PDU session that meets a QoS requirement of the service already exists in the terminal, the terminal associates the PDU session with the service. Otherwise, the terminal establishes a PDU session for the service by interacting with a core network, and associates the service with the session.

902: The terminal sends the first uplink packet of the service to an AS by using a default QoS flow on the PDU session associated with the service. Correspondingly, the AS receives the first uplink packet of the service from the terminal.

The default QoS flow is a QoS flow established by an SMF for a PDU session by using a configured default PCC rule when the SMF establishes the PDU session, and each PDU session has one default QoS flow.

903: The AS sends a trigger message to an AF based on the received first uplink packet of the service, where the trigger message is used to trigger the AF to send a QoS parameter of the service to a PCF. Correspondingly, the AF receives the trigger message from the AS.

904: The AF sends the QoS parameter of the service to the PCF based on the trigger message. Correspondingly, the PCF receives the QoS parameter of the service from the AF.

The QoS parameter of the service includes survival time corresponding to the service.

905: The PCF sends a session management policy control update modification request (SMPolicyControlUpdateNotify request) to the SMF based on the QoS parameter of the service. Correspondingly, the SMF receives the session management policy control update modification request from the PCF.

The session management policy control update modification request includes a PCC rule for the service. The PCC rule includes the survival time corresponding to the service.

During specific implementation of step 905, when finding that the QoS parameter includes the survival time corresponding to the service, the PCF determines to establish a separate QoS flow for the service. In this case, the PCF sends the session management policy control update modification request to the SMF.

906: The SMF sends a session management policy control update modification response (SMPolicyControlUpdateNotify response) to the PCF.

The session management policy control update modification response is used to indicate whether the session management policy control update modification request is successfully received.

907: The SMF initiates a PDU session modification procedure according to the PCC rule of the service, and establishes the QoS flow for the service in the PDU session modification procedure.

In a subsequent process, uplink and downlink packets of the service are transmitted by using the QoS flow.

In addition, when establishing the QoS flow for the service, the SMF sends a QoS rule to the terminal, where the QoS rule includes a QoS parameter corresponding to the QoS flow, and the QoS parameter includes the survival time corresponding to the service; and the SMF further sends a QoS profile to the RAN node, where the QoS profile includes a QoS parameter corresponding to the QoS flow, and the QoS parameter includes the survival time corresponding to the service.

908: The RAN node determines packet loss statuses on a first link and a second link.

For specific implementation of step 908, refer to the descriptions in the foregoing case 1. Details are not described herein again.

Before step 908, optionally, the method further includes: The SMF sends indication information to the terminal and a PSA UPF, where the indication information is used to indicate a corresponding network node to feed back packet loss information. For specific descriptions, refer to the foregoing descriptions. Details are not described herein again.

909: The RAN node determines a quantity of consecutive lost packets on a user plane path based on the packet loss statuses on the first link and the second link.

910: If the quantity of consecutive lost packets reaches a first threshold, the RAN node enables high-reliability user plane transmission mechanisms between the RAN node and the PSA UPF and between the RAN node and the terminal.

911: The RAN node sends enabling information 1 to the SMF, where the enabling information 1 indicates that a high-reliability transmission mechanism for the user plane path needs to be enabled. Correspondingly, the SMF receives the enabling information 1 from the RAN node.

912: The SMF sends enabling information 2 to the PSA UPF based on the enabling information 1, where the enabling information 2 is used to enable a high-reliability user plane transmission mechanism of a corresponding network node. Correspondingly, the PSA UPF receives the enabling information 2.

913: The PSA UPF enables the high-reliability user plane transmission mechanism between the PSA UPF and the RAN node based on the enabling information 2.

914: The SMF sends the enabling information 2 to the terminal based on the enabling information 1. Correspondingly, the terminal receives the enabling information 2.

915: The terminal enables the high-reliability user plane transmission mechanism between the terminal and the RAN node based on the enabling information 2.

Embodiment 2

Figure 10A:
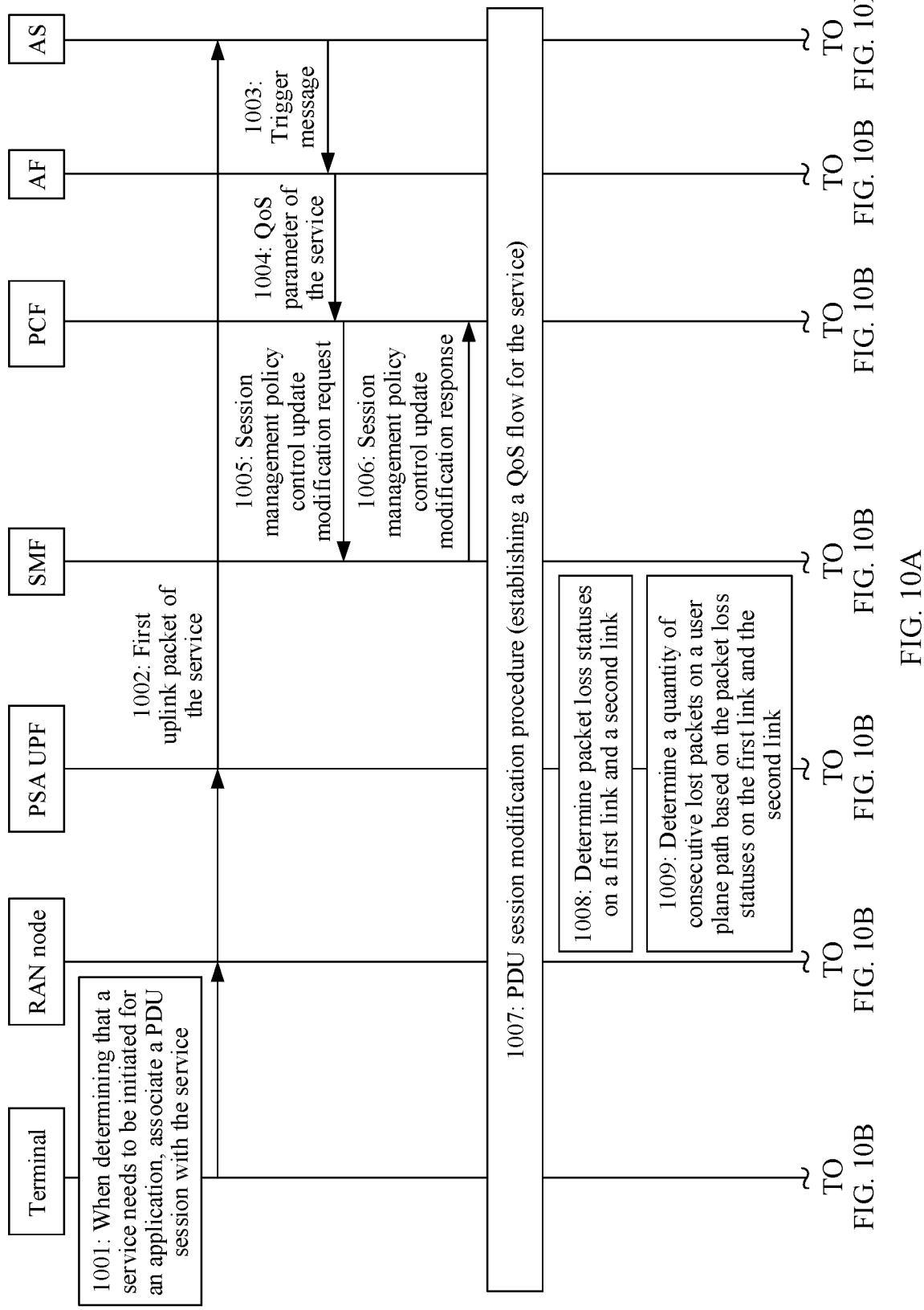
Figure 10B:
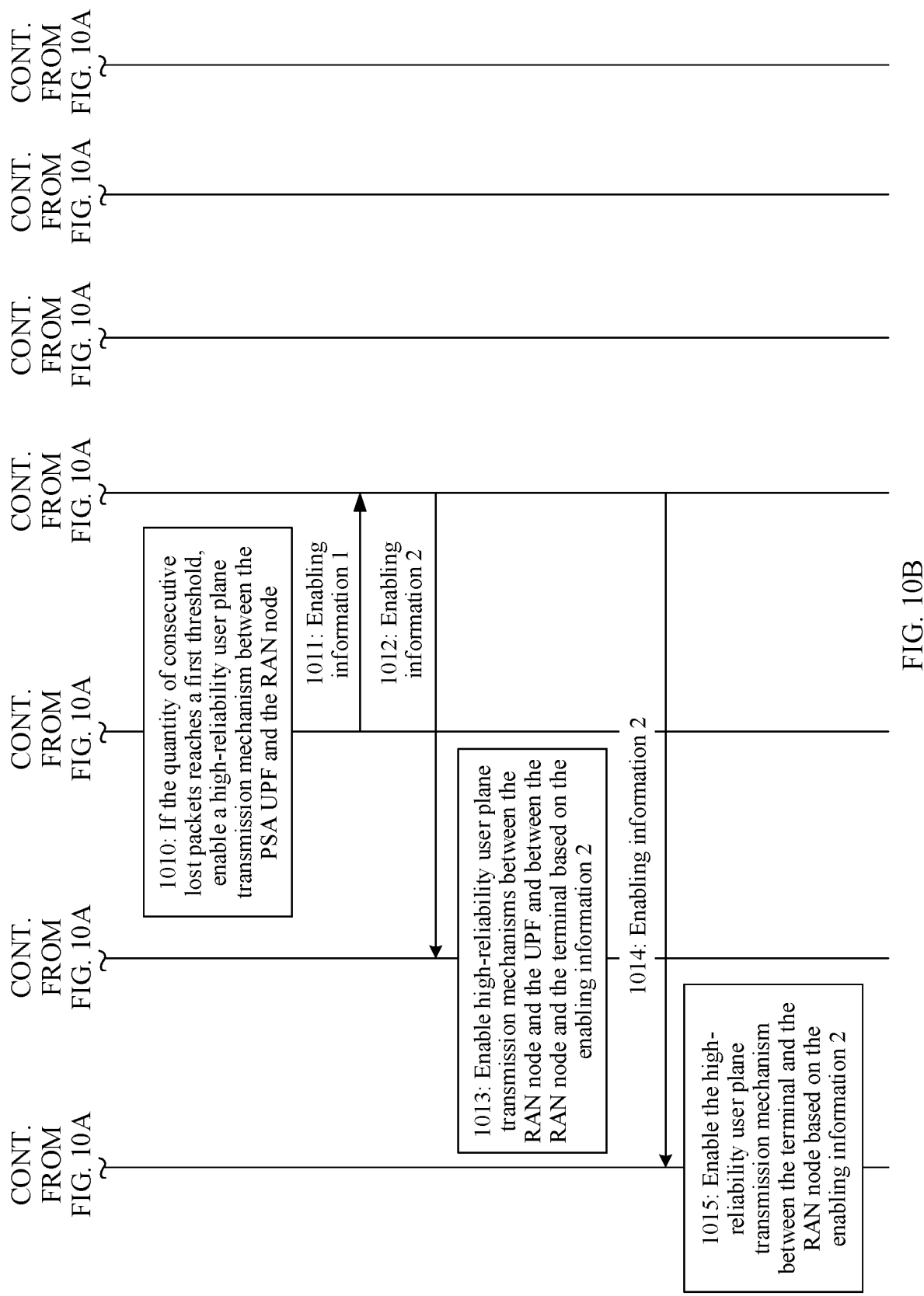

An example is used in Embodiment 2 to describe the procedure of the method provided in this application in the foregoing case 2. In this case, a communication scenario is a single-UPF scenario, and a first device is a PSA UPF. Refer to FIG. 10A and FIG. 10B. A method includes the following steps.

1001 to 1007 are respectively the same as 901 to 907.

1008: The PSA UPF determines packet loss statuses on a first link and a second link.

For specific implementation of step 1008, refer to the descriptions in the foregoing case 2. Details are not described herein again.

Before step 1008, optionally, the method further includes: The SMF sends indication information to the terminal and a RAN node, where the indication information is used to indicate a corresponding network node to feed back packet loss information. For specific descriptions, refer to the foregoing descriptions. Details are not described herein again.

1009: The PSA UPF determines a quantity of consecutive lost packets on a user plane path based on the packet loss statuses on the first link and the second link.

1010: If the quantity of consecutive lost packets reaches a first threshold, the PSA UPF enables a high-reliability user plane transmission mechanism between the PSA UPF and the RAN node.

1011: The PSA UPF sends enabling information 1 to the SMF, where the enabling information 1 indicates that a high-reliability transmission mechanism for the user plane path needs to be enabled. Correspondingly, the SMF receives the enabling information 1 from the PSA UPF.

1012: The SMF sends enabling information 2 to the RAN node based on the enabling information 1, where the enabling information 2 is used to enable a high-reliability user plane transmission mechanism of a corresponding network node. Correspondingly, the RAN node receives the enabling information 2.

1013: The RAN node enables high-reliability user plane transmission mechanisms between the RAN node and the PSA UPF and between the RAN node and the terminal based on the enabling information 2.

1014: The SMF sends the enabling information 2 to the terminal based on the enabling information 1. Correspondingly, the terminal receives the enabling information 2.

1015: The terminal enables the high-reliability user plane transmission mechanism between the terminal and the RAN node based on the enabling information 2.

Embodiment 3

Figure 11A:
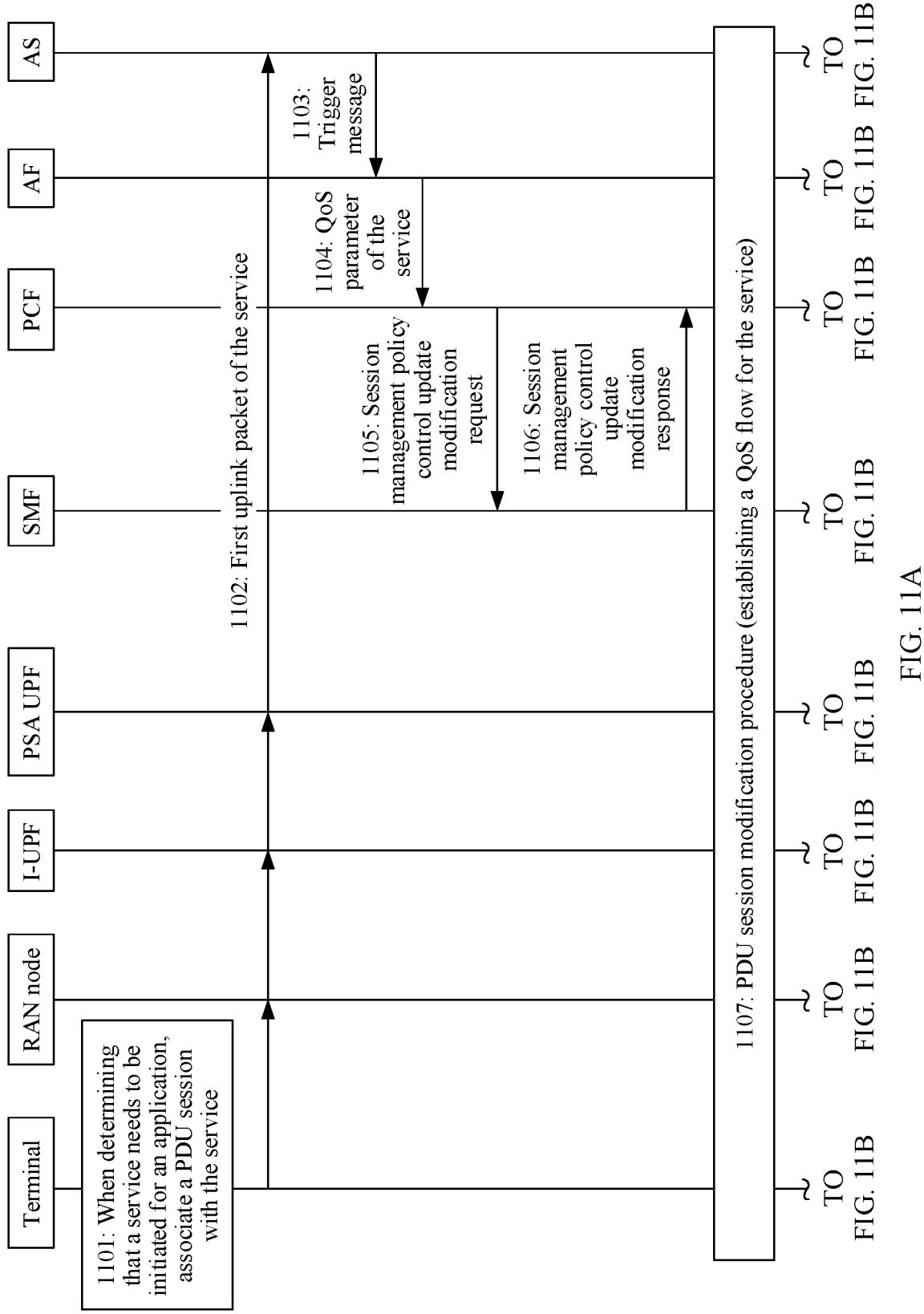

An example is used in Embodiment 3 to describe the procedure of the method provided in this application in the foregoing case 3. In this case, a communication scenario is a multi-UPF scenario, and a first device is a RAN node. Refer to FIG. 11A to FIG. 11C. A method includes the following steps.

1101 to 1107 are respectively the same as 901 to 907.

1108: The RAN node determines packet loss statuses on a first link, a first sublink, and a second sublink.

For specific implementation of step 1108, refer to the descriptions in the foregoing case 3. Details are not described herein again.

Before step 1108, optionally, the method further includes: The SMF sends indication information to the terminal, an I-UPF, and a PSA UPF, where the indication information is used to indicate a corresponding network node to feed back packet loss information. For specific descriptions, refer to the foregoing descriptions. Details are not described herein again.

1109: The RAN node determines a quantity of consecutive lost packets on a user plane path based on the packet loss statuses on the first link, the first sublink, and the second sublink.

1110: If the quantity of consecutive lost packets reaches a first threshold, the RAN node enables high-reliability user plane transmission mechanisms between the RAN node and the I-UPF and between the RAN node and the terminal.

1111: The RAN node sends enabling information 1 to the SMF, where the enabling information 1 indicates that a high-reliability transmission mechanism for the user plane path needs to be enabled. Correspondingly, the SMF receives the enabling information 1 from the RAN node.

1112: The SMF sends enabling information 2 to the I-UPF based on the enabling information 1, where the enabling information 2 is used to enable a high-reliability user plane transmission mechanism of a corresponding network node. Correspondingly, the I-UPF receives the enabling information 2.

1113: The I-UPF enables high-reliability user plane transmission mechanisms between the I-UPF and the RAN node and between the I-UPF and the PSA UPF based on the enabling information 2.

1114: The SMF sends the enabling information 2 to the terminal based on the enabling information 1. Correspondingly, the terminal receives the enabling information 2.

1115: The terminal enables the high-reliability user plane transmission mechanism between the terminal and the RAN node based on the enabling information 2.

1116: The SMF sends the enabling information 2 to the PSA UPF based on the enabling information 1, where the enabling information 2 is used to enable a high-reliability user plane transmission mechanism of a corresponding network node. Correspondingly, the PSA UPF receives the enabling information 2.

1117: The PSA UPF enables the high-reliability user plane transmission mechanism between the PSA UPF and the I-UPF based on the enabling information 2.

Embodiment 4

Figure 12A:
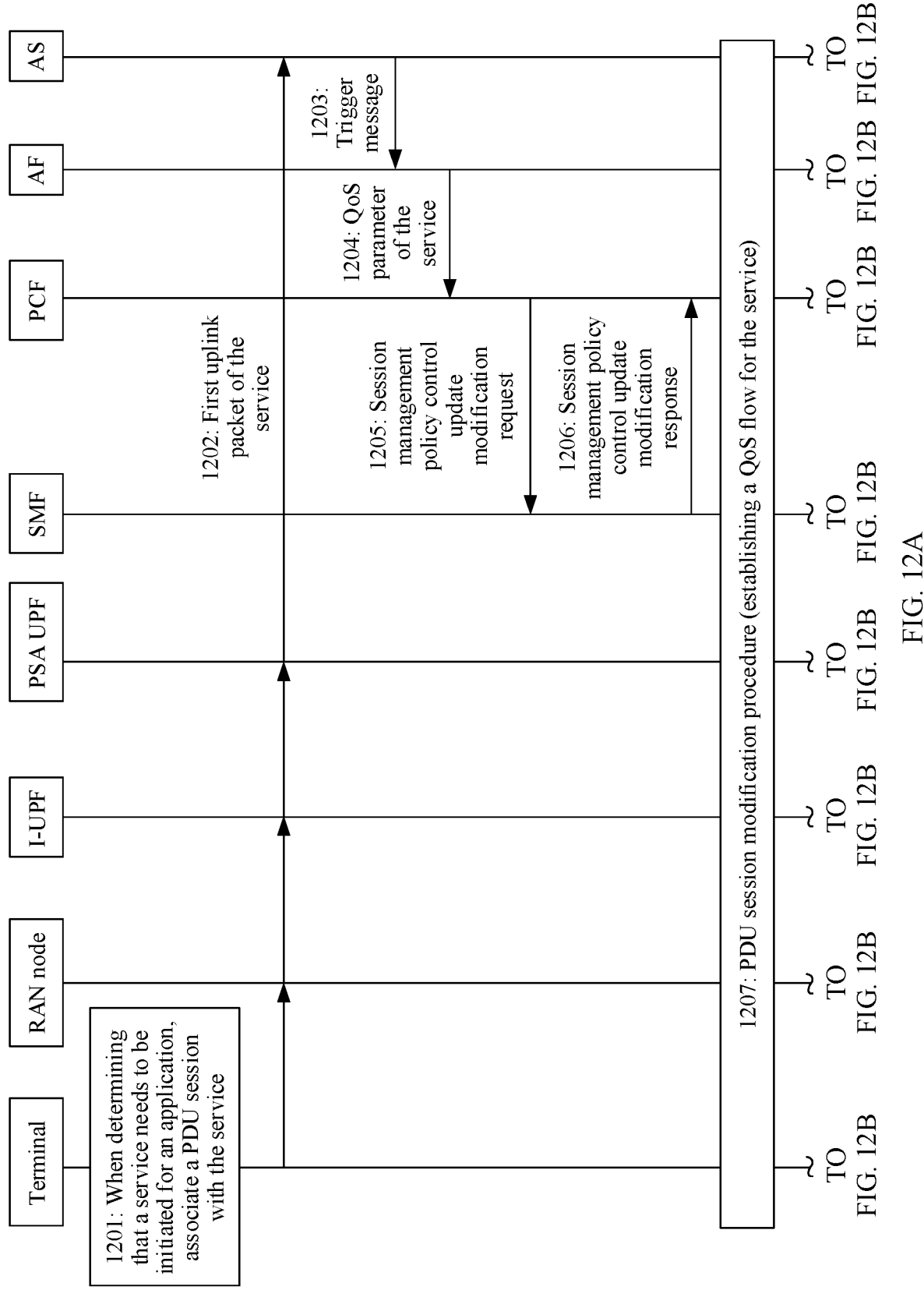
Figure 12B:
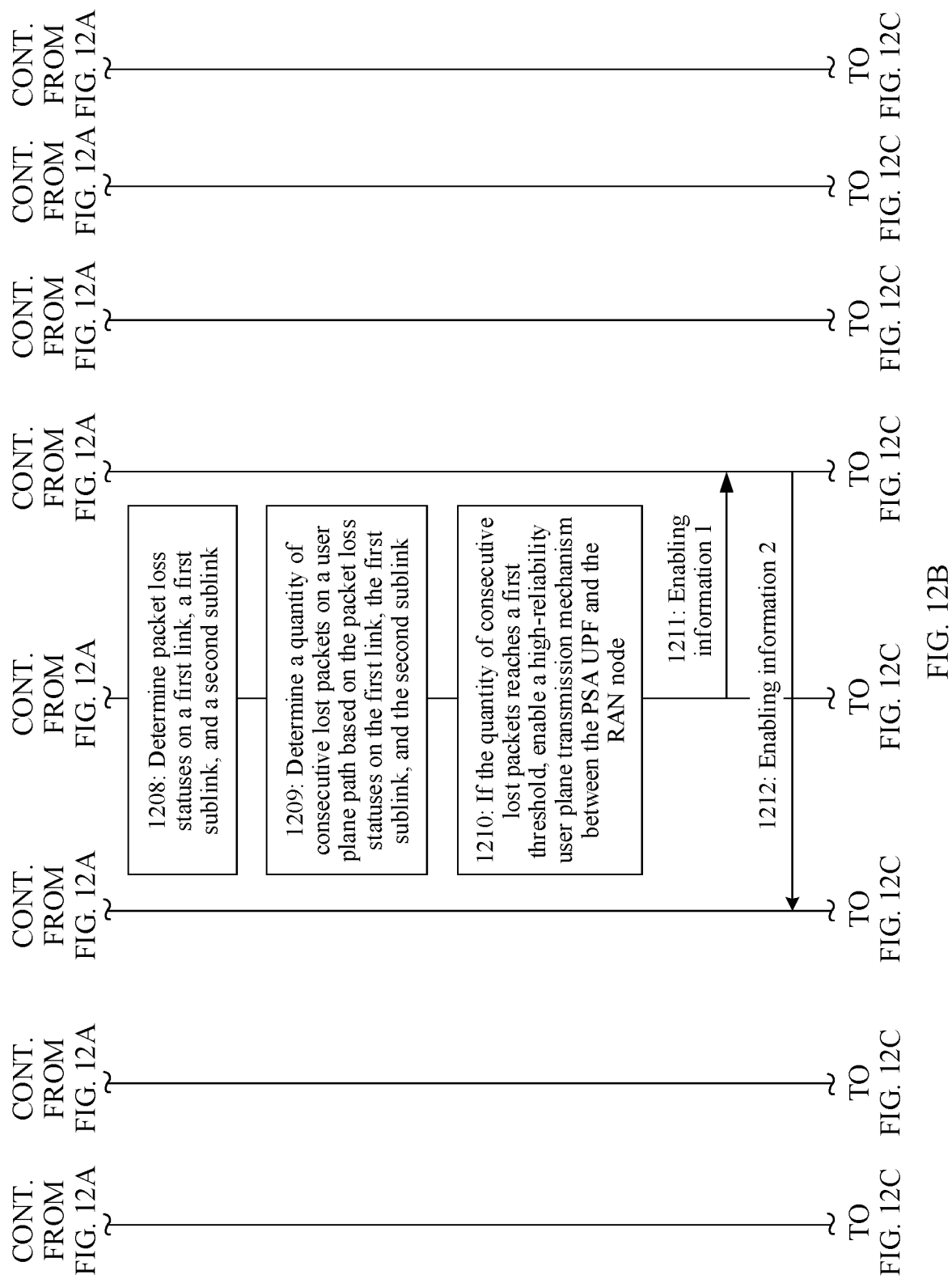

An example is used in Embodiment 4 to describe the procedure of the method provided in this application in the foregoing case 4. In this case, a communication scenario is a multi-UPF scenario, and a first device is a PSA UPF. Refer to FIG. 12A to FIG. 12C. A method includes the following steps.

1201 to 1207 are respectively the same as 901 to 907.

1208: The PSA UPF determines packet loss statuses on a first link, a first sublink, and a second sublink.

For specific implementation of step 1208, refer to the descriptions in the foregoing case 4. Details are not described herein again.

Before step 1208, optionally, the method further includes: The SMF sends indication information to the terminal, a RAN node, and an I-UPF, where the indication information is used to indicate a corresponding network node to feed back packet loss information. For specific descriptions, refer to the foregoing descriptions. Details are not described herein again.

1209: The PSA UPF determines a quantity of consecutive lost packets on a user plane path based on the packet loss statuses on the first link, the first sublink, and the second sublink.

1210: If the quantity of consecutive lost packets reaches a first threshold, the PSA UPF enables a high-reliability user plane transmission mechanism between PSA UPF and the RAN node.

1211: The PSA UPF sends enabling information 1 to the SMF, where the enabling information 1 indicates that a high-reliability transmission mechanism for the user plane path needs to be enabled. Correspondingly, the SMF receives the enabling information 1 from the PSA UPF.

1212: The SMF sends enabling information 2 to the I-UPF based on the enabling information 1, where the enabling information 2 is used to enable a high-reliability user plane transmission mechanism of a corresponding network node. Correspondingly, the I-UPF receives the enabling information 2.

1213: The I-UPF enables high-reliability user plane transmission mechanisms between the I-UPF and the RAN node and between the I-UPF and the PSA UPF based on the enabling information 2.

1214: The SMF sends the enabling information 2 to the terminal based on the enabling information 1. Correspondingly, the terminal receives the enabling information 2.

1215: The terminal enables a high-reliability user plane transmission mechanism between the terminal and the RAN node based on the enabling information 2.

1216: The SMF sends the enabling information 2 to the RAN node based on the enabling information 1, where the enabling information 2 is used to enable a high-reliability user plane transmission mechanism of a corresponding network node. Correspondingly, the RAN node receives the enabling information 2.

1217: The RAN node enables the high-reliability user plane transmission mechanisms between the RAN node and the I-UPF and between the RAN node and the terminal based on the enabling information 2.

In Embodiment 1 to Embodiment 4, enabling of the high-reliability user plane transmission mechanism for the entire user plane path is used as an example. During actual implementation, a high-reliability user plane transmission mechanism for a part of links in the user plane path may alternatively be enabled. This is not limited in this application.

An embodiment of this application further provides a communication system. The communication system includes a RAN node and an SMF. A PDU session of a terminal is anchored to a PSA UPF through the RAN node, a user plane path between the terminal and the PSA UPF includes a first link and a second link, the first link is a user plane data link for communication between the terminal and the RAN node, and the second link is a user plane data link for communication between the RAN node and the PSA UPF.

The SMF is configured to send information about survival time corresponding to a service flow to a first device, where the first device is the RAN node or the PSA UPF.

The first device is configured to receive the information about the survival time from the SMF, and determine a first threshold based on the information about the survival time.

The first device is further configured to obtain packet loss statuses of the service flow on the first link and the second link.

The first device is further configured to determine a quantity of consecutive lost packets of the service flow on the user plane path based on the packet loss statuses of the service flow on the first link and the second link.

When the quantity of consecutive lost packets of the service flow on the user plane path reaches the first threshold, the first device is further configured to trigger enabling of a high-reliability transmission mechanism for the user plane path.

Optionally, that the quantity of consecutive lost packets of the service flow on the user plane path reaches the first threshold is specifically: a quantity of consecutive lost packets of the service flow on the first link in the user plane path reaches the first threshold; and the first device is specifically configured to trigger enabling of a high-reliability transmission mechanism for the first link in the user plane path; or the first device is specifically configured to trigger enabling of high-reliability transmission mechanisms for the first link and the second link in the user plane path.

Optionally, when the first device is the RAN node, the first device is specifically configured to send first enabling information to the terminal, and trigger the first device to enable the high-reliability transmission mechanism for the first link, where the first enabling information indicates that the high-reliability transmission mechanism for the first link needs to be enabled; and the terminal is configured to receive the first enabling information from the first device, and enable the high-reliability transmission mechanism for the first link based on the first enabling information.

Optionally, the first device is specifically configured to send second enabling information to the SMF, where the second enabling information indicates that the high-reliability transmission mechanism for the first link needs to be enabled; and the SMF is configured to receive the second enabling information from the first device, and control the enabling of the high-reliability transmission mechanism for the first link based on the second enabling information.

Optionally, that the quantity of consecutive lost packets of the service flow on the user plane path reaches the first threshold is specifically: a quantity of consecutive lost packets of the service flow on the second link in the user plane path reaches the first threshold; and the first device is specifically configured to trigger enabling of a high-reliability transmission mechanism for the second link in the user plane path; or the first device is specifically configured to trigger enabling of high-reliability transmission mechanisms for the first link and the second link in the user plane path.

Optionally, when the first device is the RAN node, the first device is specifically configured to send third enabling information to the PSA UPF, and trigger the first device to enable the high-reliability transmission mechanism for the second link, where the third enabling information indicates that the high-reliability transmission mechanism for the second link needs to be enabled; and the PSA UPF is configured to receive the third enabling information from the first device, and enable the high-reliability transmission mechanism for the second link based on the third enabling information.

Optionally, when the first device is the PSA UPF, the first device is specifically configured to send fourth enabling information to the RAN node, and trigger the first device to enable the high-reliability transmission mechanism for the second link, where the fourth enabling information indicates that the high-reliability transmission mechanism for the second link needs to be enabled; and the RAN node is configured to receive the fourth enabling information from the first device, and enable the high-reliability transmission mechanism for the second link based on the fourth enabling information.

Optionally, the first device is specifically configured to send fifth enabling information to the SMF, where the fifth enabling information indicates that the high-reliability transmission mechanism for the second link needs to be enabled; and the SMF is configured to receive the fifth enabling information from the first device, and control the enabling of the high-reliability transmission mechanism for the second link based on the fifth enabling information.

Optionally, that the quantity of consecutive lost packets of the service flow on the user plane path reaches the first threshold is specifically: a quantity of consecutive lost packets of the service flow on the first link in the user plane path is less than the first threshold, a quantity of consecutive lost packets of the service flow on the second link is less than the first threshold, and a total quantity of consecutive lost packets of the service flow on the first link and the second link reaches the first threshold; and the first device is specifically configured to trigger enabling of high-reliability transmission mechanisms for the first link and the second link in the user plane path.

Optionally, the first device is specifically configured to send sixth enabling information to the SMF, where the sixth enabling information indicates that the high-reliability transmission mechanisms for the first link and the second link need to be enabled; and the SMF is configured to receive the sixth enabling information from the first device, and control the enabling of the high-reliability transmission mechanisms for the first link and the second link based on the sixth enabling information.

Optionally, the first device is the access network device; and the first device is configured to determine the quantity of consecutive lost packets of the service flow on the user plane path based on a PDCP SN of a packet that is in the service flow and that is lost on the first link, an N3 GTP-U SN of a packet that is in the service flow and that is lost on the second link, and a mapping relationship between a PDCP SN and an N3 GTP-U SN of a packet in the service flow.

Optionally, when the first device is the RAN node, for an uplink packet, the terminal is configured to send the packet in the service flow to the RAN node;

the RAN node is configured to receive the packet in the service flow from the terminal; and the RAN node is further configured to determine the packet loss status of the service flow on the first link based on consecutiveness of PDCP SNs of correctly received packets.

Optionally, when the first device is the RAN node, for an uplink packet, the terminal is configured to send the packet in the service flow to the RAN node;

the RAN node is configured to receive the packet in the service flow from the terminal, and send a positive acknowledgment ACK to the terminal for each correctly received packet;

the terminal is further configured to receive, from the RAN node, the ACK sent by the RAN node to the terminal for each correctly received packet, and send first packet loss information to the RAN node based on depending on whether an ACK for each sent packet is received, where the first packet loss information is used to indicate a PDCP SN of a packet that is not correctly received by the RAN node; and the RAN node is further configured to receive the first packet loss information from the terminal, and determine the packet loss status of the service flow on the first link based on the first packet loss information.

Optionally, when the first device is the RAN node, for an uplink packet, the PSA UPF is configured to send second packet loss information to the RAN node, where the second packet loss information is used to indicate an N3 GTP-U SN of a packet that is not correctly received by the PSA UPF; and the RAN node is configured to receive the second packet loss information from the PSA UPF, and determine the packet loss status of the service flow on the second link based on the second packet loss information.

Optionally, when the first device is the RAN node, for an uplink packet, the RAN node is configured to send the packet in the service flow to the PSA UPF;

the PSA UPF is configured to receive the packet in the service flow from the RAN node, and send an ACK to the RAN node for each correctly received packet; and the RAN node is further configured to receive, from the PSA UPF, the ACK sent by the PSA UPF for each correctly received packet, and determine the packet loss status of the service flow on the second link based on depending on whether an ACK for each sent packet is received.

Optionally, when the first device is the RAN node, for a downlink packet, the terminal is configured to send third packet loss information to the RAN node, where the third packet loss information is used to indicate a PDCP SN of a packet that is not correctly received by the terminal; and the RAN node is configured to receive the third packet loss information from the terminal, and determine the packet loss status of the service flow on the first link based on the third packet loss information.

Optionally, when the first device is the RAN node, for a downlink packet, the RAN node is configured to send the packet in the service flow to the terminal;

the terminal is configured to receive the packet in the service flow from the RAN node, and send an ACK to the RAN node for each correctly received packet; and the RAN node is further configured to receive, from the terminal, the ACK sent by the terminal for each correctly received packet, and determine the packet loss status of the service flow on the first link based on depending on whether an ACK for each sent packet is received.

Optionally, when the first device is the RAN node, for a downlink packet, the PSA UPF is configured to send the packet in the service flow to the RAN node; and the RAN node is configured to receive the packet in the service flow from the PSA UPF, and determine the packet loss status of the service flow on the second link based on consecutiveness of N3 GTP-U SNs of correctly received packets.

Optionally, for a downlink packet, the PSA UPF is configured to send the packet in the service flow to the RAN node;

the RAN node is configured to receive the packet in the service flow from the PSA UPF, and send an ACK to the PSA UPF for each correctly received packet;

the PSA UPF is further configured to receive, from the RAN node, the ACK sent by the RAN node to the PSA UPF for each correctly received packet, and send fourth packet loss information to the RAN node based on depending on whether an ACK for each sent packet is received, where the fourth packet loss information is used to indicate an N3 GTP-U SN of a packet that is not correctly received by the RAN node; and the RAN node is further configured to receive the fourth packet loss information from the PSA UPF, and determine the packet loss status of the service flow on the second link based on the fourth packet loss information.

Optionally, when the first device is the PSA UPF, for an uplink packet, the RAN node is configured to send fifth packet loss information to the PSA UPF, where the fifth packet loss information is used to indicate a packet that is in the service flow and that is lost on the first link; and the PSA UPF is configured to receive the fifth packet loss information from the RAN node, and determine the packet loss status of the service flow on the first link based on the fifth packet loss information.

Optionally, a PDCP SN of each packet correctly received by the RAN node corresponds to an N3 GTP-U SN of the packet sent by the RAN node, N3 GTP-U SNs of packets consecutively sent by the RAN node are consecutive, the fifth packet loss information is used to indicate an N3 GTP-U SN of a correctly received packet previous to the packet that is not correctly received by the RAN node on the first link, and the fifth packet loss information is further used to indicate that one packet or a plurality of consecutive packets subsequent to the packet indicated by the fifth packet loss information is/are lost.

Alternatively, a difference between a PDCP SN of each packet correctly received by the RAN node and an N3 GTP-U SN of the packet sent by the RAN node is the same, and the fifth packet loss information is an N3 GTP-U SN of the packet that is not correctly received by the RAN node on the first link.

Optionally, when the first device is the PSA UPF, for an uplink packet, the RAN node is configured to send the packet in the service flow to the PSA UPF; and the PSA UPF is configured to receive the packet in the service flow from the RAN node, and determine the packet loss status of the service flow on the second link based on consecutiveness of N3 GTP-U SNs of correctly received packets.

Optionally, when the first device is the PSA UPF, for an uplink packet, the RAN node is configured to send the packet in the service flow to the PSA UPF;

the PSA UPF is configured to receive the packet in the service flow from the RAN node, and send an ACK to the RAN node for each correctly received packet;

the RAN node is further configured to receive, from the PSA UPF, the ACK sent by the PSA UPF for each correctly received packet, and send sixth packet loss information to the PSA UPF based on depending on whether an ACK for each sent packet is received, where the sixth packet loss information is used to indicate an N3 GTP-U SN of a packet that is not correctly received by the PSA UPF; and the PSA UPF is further configured to receive the sixth packet loss information from the RAN node, and determine the packet loss status of the service flow on the second link based on the sixth packet loss information.

Optionally, when the first device is the PSA UPF, for a downlink packet, the RAN node is configured to send seventh packet loss information to the PSA UPF, where the seventh packet loss information is used to indicate an N3 GTP-U SN of a packet that is in the service flow and that is lost on the first link; and the PSA UPF is configured to receive the seventh packet loss information from the RAN node, and determine the packet loss status of the service flow on the first link based on the seventh packet loss information.

Optionally, when the first device is the PSA UPF, for a downlink packet, the RAN node is configured to send eighth packet loss information to the PSA UPF, where the eighth packet loss information is used to indicate an N3 GTP-U SN of a packet that is not correctly received by the RAN node; and the PSA UPF is configured to receive the eighth packet loss information from the RAN node, and determine the packet loss status of the service flow on the second link based on the eighth packet loss information.

Optionally, when the first device is the PSA UPF, for a downlink packet, the PSA UPF is configured to send the packet in the service flow to the RAN node;

the RAN node is configured to receive the packet in the service flow from the PSA UPF, and send an ACK to the PSA UPF for each correctly received packet; and the PSA UPF is further configured to receive, from the RAN node, the ACK sent by the RAN node for each correctly received packet, and determine the packet loss status of the service flow on the second link based on depending on whether an ACK for each sent packet is received.

Optionally, the PSA UPF communicates with the RAN node through an I-UPF, the second link includes a first sublink and a second sublink, the first sublink is a user plane data link for communication between the RAN node and the I-UPF, and the second sublink is a user plane data link for communication between the I-UPF and the PSA UPF.

Optionally, when a quantity of consecutive lost packets of the service flow on the first link, the first sublink, and the second sublink in the user plane path reaches the first threshold, the first device is configured to trigger enabling of high-reliability transmission mechanisms for the first link, the first sublink, and the second sublink in the user plane path.

Optionally, the first device is specifically configured to send seventh enabling information to the SMF, where the seventh enabling information indicates that the high-reliability transmission mechanisms for the first link, the first sublink, and the second sublink need to be enabled; and the SMF is configured to receive the seventh enabling information from the first device, and control the enabling of the high-reliability transmission mechanisms for the first link, the first sublink, and the second sublink based on the seventh enabling information.

Optionally, when the first device is the RAN node, for an uplink packet, the terminal is configured to send the packet in the service flow to the RAN node; and the RAN node is configured to receive the packet in the service flow from the terminal, and determine the packet loss status of the service flow on the first link based on consecutiveness of PDCP SNs of correctly received packets.

Optionally, when the first device is the RAN node, for an uplink packet, the terminal is configured to send the packet in the service flow to the RAN node;

the RAN node is configured to receive the packet in the service flow from the terminal, and send an ACK to the terminal for each correctly received packet;

the terminal is further configured to receive, from the RAN node, the ACK sent by the RAN node to the terminal for each correctly received packet, and send ninth packet loss information to the RAN node based on depending on whether an ACK for each sent packet is received, where the ninth packet loss information is used to indicate a PDCP SN of a packet that is not correctly received by the RAN node; and the RAN node is further configured to receive the ninth packet loss information from the terminal, and determine the packet loss status of the service flow on the first link based on the ninth packet loss information.

Optionally, when the first device is the RAN node, for an uplink packet, the I-UPF is configured to send tenth packet loss information to the RAN node, where the tenth packet loss information is used to indicate an N3 GTP-U SN of a packet that is not correctly received by the I-UPF on the first sublink and an N3 GTP-U SN of a packet that is not correctly received by the PSA UPF on the second sublink; and the RAN node is configured to receive the tenth packet loss information from the I-UPF, and determine the packet loss status of the service flow on the second link based on the tenth packet loss information.

Optionally, when the first device is the RAN node, for an uplink packet, the RAN node is configured to send the packet in the service flow to the I-UPF;

the I-UPF is configured to receive the packet in the service flow from the RAN node, and send an ACK to the RAN node for each correctly received packet;

the RAN node is further configured to receive, from the I-UPF, the ACK sent by the I-UPF for each correctly received packet, and determine a packet loss status of the service flow on the first sublink based on depending on whether an ACK for each sent packet is received;

the I-UPF is further configured to send eleventh packet loss information to the RAN node, where the eleventh packet loss information is used to indicate an N3 GTP-U SN of a packet that is not correctly received by the PSA UPF on the second sublink; and the RAN node is further configured to receive the eleventh packet loss information from the I-UPF, and determine the packet loss status of the service flow on the second link based on the eleventh packet loss information and the packet loss status of the service flow on the first sublink.

Optionally, when the first device is the RAN node, for a downlink packet, the terminal is configured to send twelfth packet loss information to the RAN node, where the twelfth packet loss information is used to indicate a PDCP SN of a packet that is not correctly received by the terminal; and the RAN node is configured to receive the twelfth packet loss information from the terminal, and determine the packet loss status of the service flow on the first link based on the twelfth packet loss information.

Optionally, when the first device is the RAN node, for a downlink packet, the RAN node is configured to send the packet in the service flow to the terminal;

the terminal is configured to receive the packet in the service flow from the RAN node, and send an ACK to the RAN node for each correctly received packet; and the RAN node is configured to receive, from the terminal, the ACK sent by the terminal for each correctly received packet, and determine the packet loss status of the service flow on the first link based on depending on whether an ACK for each sent packet is received.

Optionally, when the first device is the RAN node, for a downlink packet, the I-UPF is configured to send the packet in the service flow to the RAN node;

the RAN node is configured to receive the packet in the service flow from the I-UPF, and determine, based on consecutiveness of N3 GTP-U SNs of correctly received packets, an N3 GTP-U SN of a packet that is not correctly received by the RAN node on the first sublink;

the I-UPF is further configured to send thirteenth packet loss information to the RAN node, where the thirteenth packet loss information is used to indicate a packet that is not correctly received by the I-UPF on the second sublink; and the RAN node is further configured to receive the thirteenth packet loss information from the I-UPF, and determine the packet loss status of the service flow on the second link based on the thirteenth packet loss information and the N3 GTP-U SN of the packet that is not correctly received by the RAN node on the first sublink.

Optionally, when the first device is the RAN node, for a downlink packet, the I-UPF is configured to send the packet in the service flow to the RAN node;

the RAN node is configured to receive the packet in the service flow from the I-UPF, and send an ACK to the I-UPF for each correctly received packet;

the I-UPF is further configured to receive, from the RAN node, the ACK sent by the RAN node to the I-UPF for each correctly received packet, and send thirteenth packet loss information and fourteenth packet loss information to the RAN node based on depending on whether an ACK for each sent packet is received, where the thirteenth packet loss information is used to indicate a packet that is not correctly received by the I-UPF on the second sublink, and the fourteenth packet loss information is used to indicate an N3 GTP-U SN of a packet that is not correctly received by the RAN node on the first sublink; and the RAN node is further configured to receive the thirteenth packet loss information and the fourteenth packet loss information from the I-UPF, and determine the packet loss status of the service flow on the second link based on the thirteenth packet loss information and the fourteenth packet loss information.

Optionally, an N9 GTP-U SN of each packet correctly received by the I-UPF corresponds to an N3 GTP-U SN of the packet sent by the I-UPF, N3 GTP-U SNs of packets consecutively sent by the I-UPF are consecutive, the thirteenth packet loss information is used to indicate an N3 GTP-U SN of a correctly received packet previous to the packet that is not correctly received by the I-UPF on the second sublink, and the thirteenth packet loss information is further used to indicate that one packet or a plurality of consecutive packets subsequent to the packet indicated by the thirteenth packet loss information is/are lost.

Alternatively, a difference between an N9 GTP-U SN of each packet correctly received by the I-UPF and an N3 GTP-U SN of the packet sent by the I-UPF is the same, and the thirteenth packet loss information is an N3 GTP-U SN of the packet that is not correctly received by the I-UPF on the second sublink.

Optionally, when the first device is the PSA UPF, for an uplink packet, the I-UPF is configured to send fifteenth packet loss information to the PSA UPF, where the fifteenth packet loss information is used to indicate a packet that is in the service flow and that is lost on the first link; and the PSA UPF is configured to receive the fifteenth packet loss information from the I-UPF, and determine the packet loss status of the service flow on the first link based on the fifteenth packet loss information.

Optionally, a PDCP SN of each packet correctly received by the RAN node corresponds to an N3 GTP-U SN of the packet sent by the RAN node, N3 GTP-U SNs of packets consecutively sent by the RAN node are consecutive, the fifteenth packet loss information is used to indicate an N9 GTP-U SN of a correctly received packet previous to the packet that is not correctly received by the RAN node on the first link, and the fifteenth packet loss information is further used to indicate that one packet or a plurality of consecutive packets subsequent to the packet indicated by the fifteenth packet loss information is/are lost.

Alternatively, a difference between a PDCP SN of each packet correctly received by the RAN node and an N3 GTP-U SN of the packet sent by the RAN node is the same, a difference between an N3 GTP-U SN of each packet correctly received by the I-UPF and an N9 GTP-U SN of the packet sent by the I-UPF is the same, and the fifteenth packet loss information is an N9 GTP-U SN of the packet that is not correctly received by the RAN node on the first link.

Optionally, when the first device is the PSA UPF, for an uplink packet, the I-UPF is configured to send sixteenth packet loss information to the PSA UPF, where the sixteenth packet loss information is used to indicate a packet that is in the service flow and that is lost on the first sublink;

the PSA UPF is configured to receive the sixteenth packet loss information from the I-UPF;

the I-UPF is further configured to send the packet in the service flow to the PSA UPF;

the PSA UPF is further configured to receive the packet in the service flow from the I-UPF, and determine a packet loss status of the service flow on the second sublink based on consecutiveness of N9 GTP-U SNs of correctly received packets; and the PSA UPF is further configured to determine the packet loss status of the service flow on the second link based on the sixteenth packet loss information and the packet loss status of the service flow on the second sublink.

Optionally, when the first device is the PSA UPF, for an uplink packet, the I-UPF is configured to send the packet in the service flow to the PSA UPF;

the PSA UPF is configured to receive the packet in the service flow from the I-UPF, and send an ACK to the I-UPF for each correctly received packet;

the I-UPF is further configured to receive, from the PSA UPF, the ACK sent by the PSA UPF for each correctly received packet, and send sixteenth packet loss information and seventeenth packet loss information to the PSA UPF based on depending on whether an ACK for each sent packet is received, where the sixteenth packet loss information is used to indicate a packet that is in the service flow and that is lost on the first sublink, and the seventeenth packet loss information is used to indicate an N9 GTP-U SN of a packet that is not correctly received by the PSA UPF; and the PSA UPF is further configured to receive the sixteenth packet loss information and the seventeenth packet loss information from the I-UPF, and determine the packet loss status of the service flow on the second link based on the sixteenth packet loss information and the seventeenth packet loss information.

Optionally, an N3 GTP-U SN of each packet correctly received by the I-UPF corresponds to an N9 GTP-U SN of the packet sent by the I-UPF, N9 GTP-U SNs of packets consecutively sent by the I-UPF are consecutive, the sixteenth packet loss information is used to indicate an N9 GTP-U SN of a correctly received packet previous to the packet that is not correctly received by the I-UPF on the first sublink, and the sixteenth packet loss information is further used to indicate that one packet or a plurality of consecutive packets subsequent to the packet indicated by the sixteenth packet loss information is/are lost.

Alternatively, a difference between an N3 GTP-U SN of each packet correctly received by the I-UPF and an N9 GTP-U SN of the packet sent by the I-UPF is the same, and the sixteenth packet loss information is an N9 GTP-U SN of the packet that is not correctly received by the I-UPF on the first sublink.

Optionally, when the first device is the PSA UPF, for a downlink packet, the I-UPF is configured to send eighteenth packet loss information to the PSA UPF, where the eighteenth packet loss information is used to indicate an N9 GTP-U SN of a packet that is in the service flow and that is lost on the first link; and the PSA UPF is configured to receive the eighteenth packet loss information from the I-UPF, and determine the packet loss status of the service flow on the first link based on the eighteenth packet loss information.

Optionally, when the first device is the PSA UPF, for a downlink packet, the I-UPF is configured to send nineteenth packet loss information to the PSA UPF, where the nineteenth packet loss information is used to indicate N9 GTP-U SNs of packets in the service flow that are lost on the first sublink and the second sublink; and the PSA UPF is configured to receive the nineteenth packet loss information from the I-UPF, and determine the packet loss status of the service flow on the second link based on the nineteenth packet loss information.

For specific implementation of the network nodes in the communication system, refer to the foregoing descriptions. Details are not described herein again.

In addition, in the method and the communication system provided in the foregoing embodiments, the quantity of consecutive lost packets may alternatively be an accumulated quantity of lost packets in a time period. In this case, a condition for enabling the high-reliability user plane transmission mechanism may be: The accumulated quantity of lost packets of the service flow on the user plane path reaches a third threshold within the time period. The time period and the third threshold may be preset, predefined, specified in a protocol, or preconfigured. This is not limited in this application.

It should be noted that, in the foregoing embodiments of this application, enabling the high-reliability transmission mechanism for the first link means that when transmission reliability on the first link is relatively low (for example, the quantity of consecutive lost packets on the first link reaches the first threshold), the high-reliability transmission mechanism is enabled between the terminal and the RAN node to improve reliability of transmitting the packet in the service flow on the first link. Therefore, in the embodiments of this application, "enabling a high-reliability transmission mechanism for the first link" may alternatively be replaced with "enabling a high-reliability transmission mechanism between the terminal and the RAN node for the service flow". Similarly, "enabling a high-reliability transmission mechanism for the second link" may alternatively be replaced with "enabling a high-reliability transmission mechanism between the PSA-UPF and the RAN node for the service flow"; "enabling high-reliability transmission mechanisms for the first link and the second link" or "enabling high-reliability transmission mechanisms for the first link, the first sublink, and the second sublink" may alternatively be replaced with "enabling high-reliability transmission mechanisms between the terminal and the PSA-UPF for the service flow; "enabling a high-reliability transmission mechanism for the first sublink" may alternatively be replaced with "enabling a high-reliability transmission mechanism between the I-UPF and the RAN node for the service flow"; and "enabling a high-reliability transmission mechanism for the second sublink" may alternatively be replaced with "enabling a high-reliability transmission mechanism between the I-UPF and the PSA-UPF for the service flow".

In addition, because the user plane path is used to transmit the packet in the service flow, "enabling a high-reliability transmission mechanism for the user plane path" may alternatively be replaced with "enabling a high-reliability transmission mechanism for the service flow".

The foregoing mainly describes the solutions of the embodiments of this application from the perspective of the method. It may be understood that to implement the foregoing functions, the network elements such as the RAN node, the PSA UPF, the I-UPF, and the terminal each include at least one of a corresponding hardware structure and a corresponding software module for implementing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the RAN node, the PSA UPF, the I-UPF, and the terminal may be divided into functional units based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that, in the embodiments of this application, division into the units is an example and merely logical function division, and may be other division in an actual implementation.

Figure 13:
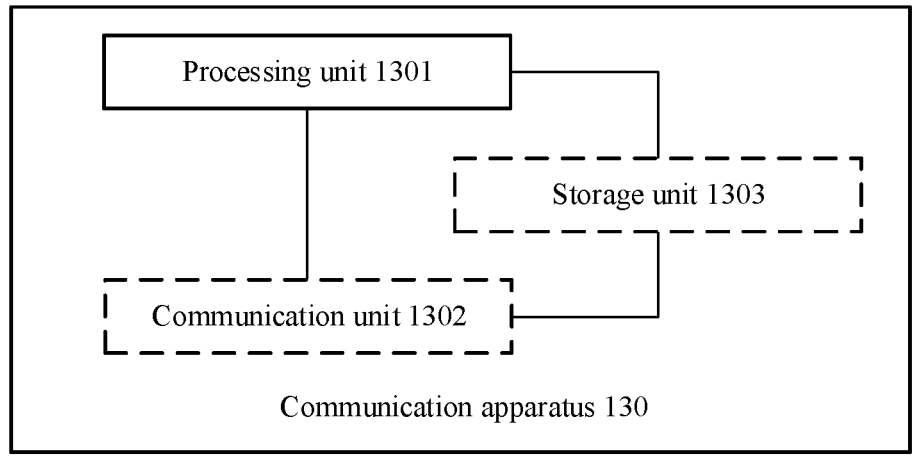
FIG. 13 is a schematic composition diagram of a communication apparatus according to an embodiment of this application.

For example, FIG. 13 is a possible schematic diagram of a structure of a communication apparatus (denoted as a communication apparatus 130) in the foregoing embodiments. The communication apparatus 130 includes a processing unit 1301. Optionally, the communication apparatus 130 further includes a communication unit 1302 and/or a storage unit 1303. The schematic diagram of the structure shown in FIG. 13 may be used to illustrate a structure of the RAN node, the PSA UPF, the I-UPF, or the terminal in the foregoing embodiments.

When the schematic diagram of the structure shown in FIG. 13 is used to illustrate the structure of the RAN node in the foregoing embodiments, the processing unit 1301 is configured to control and manage actions of the RAN node. For example, the processing unit 1301 is configured to perform 701 to 704 in FIG. 7 (in this case, a first device is the RAN node); 801 to 805 in FIG. 8 (in this case, the first device is the RAN node); 902 and 907 to 911 in FIG. 9A and FIG. 9B; 1002, 1007, 1012, and 1013 in FIG. 10A and FIG. 10B; 1102 and 1107 to 1111 in FIG. 11A to FIG. 11C; 1202, 1207, 1216, and 1217 in FIG. 12A to FIG. 12C; and/or an action performed by the RAN node in another process described in the embodiments of this application. The processing unit 1301 may communicate with another network entity through the communication unit 1302, for example, communicate with an SMF in FIG. 11A to FIG. 11C. The storage unit 1303 is configured to store program code and data of the RAN node.

When the schematic diagram of the structure shown in FIG. 13 is used to illustrate the structure of the PSA UPF in the foregoing embodiments, the processing unit 1301 is configured to control and manage actions of the PSA UPF. For example, the processing unit 1301 is configured to perform 701 to 704 in FIG. 7 (in this case, a first device is the PSA UPF); 801 to 805 in FIG. 8 (in this case, the first device is the PSA UPF); 902, 907, 912, and 913 in FIG. 9A and FIG. 9B; 1002 and 1007 to 1011 in FIG. 10A and FIG. 10B; 1102, 1107, 1116, and 1117 in FIG. 11A to FIG. 11C; 1202 and 1207 to 1211 in FIG. 12A to FIG. 12C; and/or an action performed by the PSA UPF in another process described in the embodiments of this application. The processing unit 1301 may communicate with another network entity through the communication unit 1302, for example, communicate with an SMF shown in FIG. 11A to FIG. 11C. The storage unit 1303 is configured to store program code and data of the PSA UPF.

When the schematic diagram of the structure shown in FIG. 13 is used to illustrate the structure of the I-UPF in the foregoing embodiments, the processing unit 1301 is configured to control and manage actions of the I-UPF. For example, the processing unit 1301 is configured to perform 1102, 1107, 1112, and 1113 in FIG. 11A to FIG. 11C; 1202, 1207, 1212, and 1213 in FIG. 12A to FIG. 12C; and/or an action performed by the I-UPF in another process described in the embodiments of this application. The processing unit 1301 may communicate with another network entity through the communication unit 1302, for example, communicate with an SMF shown in FIG. 11A to FIG. 11C. The storage unit 1303 is configured to store program code and data of the I-UPF.

When the schematic diagram of the structure shown in FIG. 13 is used to illustrate the structure of the terminal in the foregoing embodiments, the processing unit 1301 is configured to control and manage actions of the terminal. For example, the processing unit 1301 is configured to perform 901, 902, 907, 914, and 915 in FIG. 9A and FIG. 9B; 1001, 1002, 1007, 1014, and 1015 in FIG. 10A and FIG. 10B; 1101, 1102, 1107, 1114, and 1115 in FIG. 11A to FIG. 11C; 1201, 1202, 1207, 1214, and 1215 in FIG. 12A to FIG. 12C; and/or an action performed by the terminal in another process described in the embodiments of this application. The processing unit 1301 may communicate with another network entity through the communication unit 1302, for example, communicate with an SMF shown in FIG. 11A to FIG. 11C. The storage unit 1303 is configured to store program code and data of the terminal.

The communication apparatus 130 may be a device or may be a chip in the device. When the communication apparatus 130 is the device, the processing unit 1301 may be a processor or a controller, and the communication unit 1302 may be a communication interface, a transceiver, a transceiver machine, a transceiver circuit, a transceiver apparatus, or the like. The communication interface is a collective term, and may include one or more interfaces. The storage unit 1303 may be a memory. When the communication apparatus 130 is the chip in the device, the processing unit 1301 may be a processor or a controller, and the communication unit 1302 may be an input/output interface, a pin, a circuit, or the like. The storage unit 1303 may be a storage unit (for example, a register or a cache) inside the chip, or may be a storage unit (for example, a read-only memory or a random access memory) that is in the device and that is located outside the chip.

The communication unit may also be referred to as a transceiver unit. An antenna and a control circuit that have receiving and sending functions in the communication apparatus 130 may be considered as the communication unit 1302 in the communication apparatus 130, and a processor that has a processing function may be considered as the processing unit 1301 in the communication apparatus 130. Optionally, a component configured to implement the receiving function in the communication unit 1302 may be considered as a receiving unit. The receiving unit is configured to perform the receiving step in the embodiments of this application. The receiving unit may be a receiver machine, a receiver, a receiver circuit, or the like. A component configured to implement the sending function in the communication unit 1302 may be considered as a sending unit. The sending unit is configured to perform the sending step in the embodiments of this application. The sending unit may be a transmitter machine, a transmitter, a transmitter circuit, or the like.

When the integrated unit in FIG. 13 is implemented in a form of a software functional module and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The storage medium that stores the computer software product includes any medium that can store program code, for example, a USB flash drive, a removable hard disk, a read-only memory (ROM), a random access memory (RAM), a magnetic disk, or an optical disc.

The unit in FIG. 13 may also be referred to as a module. For example, the processing unit may be referred to as a processing module.

Figure 14:
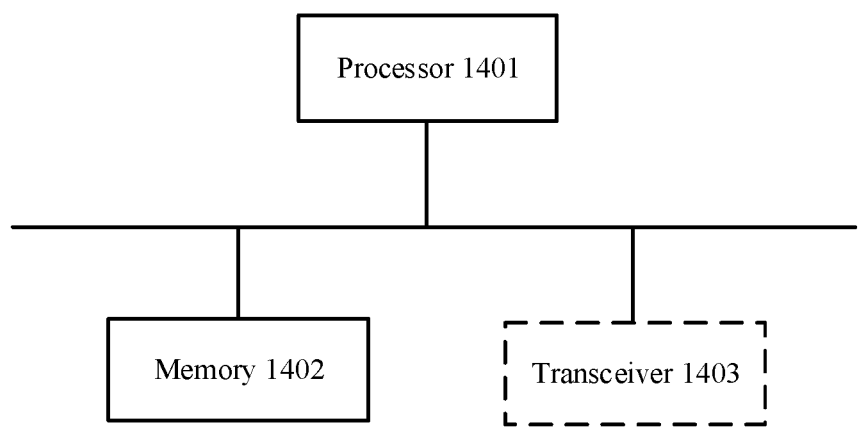
FIG. 14 and FIG. 15 are schematic diagrams of a hardware structure of a communication apparatus according to an embodiment of this application.
Figure 15:
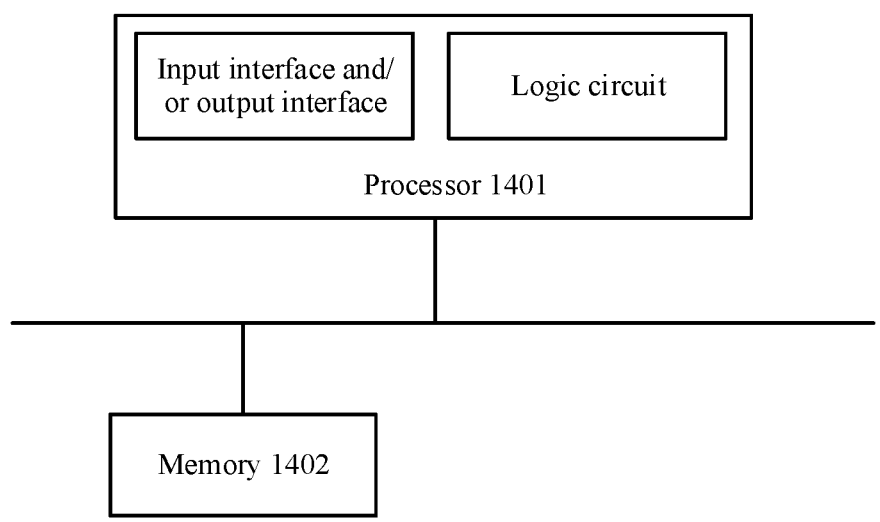

An embodiment of this application further provides a schematic diagram of a hardware structure of a communication apparatus (denoted as a communication apparatus 140). Refer to FIG. 14 or FIG. 15. The communication apparatus 140 includes a processor 1401. Optionally, the communication apparatus 140 further includes a memory 1402 connected to the processor 1401.

The processor 1401 may be a general-purpose central processing unit (CPU), a microprocessor, an application-specific integrated circuit (ASIC), or one or more integrated circuits configured to control program execution in the solutions in this application. The processor 1401 may alternatively include a plurality of CPUs, and the processor 1401 may be a single-core (single-CPU) processor or a multi-core (multi-CPU) processor. The processor herein may be one or more devices, circuits, and/or processing cores configured to process data (for example, computer program instructions).

The memory 1402 may be a ROM or another type of static storage device that can store static information and instructions, or a RAM or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, this is not limited in the embodiments of this application. The memory 1402 may exist independently, or may be integrated into the processor 1401. The memory 1402 may include computer program code. The processor 1401 is configured to execute the computer program code stored in the memory 1402, to implement the method provided in the embodiments of this application.

In a first possible implementation, as shown in FIG. 14, the communication apparatus 140 further includes a transceiver 1403. The processor 1401, the memory 1402, and the transceiver 1403 are connected via a bus. The transceiver 1403 is configured to communicate with another device or a communication network. Optionally, the transceiver 1403 may include a transmitter and a receiver. A component configured to implement a receiving function in the transceiver 1403 may be considered as a receiver. The receiver is configured to perform the receiving step in the embodiments of this application. A component configured to implement a sending function in the transceiver 1403 may be considered as a transmitter. The transmitter is configured to perform the sending step in the embodiments of this application.

Based on the first possible implementation, the schematic diagram of the structure shown in FIG. 14 may be used to illustrate a structure of the RAN node, the PSA UPF, the I-UPF, or the terminal in the foregoing embodiments.

When the schematic diagram of the structure shown in FIG. 14 is used to illustrate the structure of the RAN node in the foregoing embodiments, the processor 1401 is configured to control and manage actions of the RAN node. For example, the processor 1401 is configured to perform 701 to 704 in FIG. 7 (in this case, a first device is the RAN node); 801 to 805 in FIG. 8 (in this case, the first device is the RAN node); 902 and 907 to 911 in FIG. 9A and FIG. 9B; 1002, 1007, 1012, and 1013 in FIG. 10A and FIG. 10B; 1102 and 1107 to 1111 in FIG. 11A to FIG. 11C; 1202, 1207, 1216, and 1217 in FIG. 12A to FIG. 12C; and/or an action performed by the RAN node in another process described in the embodiments of this application. The processor 1401 may communicate with another network entity through the transceiver 1403, for example, communicate with an SMF in FIG. 11A to FIG. 11C. The memory 1402 is configured to store program code and data of the RAN node.

When the schematic diagram of the structure shown in FIG. 14 is used to illustrate the structure of the PSA UPF in the foregoing embodiments, the processor 1401 is configured to control and manage actions of the PSA UPF. For example, the processor 1401 is configured to perform 701 to 704 in FIG. 7 (in this case, a first device is the PSA UPF); 801 to 805 in FIG. 8 (in this case, the first device is the PSA UPF); 902, 907, 912, and 913 in FIG. 9A and FIG. 9B; 1002 and 1007 to 1011 in FIG. 10A and FIG. 10B; 1102, 1107, 1116, and 1117 in FIG. 11A to FIG. 11C; 1202 and 1207 to 1211 in FIG. 12A to FIG. 12C; and/or an action performed by the PSA UPF in another process described in the embodiments of this application. The processor 1401 may communicate with another network entity through the transceiver 1403, for example, communicate with an SMF shown in FIG. 11A to FIG. 11C. The memory 1402 is configured to store program code and data of the PSA UPF.

When the schematic diagram of the structure shown in FIG. 14 is used to illustrate the structure of the I-UPF in the foregoing embodiments, the processor 1401 is configured to control and manage actions of the I-UPF. For example, the processor 1401 is configured to perform 1102, 1107, 1112, and 1113 in FIG. 11A to FIG. 11C; 1202, 1207, 1212, and 1213 in FIG. 12A to FIG. 12C; and/or an action performed by the I-UPF in another process described in the embodiments of this application. The processor 1401 may communicate with another network entity through the transceiver 1403, for example, communicate with an SMF shown in FIG. 11A to FIG. 11C. The memory 1402 is configured to store program code and data of the I-UPF.

When the schematic diagram of the structure shown in FIG. 14 is used to illustrate the structure of the terminal in the foregoing embodiments, the processor 1401 is configured to control and manage actions of the terminal. For example, the processor 1401 is configured to perform 901, 902, 907, 914, and 915 in FIG. 9A and FIG. 9B; 1001, 1002, 1007, 1014, and 1015 in FIG. 10A and FIG. 10B; 1101, 1102, 1107, 1114, and 1115 in FIG. 11A to FIG. 11C; 1201, 1202, 1207, 1214, and 1215 in FIG. 12A to FIG. 12C; and/or an action performed by the terminal in another process described in the embodiments of this application. The processor 1401 may communicate with another network entity through the transceiver 1403, for example, communicate with an SMF shown in FIG. 11A to FIG. 11C. The memory 1402 is configured to store program code and data of the terminal.

In a second possible implementation, the processor 1401 includes a logic circuit and an input interface and/or an output interface. The output interface is configured to perform a sending action in a corresponding method, and the input interface is configured to perform a receiving action in the corresponding method.

Based on the second possible implementation, refer to FIG. 15. The schematic diagram of the structure shown in FIG. 15 may be used to illustrate a structure of the RAN node, the PSA UPF, the I-UPF, or the terminal in the foregoing embodiments.

When the schematic diagram of the structure shown in FIG. 15 is used to illustrate the structure of the RAN node in the foregoing embodiments, the processor 1401 is configured to control and manage actions of the RAN node. For example, the processor 1401 is configured to support the RAN node in performing 701 to 704 in FIG. 7 (in this case, a first device is the RAN node); 801 to 805 in FIG. 8 (in this case, the first device is the RAN node); 902 and 907 to 911 in FIG. 9A and FIG. 9B; 1002, 1007, 1012, and 1013 in FIG. 10A and FIG. 10B; 1102 and 1107 to 1111 in FIG. 11A to FIG. 11C; 1202, 1207, 1216, and 1217 in FIG. 12A to FIG. 12C; and/or an action performed by the RAN node in another process described in the embodiments of this application. The processor 1401 may communicate with another network entity through at least one of the input interface and the output interface, for example, communicate with an SMF in FIG. 11A to FIG. 11C. The memory 1402 is configured to store program code and data of the RAN node.

When the schematic diagram of the structure shown in FIG. 15 is used to illustrate the structure of the PSA UPF in the foregoing embodiments, the processor 1401 is configured to control and manage actions of the PSA UPF. For example, the processor 1401 is configured to support the PSA UPF in performing 701 to 704 in FIG. 7 (in this case, a first device is the PSA UPF); 801 to 805 in FIG. 8 (in this case, the first device is the PSA UPF); 902, 907, 912, and 913 in FIG. 9A and FIG. 9B; 1002 and 1007 to 1011 in FIG. 10A and FIG. 10B; 1102, 1107, 1116, and 1117 in FIG. 11A to FIG. 11C; 1202 and 1207 to 1211 in FIG. 12A to FIG. 12C; and/or an action performed by the PSA UPF in another process described in the embodiments of this application. The processor 1401 may communicate with another network entity through at least one of the input interface and the output interface, for example, communicate with an SMF shown in FIG. 11A to FIG. 11C. The memory 1402 is configured to store program code and data of the PSA UPF.

When the schematic diagram of the structure shown in FIG. 15 is used to illustrate the structure of the I-UPF in the foregoing embodiments, the processor 1401 is configured to control and manage actions of the I-UPF. For example, the processor 1401 is configured to support the I-UPF in performing 1102, 1107, 1112, and 1113 in FIG. 11A to FIG. 11C; 1202, 1207, 1212, and 1213 in FIG. 12A to FIG. 12C; and/or an action performed by the I-UPF in another process described in the embodiments of this application. The processor 1401 may communicate with another network entity through at least one of the input interface and the output interface, for example, communicate with an SMF shown in FIG. 11A to FIG. 11C. The memory 1402 is configured to store program code and data of the I-UPF.

When the schematic diagram of the structure shown in FIG. 15 is used to illustrate the structure of the terminal in the foregoing embodiments, the processor 1401 is configured to control and manage actions of the terminal. For example, the processor 1401 is configured to support the terminal in performing 901, 902, 907, 914, and 915 in FIG. 9A and FIG. 9B; 1001, 1002, 1007, 1014, and 1015 in FIG. 10A and FIG. 10B; 1101, 1102, 1107, 1114, and 1115 in FIG. 11A to FIG. 11C; 1201, 1202, 1207, 1214, and 1215 in FIG. 12A to FIG. 12C; and/or an action performed by the terminal in another process described in the embodiments of this application. The processor 1401 may communicate with another network entity through at least one of the input interface and the output interface, for example, communicate with an SMF shown in FIG. 11A to FIG. 11C. The memory 1402 is configured to store program code and data of the terminal.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions are generated according to the embodiments of this application. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions listed in the claims. Some measures are recorded in dependent claims that are different from each other, but this does not mean that the measures cannot be combined to produce a good effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of and all modifications, variations, combinations or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A communication method, comprising:
    obtaining, by a first device, packet loss statuses of a service flow on a first link and a second link, wherein a protocol data unit (PDU) session of a terminal is anchored to an anchor user plane gateway through an access network device, a user plane path between the terminal and the anchor user plane gateway comprises the first link and the second link, the first link is a user plane data link for communication between the terminal and the access network device, and the second link is a user plane data link for communication between the access network device and the anchor user plane gateway, and wherein the first device is the access network device or the anchor user plane gateway;
    determining, by the first device, a quantity of consecutive lost packets of the service flow on the user plane path based on the packet loss statuses of the service flow on the first link and the second link; and
    in response to the quantity of consecutive lost packets of the service flow on the user plane path reaching a first threshold, triggering, by the first device, enabling of a high-reliability transmission procedure for the service flow.

2. The method according to claim 1, wherein the first threshold is determined based on survival time corresponding to the service flow.

3. The method according to claim 1, further comprising:
    determining, by the first device, that the quantity of consecutive lost packets of the service flow on the user plane path reaches the first threshold in response to a quantity of consecutive lost packets of the service flow on the first link in the user plane path reaching the first threshold; and the triggering, by the first device, enabling of the high-reliability transmission procedure for the service flow comprises:
    triggering, by the first device, enabling of the high-reliability transmission procedure between the terminal and the access network device for the service flow; or
    triggering, by the first device, enabling of the high-reliability transmission procedure between the terminal and the anchor user plane gateway for the service flow.

4. The method according to claim 3, wherein the first device is the access network device, and the triggering, by the first device, enabling of the high-reliability transmission procedure between the terminal and the access network device for the service flow comprises:

sending, by the first device, first enabling information to the terminal, wherein the first enabling information indicates that the high-reliability transmission procedure between the terminal and the access network device for the service flow needs to be enabled; and triggering, by the first device, the first device to enable the high-reliability transmission procedure between the first device and the terminal for the service flow.

5. The method according to claim 3, wherein the triggering, by the first device, enabling of the high-reliability transmission procedure between the terminal and the access network device for the service flow comprises:

sending, by the first device, second enabling information to a session management network element, wherein the second enabling information indicates that the high-reliability transmission procedure between the terminal and the access network device for the service flow needs to be enabled.

6. The method according to claim 1, further comprising:
determining, by the first device, that the quantity of consecutive lost packets of the service flow on the user plane path reaches the first threshold in response to a quantity of consecutive lost packets of the service flow on the second link in the user plane path reaching the first threshold; and the triggering, by the first device, enabling of the high-reliability transmission procedure for the service flow comprises:

triggering, by the first device, enabling of the high-reliability transmission procedure between the anchor user plane gateway and the access network device for the service flow; or triggering, by the first device, enabling of the high-reliability transmission procedure between the terminal and the anchor user plane gateway for the service flow.

7. The method according to claim 6, wherein the first device is the access network device, and the triggering, by the first device, enabling of the high-reliability transmission procedure between the anchor user plane gateway and the access network device for the service flow comprises:

sending, by the first device, third enabling information to the anchor user plane gateway, wherein the third enabling information indicates that the high-reliability transmission procedure between the anchor user plane gateway and the access network device for the service flow needs to be enabled; and triggering, by the first device, the first device to enable the high-reliability transmission procedure between the first device and the anchor user plane gateway for the service flow.

8. The method according to claim 6, wherein the first device is the anchor user plane gateway, the triggering, by the first device, enabling of a high-reliability transmission procedure between the anchor user plane gateway and the access network device for the service flow comprises:

sending, by the first device, fourth enabling information to the access network device, wherein the fourth enabling information indicates that the high-reliability transmission procedure between the anchor user plane gateway and the access network device for the service flow needs to be enabled; and triggering, by the first device, the first device to enable the high-reliability transmission procedure between the first device and the access network device for the service flow.

9. The method according to claim 6, wherein the triggering, by the first device, enabling of the high-reliability transmission procedure between the anchor user plane gateway and the access network device for the service flow comprises:

sending, by the first device, fifth enabling information to a session management network element, wherein the fifth enabling information indicates that the high-reliability transmission procedure between the anchor user plane gateway and the access network device for the service flow needs to be enabled.

10. The method according to claim 1, further comprising:
determining, by the first device, that the quantity of consecutive lost packets of the service flow on the user plane path reaches the first threshold in response to a quantity of consecutive lost packets of the service flow on the first link in the user plane path being less than the first threshold, a quantity of consecutive lost packets of the service flow on the second link being less than the first threshold, and a total quantity of consecutive lost packets of the service flow on the first link and the second link reaching the first threshold; and the triggering, by the first device, enabling of the high-reliability transmission procedure for the service flow comprises:

triggering, by the first device, enabling of the high-reliability transmission procedure between the terminal and the anchor user plane gateway for the service flow.

11. The method according to claim 1, wherein the first device is the access network device; and the determining, by the first device, the quantity of consecutive lost packets of the service flow on the user plane path based on the packet loss statuses of the service flow on the first link and the second link comprises:

determining, by the first device, the quantity of consecutive lost packets of the service flow on the user plane path based on a packet data convergence protocol sequence number (PDCP SN) of a packet that is in the service flow and that is lost on the first link, an N3 interface general packet radio service tunneling protocol-user plane sequence number (N3 GTP-U SN) of a packet that is in the service flow and that is lost on the second link, and a mapping relationship between a PDCP SN and an N3 GTP-U SN of a packet in the service flow.

12. A communication apparatus, comprising:
at least one processor; and
a memory coupled to the at least one processor and having program instructions stored thereon that, when executed by the at least one processor, cause the apparatus to:
obtain packet loss statuses of a service flow on a first link and a second link, wherein a protocol data unit (PDU) session of a terminal is anchored to an anchor user plane gateway through an access network device, a user plane path between the terminal and the anchor user plane gateway comprises the first link and the second link, the first link is a user plane data link for communication between the terminal and the access network device, and the second link is a user plane data link for communication between the access network device and the anchor user plane gateway, and wherein the apparatus is the access network device or the anchor user plane gateway;
determine a quantity of consecutive lost packets of the service flow on the user plane path based on the packet loss statuses of the service flow on the first link and the second link; and in response to the quantity of consecutive lost packets of the service flow on the user plane path reaching a first threshold, triggering enabling of a high-reliability transmission procedure for the service flow.

13. The apparatus according to claim 12, wherein the instructions, when executed by the at least one processor, further cause the apparatus to:
   determine that the quantity of consecutive lost packets of the service flow on the user plane path reaches the first threshold in response to a quantity of consecutive lost packets of the service flow on the first link in the user plane path reaching the first threshold; and
   wherein the triggering enabling of the high-reliability transmission procedure for the service flow comprises:
      triggering enabling of the high-reliability transmission procedure between the terminal and the access network device for the service flow; or
      triggering enabling of the high-reliability transmission procedure between the terminal and the anchor user plane gateway for the service flow.

14. The apparatus according to claim 13, wherein the apparatus is the access network device, and the instructions, when executed by the at least one processor, further cause the apparatus to:
   send first enabling information to the terminal, wherein the first enabling information indicates that the high-reliability transmission procedure between the terminal and the access network device for the service flow needs to be enabled; and
   trigger the enabling of the high-reliability transmission procedure between the apparatus and the terminal for the service flow.

15. The apparatus according to claim 13, wherein the instructions, when executed by the at least one processor, further cause the apparatus to:
   send second enabling information to a session management network element, wherein the second enabling information indicates that the high-reliability transmission procedure between the terminal and the access network device for the service flow needs to be enabled.

16. The apparatus according to claim 12, wherein the instructions, when executed by the at least one processor, further cause the apparatus to:
   determine that the quantity of consecutive lost packets of the service flow on the user plane path reaches the first threshold in response to a quantity of consecutive lost packets of the service flow on the second link in the user plane path reaching the first threshold; and
   wherein the triggering enabling of the high-reliability transmission procedure for the service flow comprises:
      triggering enabling of the high-reliability transmission procedure between the anchor user plane gateway and the access network device for the service flow; or
      triggering enabling of the high-reliability transmission procedure between the terminal and the anchor user plane gateway for the service flow.

17. The apparatus according to claim 12, wherein the instructions, when executed by the at least one processor, further cause the apparatus to:
   determine that the quantity of consecutive lost packets of the service flow on the user plane path reaches the first threshold in response to a quantity of consecutive lost packets of the service flow on the first link in the user plane path being less than the first threshold, a quantity of consecutive lost packets of the service flow on the second link being less than the first threshold, and a total quantity of consecutive lost packets of the service flow on the first link and the second link reaching the first threshold; and
   wherein the triggering enabling of the high-reliability transmission procedure for the service flow comprises:
      triggering enabling of the high-reliability transmission procedure between the terminal and the anchor user plane gateway for the service flow.

18. A communication system, comprising:
   a first device; and
   a session management network element, wherein a protocol data unit (PDU) session of a terminal is anchored to an anchor user plane gateway through an access network device, a user plane path between the terminal and the anchor user plane gateway comprises a first link and a second link, the first link is a user plane data link for communication between the terminal and the access network device, and the second link is a user plane data link for communication between the access network device and the anchor user plane gateway;
   wherein the session management network element is configured to send information about survival time corresponding to a service flow to the first device, wherein the first device is the access network device or the anchor user plane gateway; and
   wherein the first device is configured to:
      receive the information about the survival time from the session management network element, and determine a first threshold based on the information about the survival time;
      obtain packet loss statuses of the service flow on the first link and the second link;
      determine a quantity of consecutive lost packets of the service flow on the user plane path based on the packet loss statuses of the service flow on the first link and the second link; and
      in response to the quantity of consecutive lost packets of the service flow on the user plane path reaching the first threshold, triggering enabling of a high-reliability transmission procedure for the service flow.

19. The communication system according to claim 18, wherein the first device is configured to determine that the quantity of consecutive lost packets of the service flow on the user plane path reaches the first threshold in response to a quantity of consecutive lost packets of the service flow on the first link in the user plane path reaching the first threshold; and
   wherein the triggering enabling of the high-reliability transmission procedure for the service flow comprises:
      triggering enabling of the high-reliability transmission procedure between the terminal and the access network device for the service flow; or
      triggering enabling of the high-reliability transmission procedure between the terminal and the anchor user plane gateway for the service flow.

20. The communication system according to claim 19, wherein the first device is the access network device;
   wherein the first device is configured to send first enabling information to the terminal, and trigger the first device to enable the high-reliability transmission procedure between the first device and the terminal for the service flow, wherein the first enabling information indicates that the high-reliability transmission procedure between the terminal and the access network device for the service flow needs to be enabled; and wherein the terminal is configured to receive the first enabling information from the first device, and enable the high-reliability transmission procedure between the terminal and the access network device for the service flow based on the first enabling information.

* * * * *